United States Patent
Frampton et al.

(10) Patent No.: US 10,826,418 B2
(45) Date of Patent: *Nov. 3, 2020

(54) PRINTED CIRCUIT BOARD BASED EXCITER

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,681

(22) Filed: Feb. 25, 2019

(65) Prior Publication Data

US 2019/0190418 A1 Jun. 20, 2019

Related U.S. Application Data

(63) Continuation of application No. 15/863,509, filed on Jan. 5, 2018, now Pat. No. 10,256,758, which is a
(Continued)

(51) Int. Cl.
*H02P 9/00* (2006.01)
*H02P 9/48* (2006.01)
(Continued)

(52) U.S. Cl.
CPC ............... *H02P 9/00* (2013.01); *H02K 3/26* (2013.01); *H02K 7/1815* (2013.01);
(Continued)

(58) Field of Classification Search
CPC .... H02P 9/00; H02P 9/009; H02P 9/04; H02P 9/14; H02P 9/302; H02P 9/48; H02K 3/26; H02K 7/1815; H02K 11/042
(Continued)

(56) References Cited

U.S. PATENT DOCUMENTS

| 3,656,051 A | 4/1972 | Pratt |
| 4,259,603 A | 3/1981 | Uchiyama et al. |

(Continued)

FOREIGN PATENT DOCUMENTS

| CN | 1038359 A | 12/1989 |
| CN | 1427263 A | 7/2003 |

(Continued)

OTHER PUBLICATIONS

Chinese Office Action for Chinese Patent Application No. 201510831151.6, dated Sep. 30, 2018.

(Continued)

*Primary Examiner* — Pedro J Cuevas

(74) *Attorney, Agent, or Firm* — Lempia Summerfield Katz LLC

(57) ABSTRACT

In one embodiment, a generator includes a rotor configured to rotate in cooperation with a stator to generate electrical power. An exciter of the generator includes at least one circuit board, a stationary exciter stator, and a control circuit. The circuit board is mechanically coupled to a rotor of the generator and includes at least one coil of an electrical conductor. The stationary exciter stator is configured to induce a current in the at least one coil of the at least one circuit board. The control circuit is configured to modify the current from the at least one coil and provide the modified current to a field of the generator.

20 Claims, 38 Drawing Sheets

Related U.S. Application Data continuation-in-part of application No. 15/179,323, filed on Jun. 10, 2016, now Pat. No. 9,935,571, which is a continuation of application No. 14/675,001, filed on Mar. 31, 2015, now Pat. No. 9,590,545, and a continuation of application No. 14/675,017, filed on Mar. 31, 2015, now abandoned.

(60) Provisional application No. 62/084,890, filed on Nov. 26, 2014.

(51) Int. Cl.
| | |
|---|---|
| *H02P 9/30* | (2006.01) |
| *H02K 7/18* | (2006.01) |
| *H02P 9/14* | (2006.01) |
| *H02P 9/04* | (2006.01) |
| *H02K 3/26* | (2006.01) |
| *H02K 11/042* | (2016.01) |
| *H02P 101/45* | (2016.01) |
| *H02K 19/38* | (2006.01) |

(52) U.S. Cl.
CPC .......... *H02K 11/042* (2013.01); *H02P 9/009* (2013.01); *H02P 9/04* (2013.01); *H02P 9/14* (2013.01); *H02P 9/302* (2013.01); *H02P 9/48* (2013.01); *H02K 19/38* (2013.01); *H02P 2101/45* (2015.01)

(58) Field of Classification Search
USPC ..................... 322/20; 310/58, 89, 60–69
See application file for complete search history.

(56) References Cited

U.S. PATENT DOCUMENTS

| | | | |
|---|---|---|---|
| 4,329,603 A | 5/1982 | Ballard | |
| 4,570,111 A | 2/1986 | Sato | |
| 4,723,106 A | 2/1988 | Gibbs et al. | |
| 4,724,347 A | 2/1988 | Reinhardt et al. | |
| 4,949,021 A | 8/1990 | Rozman et al. | |
| 5,006,741 A | 4/1991 | Schott | |
| 5,038,088 A | 8/1991 | Arends et al. | |
| 5,231,344 A | 7/1993 | Marumoto et al. | |
| 5,296,770 A | 3/1994 | Pflueger et al. | |
| 5,373,206 A | 12/1994 | Lim | |
| 5,497,069 A | 3/1996 | Shriver et al. | |
| 5,554,923 A | 9/1996 | Maddali | |
| 5,877,574 A * | 3/1999 | Molnar .................. H02K 1/165 310/156.05 | |
| 5,878,189 A | 3/1999 | Lankin et al. | |
| 5,932,942 A * | 8/1999 | Patyk .................. H02K 11/33 310/58 | |
| 5,939,807 A * | 8/1999 | Patyk .................. H02K 5/161 310/64 | |
| 6,021,251 A | 2/2000 | Hammer et al. | |
| 6,026,004 A | 2/2000 | Cross | |
| 6,051,953 A | 4/2000 | Vithayathil | |
| 6,218,749 B1 | 4/2001 | Nondahl et al. | |
| 6,285,168 B1 | 9/2001 | Davis | |
| 6,335,582 B1 | 1/2002 | Abukawa et al. | |
| 6,339,316 B1 | 1/2002 | Eguchi et al. | |
| 6,396,247 B1 | 5/2002 | Gibbs et al. | |
| 6,504,275 B2 | 1/2003 | Nondahl et al. | |
| 6,525,504 B1 | 2/2003 | Nygren et al. | |
| 6,831,439 B2 | 12/2004 | Won | |
| 6,907,794 B2 | 6/2005 | Arai | |
| 7,158,223 B2 | 1/2007 | Arai | |
| 7,166,984 B1 | 1/2007 | Jones et al. | |
| 7,213,461 B2 | 5/2007 | Hurley et al. | |
| 7,224,092 B2 * | 5/2007 | Masuda .................. H02K 1/187 310/67 R | |
| 7,592,785 B2 | 9/2009 | Kimura et al. | |
| 7,828,561 B2 | 11/2010 | Gueckel | |
| 8,057,175 B2 | 11/2011 | Vadari et al. | |
| 8,217,606 B2 | 7/2012 | Hyde et al. | |
| 8,222,842 B2 | 7/2012 | Hyde et al. | |
| 8,248,060 B2 | 8/2012 | Schweitzer, III et al. | |
| 8,248,061 B2 | 8/2012 | Schweitzer, III et al. | |
| 8,378,641 B2 | 2/2013 | Rozman et al. | |
| 8,421,423 B2 | 4/2013 | Nakada et al. | |
| 8,466,649 B2 | 6/2013 | Hyde et al. | |
| 8,536,813 B2 | 9/2013 | Hyde et al. | |
| 8,541,988 B2 | 9/2013 | Horihata et al. | |
| 8,588,984 B2 | 11/2013 | Rajapaske | |
| 8,674,683 B2 | 3/2014 | Schweitzer, III et al. | |
| 8,702,388 B2 | 4/2014 | Garate Ivaro, et al. | |
| 8,742,732 B2 | 6/2014 | Virtanen | |
| 8,773,081 B2 | 7/2014 | Akita et al. | |
| 8,816,624 B2 | 8/2014 | Hyde et al. | |
| 8,912,792 B2 | 12/2014 | Seeley et al. | |
| 8,975,876 B2 | 3/2015 | Rozman et al. | |
| 9,553,490 B2 * | 1/2017 | Zhang .................. H02K 11/33 | |
| 9,590,545 B2 | 3/2017 | Frampton | |
| 9,653,960 B2 * | 5/2017 | Matsuda .................. H02K 5/15 | |
| 9,660,563 B2 | 5/2017 | Rozman et al. | |
| 9,716,456 B2 | 7/2017 | Maruyama | |
| 9,935,522 B2 * | 4/2018 | Watanabe ................ H02K 5/10 | |
| 9,935,571 B2 | 4/2018 | Frampton et al. | |
| 9,998,045 B2 | 6/2018 | Frampton et al. | |
| 10,199,908 B2 * | 2/2019 | Akiyoshi ................. H02K 9/06 | |
| 10,256,758 B2 * | 4/2019 | Frampton ................ H02K 3/26 | |
| 10,451,073 B2 * | 10/2019 | Fecke .................. H02K 1/2706 | |
| 10,491,081 B2 * | 11/2019 | Akiyoshi ................. H02K 11/33 | |
| 2001/0008352 A1 | 7/2001 | Nondahl et al. | |
| 2008/0186000 A1 | 8/2008 | Kimura et al. | |
| 2008/0191482 A1 | 8/2008 | Okuno | |
| 2009/0089608 A1 | 4/2009 | Guzman-Casillas | |
| 2009/0091303 A1 | 4/2009 | Schweitzer, III et al. | |
| 2009/0140600 A1 | 6/2009 | Tsai et al. | |
| 2009/0153105 A1 | 6/2009 | Czajkowski | |
| 2009/0212746 A1 | 8/2009 | Conway et al. | |
| 2010/0134074 A1 | 6/2010 | Crane | |
| 2010/0176591 A1 | 7/2010 | Clucas | |
| 2010/0241283 A1 | 9/2010 | Desai et al. | |
| 2011/0068752 A1 | 3/2011 | Nakada et al. | |
| 2011/0158806 A1 | 6/2011 | Arms et al. | |
| 2011/0260042 A1 | 10/2011 | Schweitzer, III et al. | |
| 2011/0285252 A1 | 11/2011 | Hyde et al. | |
| 2011/0285339 A1 | 11/2011 | Hyde et al. | |
| 2011/0298430 A1 | 12/2011 | Platero Gaona et al. | |
| 2012/0007428 A1 | 1/2012 | Rozman et al. | |
| 2012/0007568 A1 | 1/2012 | Horihata et al. | |
| 2012/0146593 A1 | 6/2012 | Akita et al. | |
| 2012/0153904 A1 | 6/2012 | Albsmeier | |
| 2012/0313490 A1 | 12/2012 | Schweitzer, III et al. | |
| 2012/0326677 A1 | 12/2012 | Tisserand et al. | |
| 2013/0175877 A1 | 7/2013 | Abe et al. | |
| 2013/0214537 A1 | 8/2013 | Hashimoto et al. | |
| 2013/0334936 A1 | 12/2013 | Hyde et al. | |
| 2014/0055126 A1 | 2/2014 | Seeley et al. | |
| 2014/0125309 A1 | 5/2014 | Frampton | |
| 2014/0203788 A1 | 7/2014 | Andrejak et al. | |
| 2014/0265744 A1 | 9/2014 | Rozman et al. | |
| 2014/0266078 A1 | 9/2014 | Rozman et al. | |
| 2014/0306565 A1 | 10/2014 | James | |
| 2014/0327381 A1 | 11/2014 | Hyde et al. | |
| 2015/0115762 A1 | 4/2015 | Rozman et al. | |
| 2015/0171696 A1 * | 6/2015 | Zhang .................. H02K 11/33 310/68 B | |
| 2015/0311766 A1 * | 10/2015 | Matsuda ................ H02K 29/08 417/423.7 | |
| 2015/0311848 A1 | 10/2015 | Maruyama | |
| 2015/0326161 A1 | 11/2015 | Rodriguez | |
| 2016/0149527 A1 | 5/2016 | Frampton et al. | |
| 2016/0149528 A1 | 5/2016 | Frampton et al. | |
| 2016/0241117 A1 | 8/2016 | Cheung | |
| 2016/0268942 A1 | 9/2016 | Rozman et al. | |
| 2016/0301345 A1 | 10/2016 | Frampton | |
| 2016/0322877 A1 | 11/2016 | Hu | |
| 2016/0373038 A1 | 12/2016 | Rozman et al. | |
| 2016/0377082 A1 * | 12/2016 | Fecke .................. H02K 29/08 417/420 | |

(56) References Cited

U.S. PATENT DOCUMENTS

| | | | |
|---|---|---|---|
| 2017/0170762 A1 | 6/2017 | Blackwelder et al. | |
| 2017/0170765 A1 | 6/2017 | Blackwelder et al. | |
| 2017/0294823 A1* | 10/2017 | Akiyoshi | H02K 19/36 |
| 2017/0302136 A1* | 10/2017 | Akiyoshi | H02K 9/06 |
| 2017/0324306 A1* | 11/2017 | Akiyoshi | H02K 9/06 |
| 2018/0006524 A1* | 1/2018 | Watanabe | H02K 5/04 |
| 2018/0131301 A1 | 5/2018 | Frampton et al. | |
| 2019/0044406 A1* | 2/2019 | Yamamoto | H02K 7/083 |

FOREIGN PATENT DOCUMENTS

| | | |
|---|---|---|
| CN | 1441158 A | 9/2003 |
| CN | 102130563 A | 7/2011 |
| CN | 102150357 A | 8/2011 |
| CN | 103314522 A | 9/2013 |
| CN | 103982556 B | 8/2014 |
| JP | H0850422 A | 2/1996 |
| TW | 201219654 A | 5/2012 |
| WO | WO2004064087 A1 | 7/2004 |
| WO | WO2013030808 A2 | 3/2013 |

OTHER PUBLICATIONS

Chinese Office Action for related Chinese Application No. 201510831151.6 dated Oct. 11, 2017, with English Translation.

European Office Action for European Patent Application No. 151962481-1202, dated Sep. 20, 2018.

European Search Report for European Application No. 15196248.7, dated Jun. 23, 2016.

Neil N. H. Ching et al., "Pcb Integrated Micro-generator for Wireless Systems" International Symposium. on Smart Structures and Microsystems: pp. 19-24 Publication Date: Oct. 1, 2000.

Chinese Office Action and English Summary for Chinese Application No. 201510831151.6 dated Apr. 22, 2019.

* cited by examiner

ROTOR ASSEMBLY

US 10,826,418 B2

PRINTED CIRCUIT BOARD BASED EXCITER

CROSS REFERENCE TO OTHER APPLICATIONS

This application is a continuation under 35 U.S.C § 120 and 37 C.F.R. § 1.53(b) of U.S. patent application Ser. No. 15/863,509 filed Jan. 5, 2018, which is a continuation-in-part of U.S. patent application Ser. No. 15/179,323 filed Jun. 10, 2016, which is a continuation of U.S. patent application Ser. No. 14/675,001 filed Mar. 31, 2015 and U.S. patent application Ser. No. 14/675,017 filed Mar. 31, 2015, each of which claims the benefit of U.S. Provisional Application Ser. No. 62/084,890, filed Nov. 26, 2014, and each of which is hereby incorporated by reference in its entirety.

FIELD

This application relates to the field of alternators, and more specifically, a rotor mounted controller for an alternator.

BACKGROUND

An engine-generator set, which may be referred to as a generator or a genset, may include a prime mover (e.g., an internal combustion engine) and an alternator or another device for generating electrical energy or power. One or more generators may provide electrical power to a load through a power bus. The power bus, which may be referred to as a generator bus or common bus, transfers the electrical power from the engine-generator set to a load.

A current transformer may measure the alternator current on the generator bus. A current transformer includes a primary winding, a magnetic core, and a secondary winding. The primary winding may be the conductive path of the generator bus. The secondary winding may be a length of wire wrapped around the magnetic core. The magnetic core may be place d around the power bus or clamped to the power bus. Current in the power bus induces a proportional current in the secondary winding, which may be measured using an ammeter or other instrument.

However, current transformers have many drawbacks. Current transformers are expensive. Current transformers are bulky and require significant space. The installation of current transformers is labor intensive and prone to error. An alternative the current transformers for generator sets is needed.

BRIEF DESCRIPTION OF THE DRAWINGS

Exemplary embodiments are described herein with reference to the following drawings.

DETAILED DESCRIPTION

Figure 1:
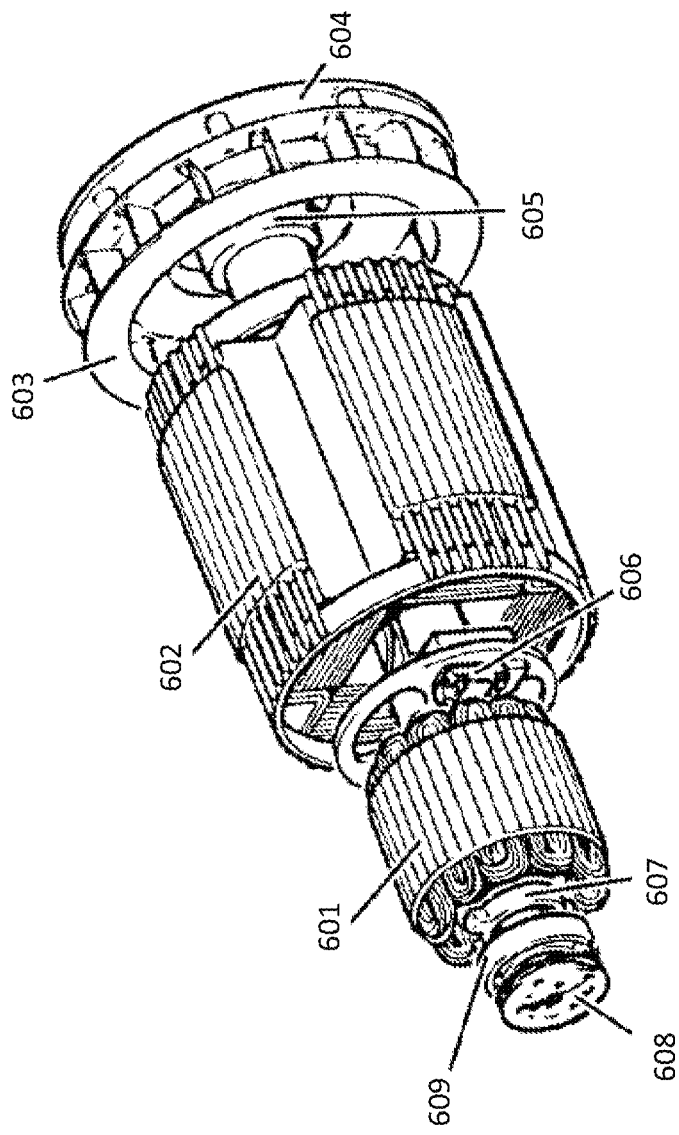
FIG. 1 illustrates an example rotor assembly.

FIG. 1 illustrates an example rotor assembly 600. The rotor assembly 600 may include an exciter armature 601, a field coil assembly 602, a cooling fan 603, drive discs 604, a coupling 605, a rotor controller 606, a sensor 607, a rotor communication device 608, and a rotor bearing 609. Additional, different, or fewer components may be included.

The coupling 605 and/or drive discs 604 couple the rotor assembly 600 to a prime mover such as an engine. The coupling 605 is a fixed connection between the rotor assembly 600 and the engine via drive discs 604. The engine turns the rotor assembly 600, rotating the exciter armature 601 along with the field coil assembly 602. The engine may also turn the cooling fan 603. The cooling fan 603 forces air across the field coil assembly 602, the rotor controller 606, and/or the exciter armature 601, any of which may expel heat as current flows through the windings or other electrical components.

Figure 2:
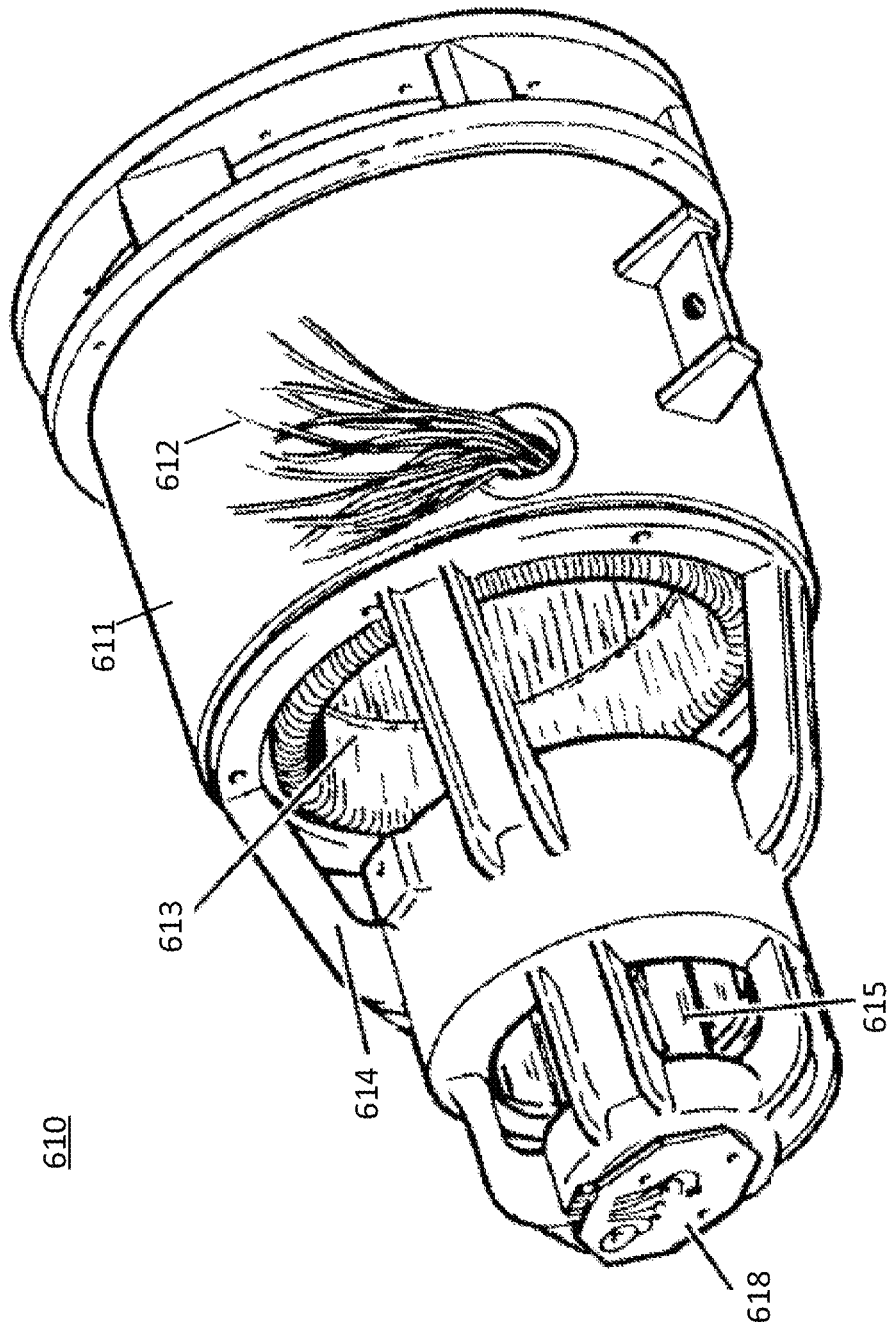
FIG. 2 illustrates an example stator assembly.

FIG. 2 illustrates an example stator assembly 610. The stator assembly 610 includes a stator chassis 611, a set of leads 612, armature windings 613, an end bracket 614, an exciter field assembly 615, and a stator communication device 618. Additional, different, or fewer components may be included. The rotor assembly 600 fits inside the stator assembly 610. The exciter field assembly 615 is aligned with the exciter armature 601. The stator chassis 611 is aligned with the field coil assembly 602.

The exciter armature 601 includes exciter armature windings, and the exciter field assembly 615 includes a source of magnetic flux, such as either permanent magnets or windings. As the exciter armature windings rotate within the stator assembly 610, one or more currents are generated in the exciter armature windings. Two or more wires or other electrically conductive connections connect the exciter armature windings to the field coil assembly 602. The current from the exciter armature windings supplies current to the field coil assembly 602. As the field coil assembly 602 rotates within the stator assembly 610, currents are generator in the armature windings 613. The current from the armature windings 613 is carried by the leads 612 to a load.

Communication between the stator and rotor is provided by the rotor communication device 608 and the stator communication device 618. The communication may take various forms including but not limited to optical communication, radio communication, and magnetic communication. The communication may be any form in which the communication path is air. Thus, no wires connect the rotor communication device 608 and the stator communication device 618. When the communication is optical communication, the rotor communication device 608 includes a light source (e.g., light emitting diode) and a photoreceptor, and the stator communication device 618 includes a light source and a photoreceptor. Light emitting on one side of the communication path is detected on the other side of the communication path. When the communication is radio communication the rotor communication device 608 includes a transceiver and the stator communication device 618 includes a transceiver. Radio signals generated at the stator communication device 618 are received at the rotor communication device 608, and vice versa. When the communication is magnetic communication, the rotor communication device 608 includes an arrangement of magnetic coils. An alternating current flowing through the magnetic coils is controlled to transfer data to the stator communication device 618 by inducing a magnetic flux in coils in the stator communication device 618. The amplitude of the alternating current in the stator communication device 618 is measured or sampled to detect the transferred data. Communication may similarly be performed in the direction from the stator communication device 618 to the rotor communication device 608.

The communication interface can pass a digital signal (such as a target field voltage, target field current, stator voltage, stator current, alternator type, environmental conditions, or other similar stator parameters) where the signal level contains two states and is interpreted, sampled, decoupled, or multiplexed or an analog signal (such as stator voltage or stator current) where the signal amplitude or frequency is measured by taking and processing samples to measure a quantity.

The rotor controller 606 may receive sensor data from one or more sensors and in response, generate one or more generator commands. The sensor data may be a measurement of an electrical parameter of the exciter armature 601, or the field coil assembly 602. The electrical parameter may include a current, a voltage, or a resistance. The electrical parameter may be a flux induced on the field coil assembly 602 by a current in the armature windings 613. In this way, the sensor data may be indicative of an output of the generator. Further, because a load on the generator impacts the current in the armature windings 613, the sensor data may be indicative of the load on the generator. The sensor data may be temperature data, which may indicate the resistance of the field coils or armature windings. The sensor data may be magnetic data measured on damper windings of the rotor, parallel or perpendicular to the primary rotor flux. The sensor data may describe a physical position of the rotor in any direction or a capacitance that is related to proximity to a surface, the sensor data may be acceleration data or strain data measured on the rotor, or the sensor data may be a deflection measurement on any axis or mode.

The rotor controller 606 may perform an analysis of one or more components of the sensor data at the controller. For example, the rotor controller 606 may compare a value in the sensor data to a threshold. The rotor controller 606 may sort, average, or filter the sensor data. The rotor controller 606 may remove outlier values from the sensor data. The rotor controller 606 may calculate a moving average of the sensor data. The rotor controller 606 may query a lookup table using the sensor data.

The rotor controller 606 generates a generator command at the controller based on the sensor data. The generator command may be an adjustment in a current in the field winding of the rotor, which directly affects the output of the generator. For example, the rotor controller 606 may compare an estimated output voltage or current of the generator to a threshold. When the output falls below a low threshold, the rotor controller 606 increases the current of the field windings. When the output exceeds a high threshold, the rotor controller 606 decreases the current of the field windings. The generator command may adjust a speed of a prime mover (e.g., engine) driving the rotor of the generator. For example, the rotor controller 606 may compare an estimated output frequency of the generator to a threshold. When the output frequency falls below a low threshold, the rotor controller 606 increases the speed of the prime mover. When the output frequency exceeds a high threshold, the rotor controller 606 decreases the speed of the prime mover. The rotor controller 606 may also identify an anomaly from the sensor data and generate a command to shut down the generator or issue a warning to the user.

The generator may also include one or more of a fuel supply, a cooling system, an exhaust system, a lubrication system, and a starter. Additional, different, or fewer components may be included. The alternator may be an electromechanical device including a rotating magnetic field and a stationary armature, a rotating armature with a stationary magnetic field, or a linear alternator. The prime mover may be powered by liquid fuel (e.g., gasoline, diesel fuel, or others) or gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the prime mover. Natural gas (e.g., compressed natural gas (CNG)) may be a hydrocarbon gas mixture. Biogas may be a gas produced by the breakdown of organic material. Other variations are possible.

The current or voltage of the rotating field winding on a synchronous alternator can be monitored to detect changes in load connected to the windings of the stationary armature.

Various structures are available for the mechanical construction of the synchronous alternator, including those illustrated in FIGS. 1 and 2. In one representation, a synchronous alternator consists of a rotor and a stator. The rotor has a field winding, which may be a series wound coil on a magnetically permeable core. The rotor may freely rotate within a stator, about a concentric axis. The stator consists of armature windings; these are distributed coils placed on the interior of a stack of ringed laminations. The laminations include slots for the placement of the armature windings. The clearance between the freely rotating rotor and the stationary stator is denoted as the air gap.

The function of the synchronous alternator is to convert mechanical power from a driving mechanism into electrical power. The driving mechanism is denoted as the prime mover (e.g. internal combustion engine) and provides torque to the rotor. Electrical power is drawn from connection to the ends of the armature windings. This connection may be crimped terminals, wire splicing, or another fastening mechanism.

In order to convert mechanical power to electrical power, there is magnetic coupling between the rotor and stator. This coupling is denoted as flux linkage; mathematically, flux linkage is the product of current and inductance. The magnitude of the flux linkage in each winding has a self-component corresponding to a self-inductance and a mutual component corresponding to a mutual inductance. The mutual flux linkage component provides coupling between the rotor and stator. To generate voltage, the magnitude of flux linkage must be changing within a winding. This magnitude of the change can be the consequence of a change in winding current or in physical displacement of a vector flux density (vector quantity denotes magnitude and direction, which may be a rotation of the rotor relative to the stator). Steady state operation of the synchronous alternator with a balanced three phase load maintains a constant field winding current (DC value) and displaces the field winding relative to the armature windings as the rotor rotates. The flux density generated by the field winding is ortho-normal to the open area of the winding; thus, it is a vector quantity.

It is conceptually helpful to consider superposition when discussing the behavior of a synchronous alternator. When there is no load connected to the armature windings, this is denoted as an open-circuit scenario. In an open-circuit scenario, the only contributor to the mutual flux linkage is the current flowing through the field winding (there is no current flowing through the armature windings). The product of this current with the mutual inductance and rotational speed generates voltage in the armature winding.

When there is a load connected to the armature windings, there is current flowing through the armature windings. This creates an additional mutual flux linkage component that is in opposition to the flux component from the field winding; this flux linkage is denoted as armature reaction. By superposition, the sum of the flux linkage component and the flux component from the field winding equals the total mutual flux linkage. To maintain a constant voltage on the armature winding, the magnitude of the mutual flux linkage component sourced from the field winding is increased to overcome the armature reaction. Adjusting field winding current to maintain a nominal armature winding voltage is the primary function of the voltage regulator, which is an example of a stator controller or stationary controller. The stator controller, or the functions described for the stator controller, may also be performed by the rotor controller if the output voltage of the generator is supplied to the rotating board.

As a conceptual exercise, a synchronous alternator with current flowing only in the armature windings can be considered. In this case, the field winding is not connected to a source; voltage is monitored at its ends. As the rotor is rotated within the stator, the flux linkage due to armature currents will generate voltage in the field winding. If this field winding is connected to a load (such as the source impedance of a non-ideal voltage supply), then current will flow in the field winding.

Considering the three above steady-state scenarios, it should be evident that the voltage on and current flowing through the field winding is related to both the field winding supply and the current flowing through the armature.

The transient dynamics of the synchronous alternator describe the behavior of the alternator as the load on the armature windings changes. It is helpful to consider the dynamics as the synchronous alternator moves from a steady-state open-circuit scenario to a loaded scenario. To begin, it is necessary to introduce the law of constant flux linkages: this dictates that the flux linkage immediately before and immediately after a transient event is constant (it is noted that this is the driver for the principle, current flowing through an inductor cannot change instantaneously—this is for a single current path). When load is introduced at the armature winding terminals of the synchronous alternator, current will begin to flow into the load; this creates an armature reaction component. For the law of constant flux linkage to hold, the product of the sum of currents in the field and armature windings with the mutual inductance must remain constant. None of the constituent components are inherently sufficiently stiff to be constant with a changing armature current: field winding current and the mutual inductance will both change. Mutual inductance is the product of the number of turns on a winding divided by the magnetic reluctance in the magnetic circuit path. The reason for the mutual inductance change is twofold:

First, there is a damper winding that will be introduced into the mutual inductance equation to counteract asynchronous flux linkage components. This acts as an additional set of turns. Second, the magnetic reluctance path will change as the load angle of the alternator changes.

The field winding will operate concurrently with the damper winding to counteract the armature reaction; it cannot be excluded from the magnetic circuit. The magnitude of the field winding current will increase (even in the absence of any action from the voltage regulator) as a result of the necessity to maintain a constant mutual flux linkage.

As mentioned previously, the primary function of the voltage regulator is to maintain a nominal voltage on the terminals of the armature winding. When load is introduced and current begins to flow, this armature winding voltage decreases. The voltage drop may be detected after one or more periods of the AC waveform have occurred after the load change. The change in field winding current and/or mutual inductance may be monitored and analyzed to detect load change. In one embodiment, the voltage regulator reacts more quickly and effects reduced voltage dip and/or reduced time to return to nominal voltage.

Figure 3A:
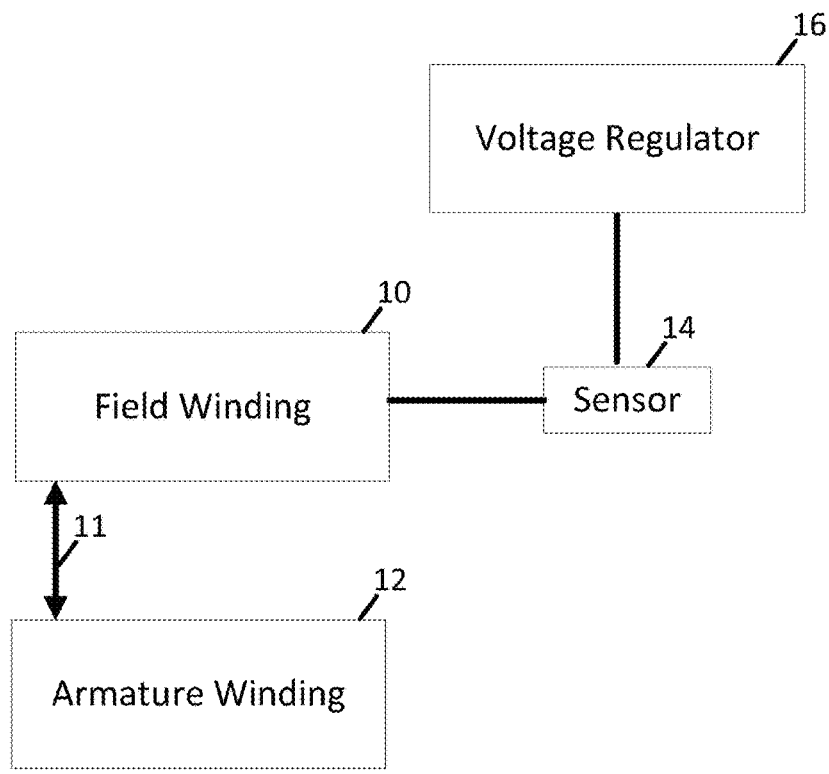
FIG. 3A illustrates an example load characterization circuit.
Figure 3B:
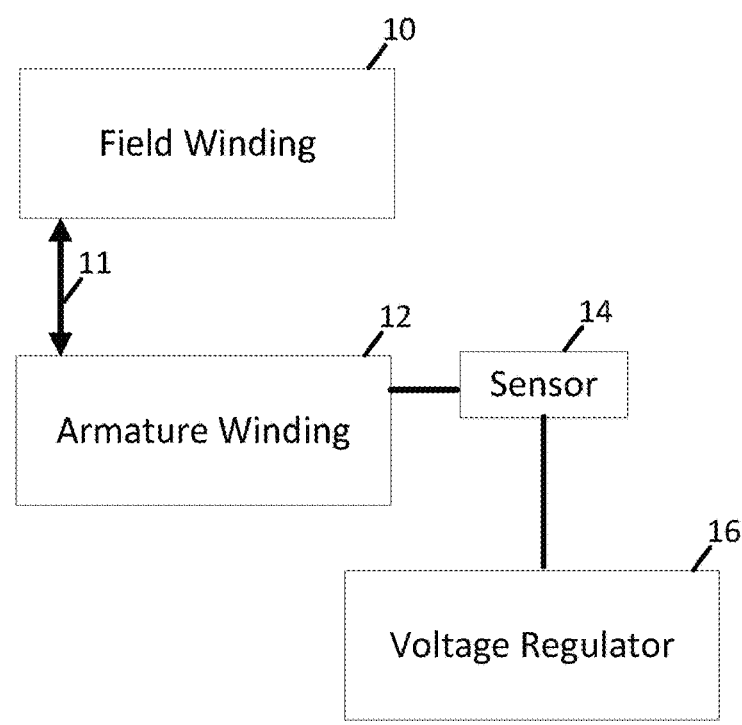
FIG. 3B illustrates another example load characterization circuit.

FIGS. 3A and 3B illustrate an example block diagram for a system for detecting changes in field winding current caused by increased armature winding current in the stator or the mutual inductance caused by the same current increase in the armature winding. As a result of the increased armature winding current, the field current (and/or associated mutual inductance) changes; as a result of the increased armature winding current, voltage decreases.

The system includes a field winding 10, and an armature winding 12, which are separated by air gap 11. In one embodiment, as shown by FIG. 3A, the sensor 14 may be connected to the field winding 10, for measuring an electrical characteristic of the field winding 10. The voltage regulator 16 receives the measurement from the sensor 14, and calculates a control signal based on the measurement. In one embodiment, as shown by FIG. 3B, the armature winding 12 is connected to a sensor 14 for measuring an electrical characteristic of the armature winding 12. Example electrical characteristics include, voltage, current, and inductance.

Figure 4A:
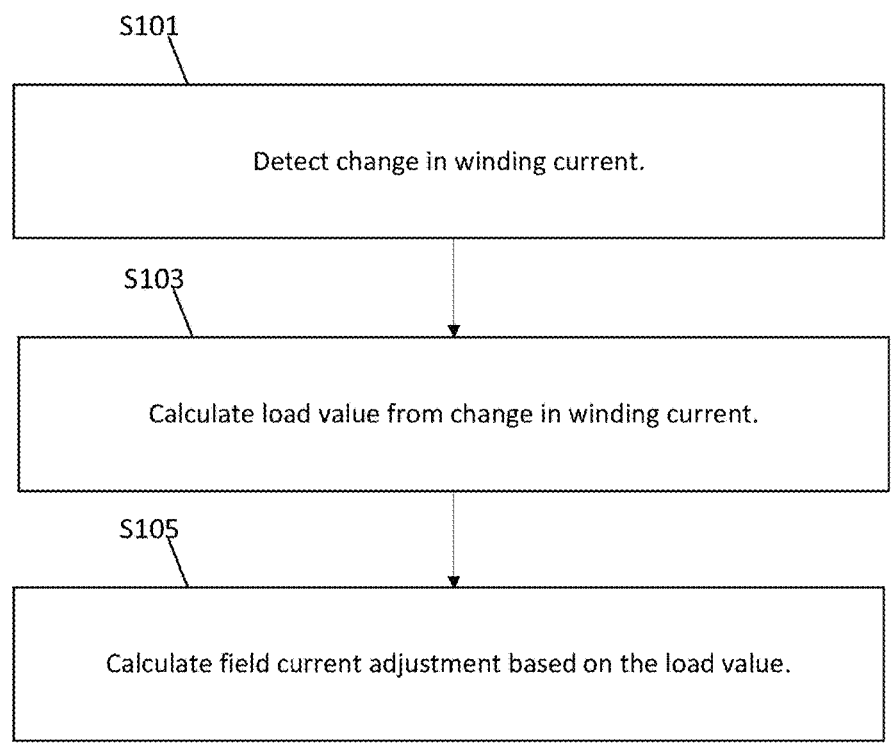
FIG. 4A illustrates an example flowchart for load characterization.

FIG. 4A illustrates an example flow chart for the systems of FIG. 3A or 3B. At act S101, the current of the winding, either field winding 10 or armature winding 12, is detected, either directly or through another property.

At act S103, a controller (e.g., voltage regulator or activator) calculates a load value from the change in winding current. The change in load depends on the mutual inductance between the field windings and the stator windings. The inductance of the field windings may be provided from the resistance and an alternator time constant. The alternator time constant may be the resistance divided by the inductance, which may be computed based on the time required to reach a predetermined amount (e.g., 63%) of a final value with a step input. Alternatively, the inductance of the field windings may be based on a phase angle between an imposed voltage and current. The inductance of the stator windings may be similarly calculated using either of these techniques.

The mutual inductance between the field windings and the stator windings may be calculated based on the characteristics of the rotor and stator. Factors in determining the mutual inductance include the phase relationship between the rotor and the stator, the rate of change of the voltage in the rotor or stator, the rate of change of the current in the rotor or stator, a change in the measured rotor inductance, and/or a change in the measured stator inductance. The mutual inductance (M) may be calculated based on a coupling factor (K), the stator inductance ($L_{stator}$) and the rotor inductance ($L_{rotor}$) according to Equation 1:

$$M = k * \sqrt{L_{stator} * L_{rotor}} \qquad \text{Eq. 1}$$

Thus, the mutual inductance is the parallel factor for the contribution of the stator inductance to the rotor inductance or the stator inductance to the rotor. The mutual inductance may be measured empirically by applying a range of voltage and currents to the stator windings and measuring the response on the field windings from current changes in the stator windings. In one example, the mutual inductance from a current on the stator winding (stator-rotor inductance) that induces a voltage in the field winding is different than the mutual inductance from a current on the field winding (rotor-stator inductance) that induces a voltage in the stator windings.

The load on the stator may be determined from the changes in current. For example, a lookup table for the generator indexed by model number, manufacturer, or physical characteristics may associate stator winding currents, or changes in stator winding current to generator load or changes in generator load. Thus, the lookup table may include a threshold value for the electrical characteristic of the alternator for multiple alternator models, manufacturers, or types. The regulator (or stator controller) may access the lookup table using the model, manufacturer or type and receive a threshold value for the change in electrical characteristic.

Alternatively, the load may be calculated based on a mathematical relationship between current and load. However, the load calculation may be omitted (as described below, field current may be calculated directly from stator current).

At act S105, the controller calculates a field current adjustment based on the load value from act S103. The field current adjustment may be based on a coupling ratio, or mutual inductance, related to the number of turns on the stator windings and the number of turns on the field current windings. The controller may generate a command signal based on the field current adjustment.

Figure 4B:
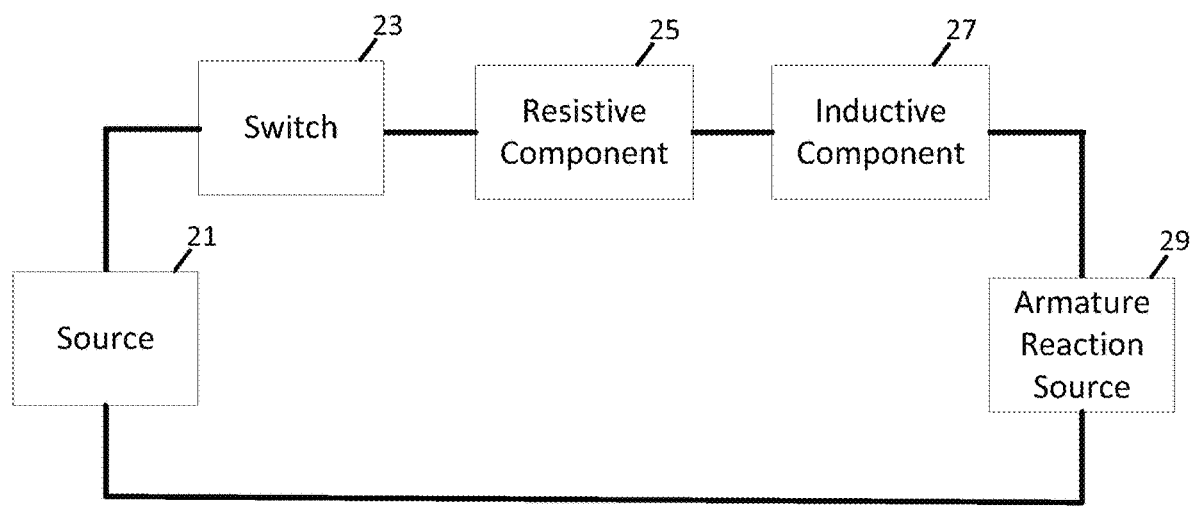
FIG. 4B illustrates an example circuit for load characterization.

FIG. 4B illustrates an example circuit for driving the field current. The source 21 may be an exciter generator, a battery, a brush system, or any primary source of current for the field winding. The switch 23 is controlled by the controller to increase or decrease the field winding current. In one example, the switch 23 is controlled according to a pulse width modulated signal having a duty cycle. The duty cycle is related (e.g., proportional) to the intended field winding current. The field windings may be modeled by resistive component 25 and inductive component 27. The primary part of resistive component 25 and inductive component 27 is based on the physical wires and connections that make up the field windings.

However, the stator also acts as source for the field windings. The armature reaction source 29 represents the mutual inductance from the stator to the field windings. The armature reaction source 29 also changes the inductive component 27 because the inductance of the field windings is changed by the mutual inductance with the stator windings. A sensor or the controller monitors the change in current on the field windings or the change in the inductive component.

Figure 5A:
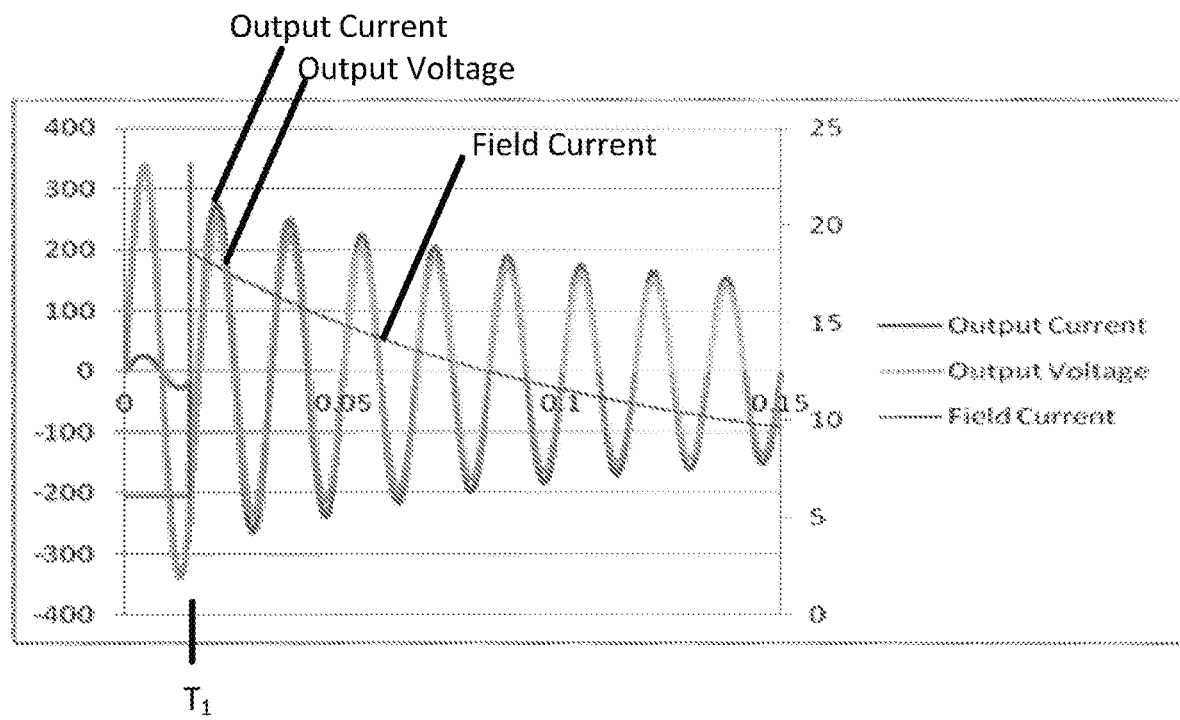
FIG. 5A represents a chart for an example transient response.
Figure 5B:
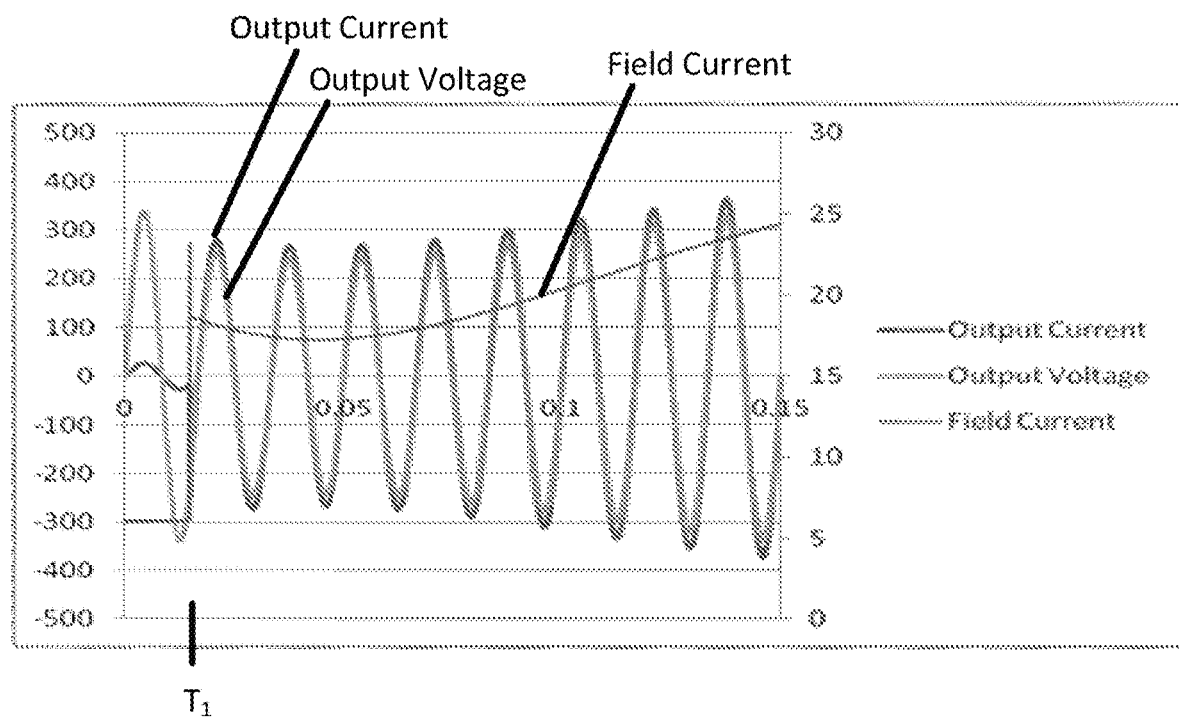
FIG. 5B illustrates another example chart for an example transient response.

FIG. 5A represents a transient response of the field current with respect to the output current; in the example, the field current is not adjusted in response to changes caused by the mutual inductance with the stator. FIG. 5B represents a transient response of the field current with respect to the output current voltage in the example that the field current is adjusted in response to changes caused by the mutual inductance with the stator.

FIG. 5A illustrates an example in which the field current is being controlled at a predetermined low level. The field current experiences a substantially instantaneous increase near $T_1$ to a much higher level. This increase is caused by an increase in load. Thus, the field current should be controlled higher. However, a controller (e.g., voltage regulator) that is controlling the field current to a predetermined low level, has not received any indication that the field current should be controlled higher. Therefore, the controller causes the field current to decay over time toward the predetermined low level, as illustrated in FIG. 5A. Eventually, the increased load may be communicated to the controller, which may increase the field current. However, this sequence requires significant time (e.g., at least one cycle or the time period for a new root mean square (RMS) value to be calculated for input into the voltage regulator). The detection and correction applied at the regulator, or rotor controller, may achieve a response time that is less that one electrical cycle of the alternator output voltage. In one example, the response time may be 100-1000 milliseconds.

FIG. 5B illustrates an example in which the field current can quickly adjust to load changes. When the load on the generator increases at time $T_1$, the controller receives an indication immediately. The indicator may be a sensor signal indicative of a change in current, voltage, or inductance and the field current that has been caused by the change in current of the stator windings. The controller immediately responds by adjusting the target field current. The field current is adjusted to reach the target current, as shown by FIG. 5B. Thus, the field current after $T_1$ is higher and closer to the target current in the example of FIG. 5B. The example of FIG. 5A tends to cause the field current to go down after the increased load, and the example of FIG. 5B tends to cause the field current to go up after the increased load.

A relationship between the current spike at $T_1$ and the target current may be a function of the flux linkage or the coupling factor in Equation 1 above. A unity coupling factor may not exhibit an initial change in voltage after the application of a load. The removal of a load behaves in a similar manner and may also be detectable by a sudden change in the field current.

Various types of generators may be used with the examples described herein. In one example, a brush-type generator supplies current to the field windings through brushes in contact with slip rings that rotate with the rotor. In this example, the current of the field windings may be detected on the rotor. The field current may be adjusted on the rotor or the field current adjustment may be communicated from the rotor back to the stator to adjust the source for the field windings. Alternatively, the stator current may be measured (FIG. 3B), and the field current adjustment is made at the source. In one example, the impedance of the field winding is measured through the brush.

In another example, the generator is a brushless generator, as shown in FIGS. 1 and 2. The brushless generator includes an exciter armature that rotates at the same speed with a common shaft with the rotor of the main generator. The field current is generated from the exciter armature; as the exciter armature rotates voltage in its coils is induced from exciter windings or permanent magnets. The sensor for detecting the field current response may be rotating with the exciter. The activator component may include the control and the sensor.

Figure 6:
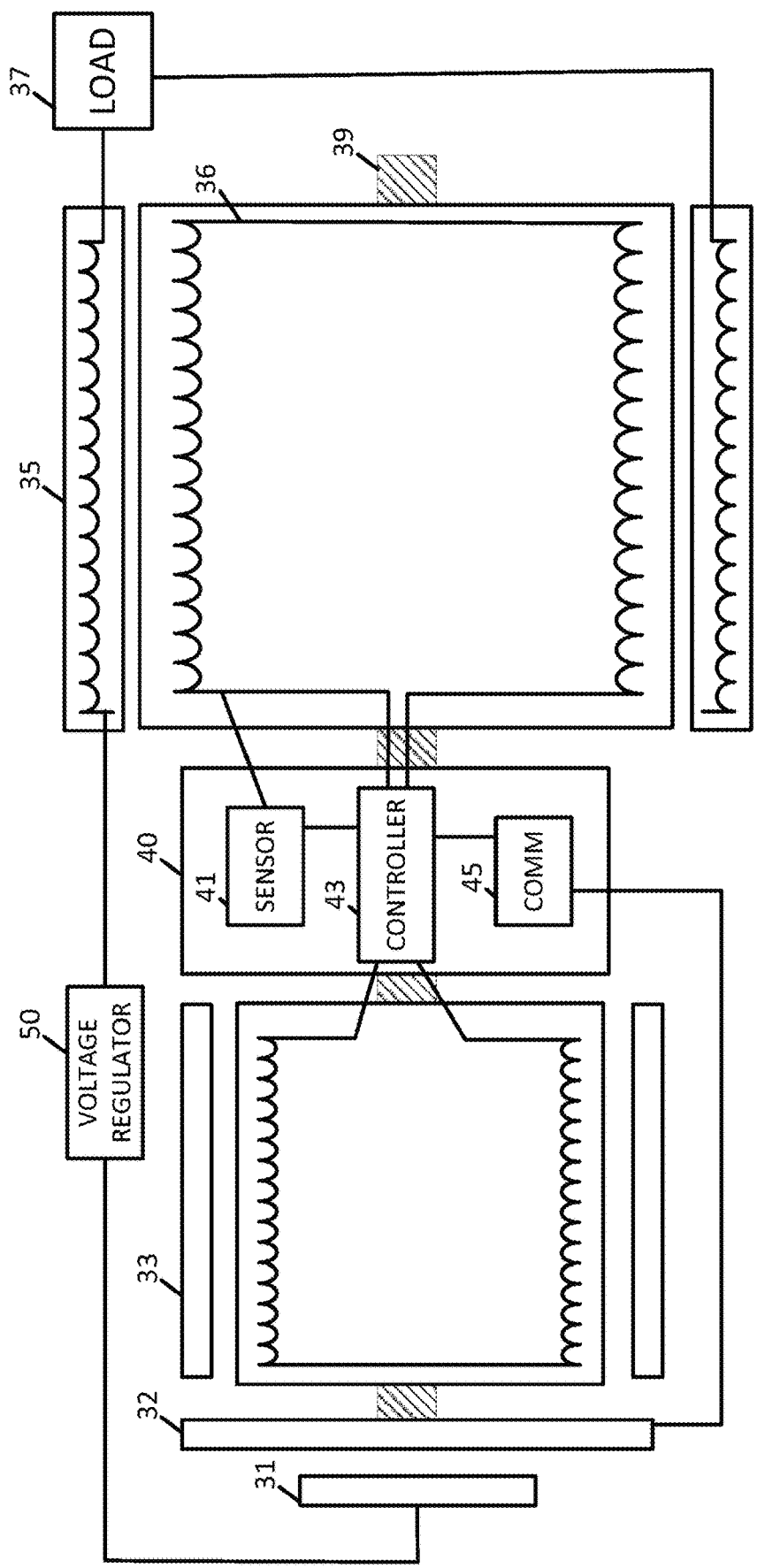
FIG. 6 illustrates an example rotor controller.

FIG. 6 illustrates an example of a synchronous generator with a permanent magnet exciter. The synchronous generator includes stator communication portion 31, a rotor communication portion 32, exciter field magnets 33, stator main windings 35, field windings 36, load 37, shaft 39, activator 40 (rotor controller), and voltage regulator 50 (stator controller). Additional, different, or fewer components may be included.

The activator 40 may include the sensor 41 and controller 43 described above for detecting and monitoring the field windings 36 in response to the current changes in the stator windings 35 from changes in the load 37. To adjust the field current the controller may adjust the current flowing from the exciter to the field windings.

The sensor 41 detects a change in an electrical characteristic of a field winding of an alternator. In one example, the sensor 41 is a voltage detection circuit or current detection circuit. In one example, a single device acts as the controller 43 and the sensor 41. That is an input signal to the controller describes the electrical characteristics of the field winding. The sensor 41 may also include a position sensor, a magnetic field sensor, a temperature sensor, a displacement sensor proximity sensor, a deflection sensor or an acceleration sensor.

The controller 43 may adjust a target field setting based on the change in the electrical characteristic of the field winding and generate a driving value for the field winding based on the target field setting.

In another example, the change in the stator main windings 35 is detected by the voltage regulator 50 and communicated through stator communication portion 31 to the rotor communication portion 32 using a photo-transistor and light source, magnetic communication, or using another method. The controller adjusts the field current in response to the signal from the voltage regulator 50. In yet another example, the voltage regulator 50 resides on the rotating controller 40 and the stator voltage is passed across the communication interface by magnetic, optical or radio communication.

Figure 7:
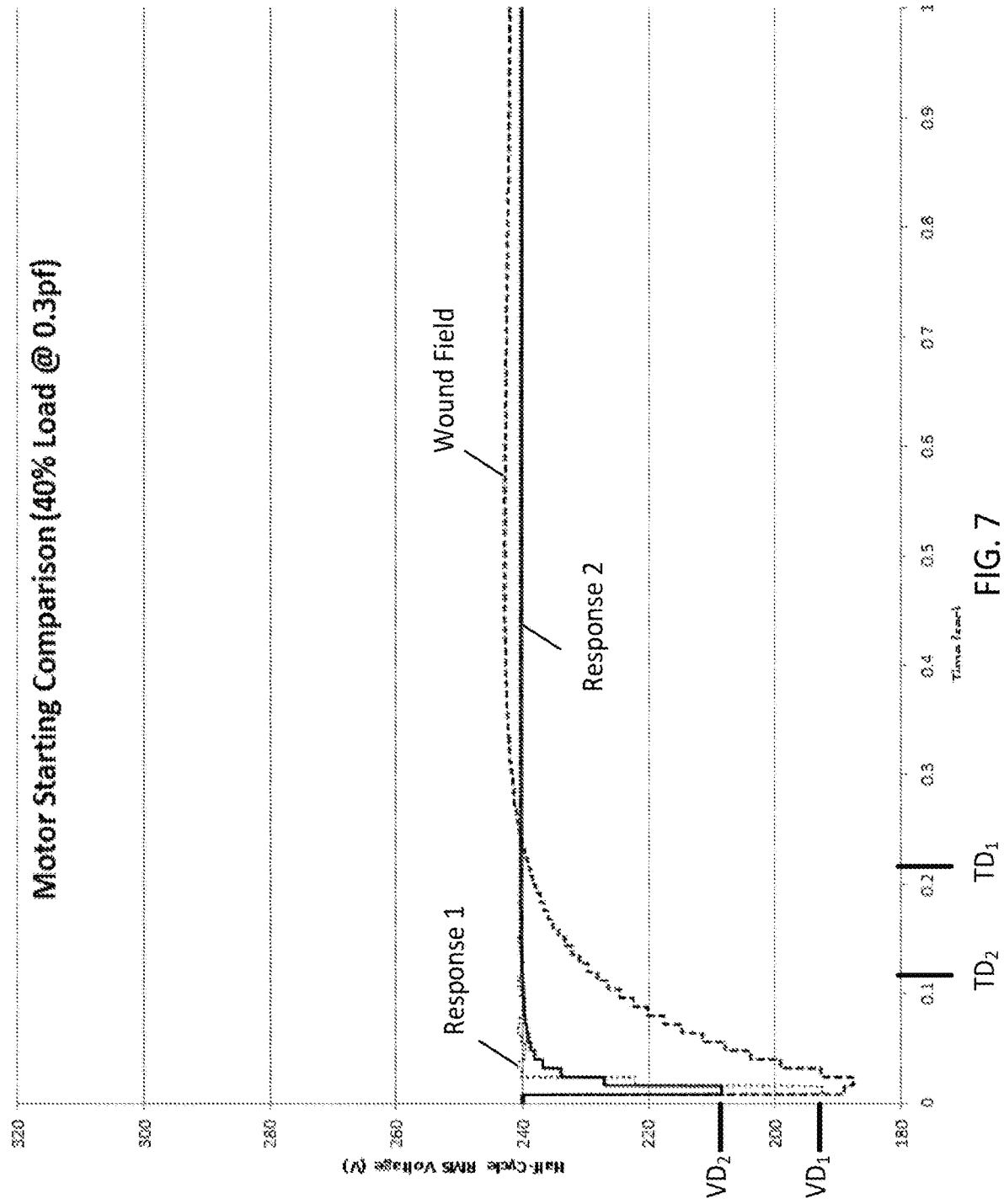
FIG. 7 illustrates an example chart for a transient response of the rotor controller at partial load.
Figure 8:
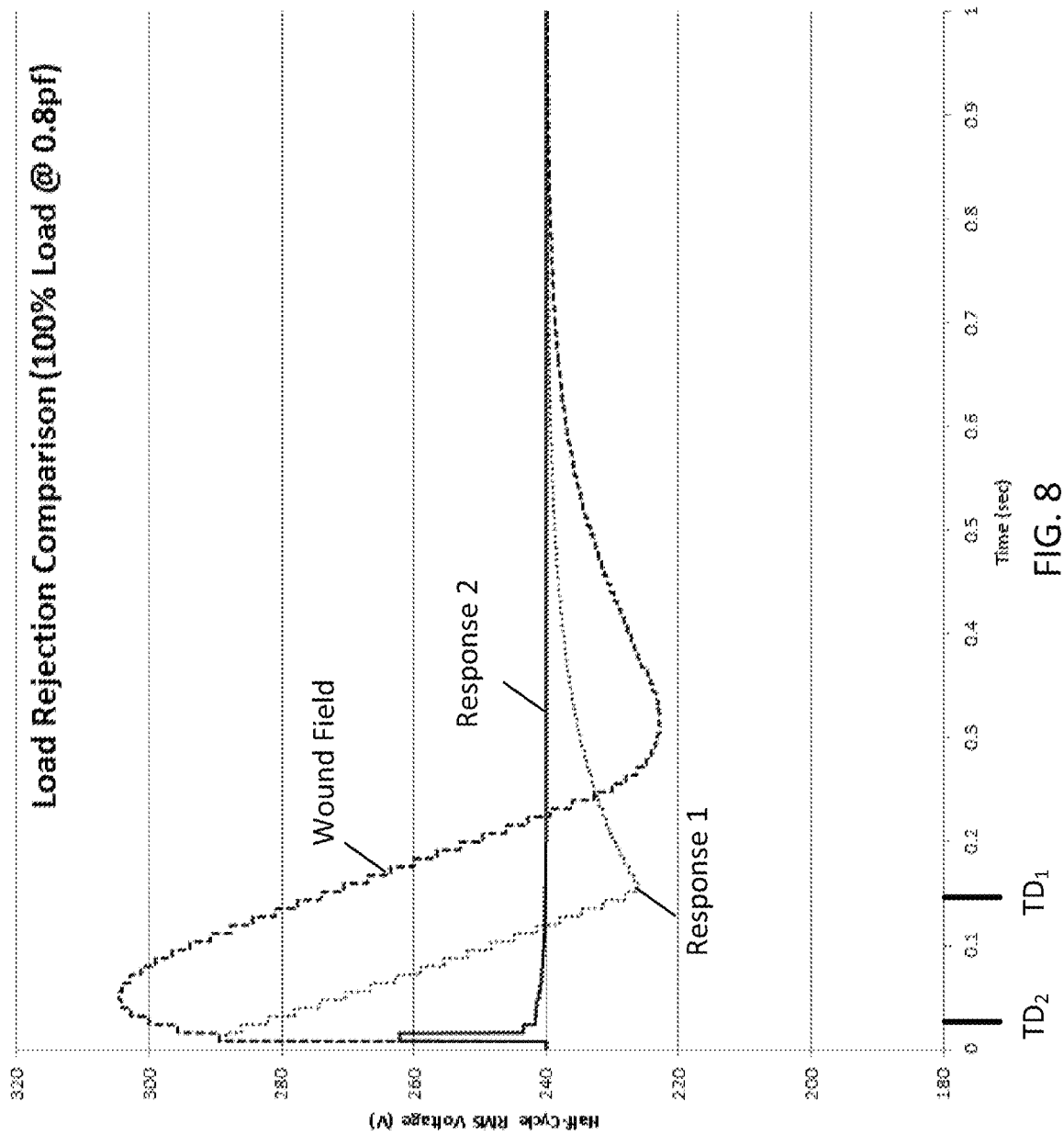
FIG. 8 illustrates an example chart for a transient response of the rotor controller at full load.

FIGS. 7 and 8 illustrate example responses of the above examples. The wound field line illustrates the change in the field current, when the voltage regulator controls the amplitude of the exciter field, driving the voltage on the exciter armature and feeding the main field through an uncontrolled rectifier. The response 1 line represents an example response time for adjusting the field current when the voltage regulator monitors engine speed and alternator output. The response 2 line represents the response time when the change in load is detected through the mutual inductance on the field windings in the examples above. The time delay ($TD_2$) for response 2 is significantly smaller than the time delay state ($TD_1$) for response 1. Example times for $TD_2$ may be 10-50 milliseconds.

The voltage dip for response 1 (VD1) is much more significant than the voltage dip for Response 2 (VD2) because the rotor controller applies voltage to the field much more quickly for Response 2, allowing the field current to increase more quickly. Similarly, the voltage overshoot for response 1 is significantly higher than the voltage overshoot for response 2 because the voltage driving the increase in field current is removed much more quickly. A typical voltage regulator response (response 1) time may be around 1-5 milliseconds (e.g., 3 milliseconds), while the change in load detection through mutual inductance (response 2) may be a magnitude less (e.g., in the range of 50-500 microseconds, or close to 100 microseconds).

Figure 9A:
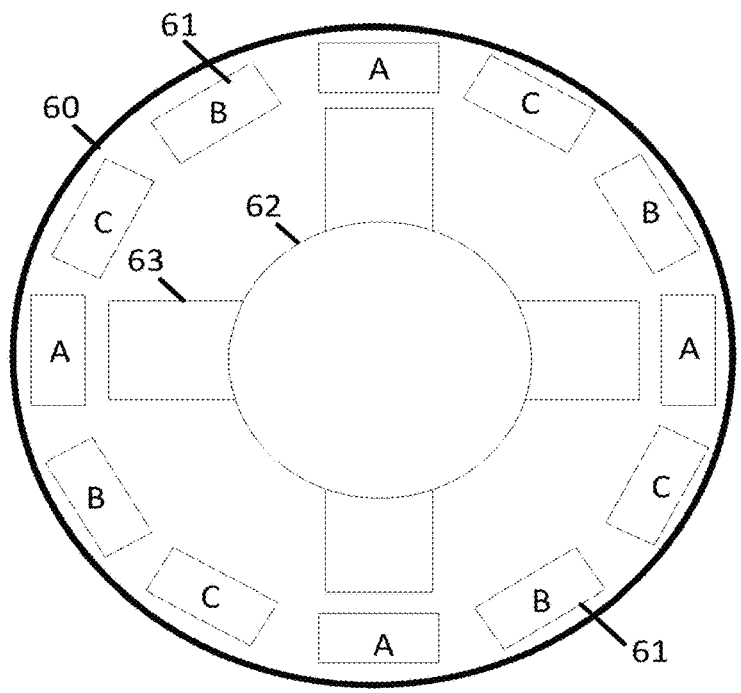
FIG. 9A illustrates an example three-phase rotor.

FIG. 9A illustrates another example generator. The generator includes a stator 60 including multiple windings 61 and a rotor 62 with rotor windings 63. The stator 60 and the rotor 62 may be an exciter portion of the generator or an alternator portion of the generator. Portions are omitted for ease of illustration. In three phase applications, the windings may be divided into a set for each phase. For example, FIG. 9A illustrates the windings for phase A, the windings for phase B, and the windings for phase C. In the three phase application, the phases cancel out because the windings are evenly distributed. That is, as the rotor turns, the magnets 63 are consistently coming into the vicinity of one coil and leaving the vicinity of another coil. Accordingly, the mutual inductance imputed on the rotor from the stator stays relatively constant. In addition, the impact on the current in the field windings stays relatively constant. The term relatively constant may mean within a predetermined range (e.g., 1%, 10, or 20%).

Figure 9B:
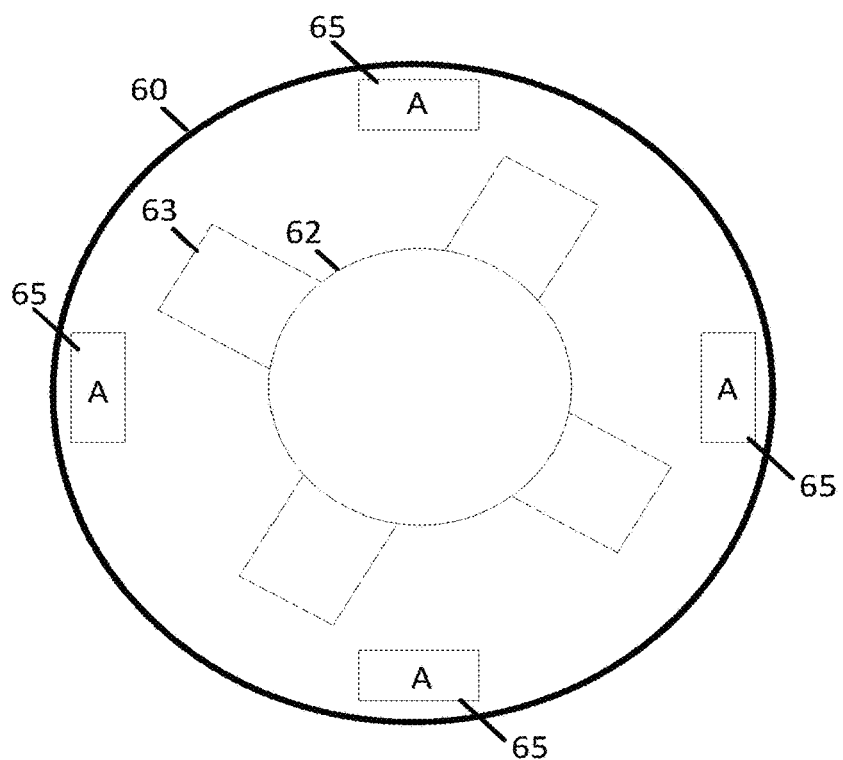
FIG. 9B illustrates an example single phase rotor.

However, in single phase applications, as shown by FIG. 9B, there is empty space between stator windings 65. This causes the rotor windings 63 to come in phase with the stator windings 65 and subsequently pass out of phase with the stator windings 65. Thus, a rotor in single phase applications does not consistently line up with the stator windings 65. There is a time when magnetic fields in the stator windings 65, but exert no (or very little) influence over the magnetic fields in the main rotor windings 63. Instead, the magnetic field pass through the air gap between poles, or when the stator winding 65 is halfway between two poles, it affects the two poles similarly, which cancels out.

Because of this phenomenon, the armature reaction, or the component of mutual flux on the rotor 62 from the stator 60, is variable. The armature reaction may reach a maximum value when the stator windings 65 are lined up with the rotor windings 63. The armature reaction incident on the main rotor windings may reach a minimum value when the rotor windings 63 are halfway between the stator windings 65. Because there is two maximum values and two minimum values for between each pair of stator windings 65, the field current may oscillate at twice the frequency of the output of the generator. For example, on a 60 Hz generator, the field current may oscillate at 120 Hz. The armature reaction varies based on the position of the rotor 62. So the current in the field windings is dependent on the phase of the rotor.

Figure 10:
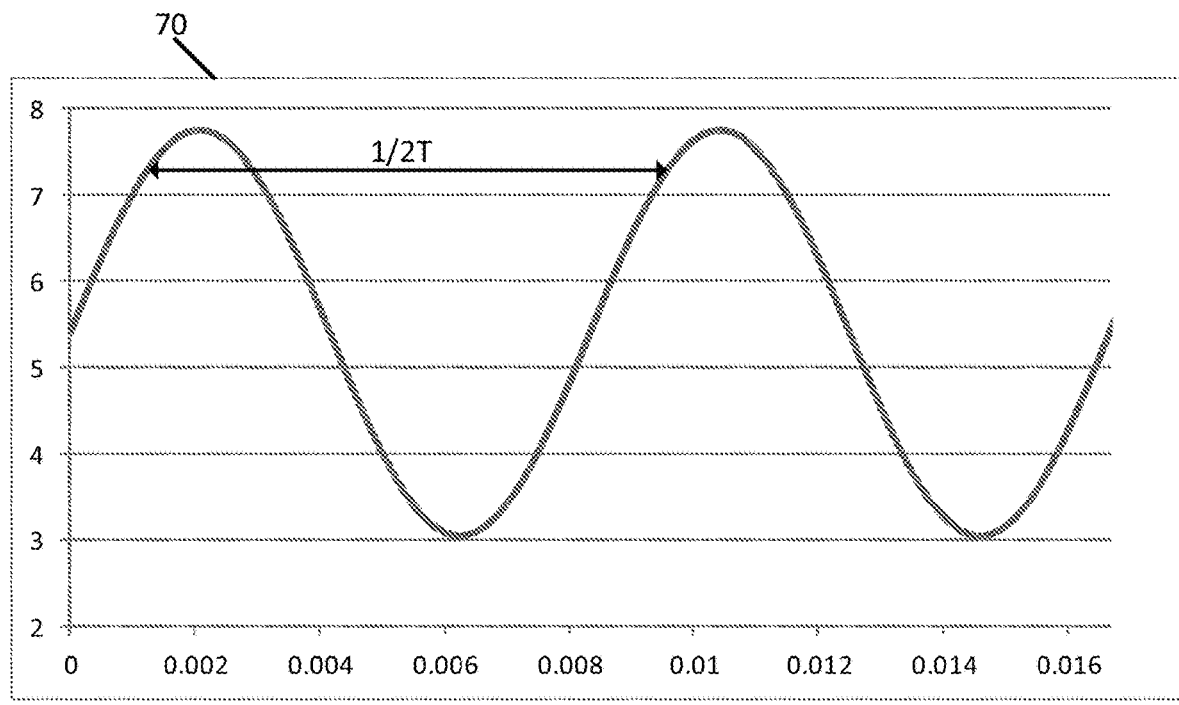
FIG. 10 illustrates an example plot for the single phase rotor of the FIG. 9B.

FIG. 10 illustrates a plot 70 for a field current in the single phase operation of the rotor in which the field current frequency is twice that of the output of the generator and the period is ½ the length of the period (T) of the output of the generator. When the rotor (e.g., the 4-pole rotor of FIG. 9) is in line with the single phase winding, the armature reaction has a maximum effect on the field current. When the rotor is 45 degrees separated, the armature reaction has a minimum effect on the field current.

The rotor controller 43 may adjust the load detection algorithm. The rotor controller 43 may measure the field current when there is full load on the output of the stator. The rotor controller 43 may generate a field current profile based on the full load measurements. The field current profile describes the oscillation of the phase current caused by the relative locations of the stator windings in the single phase alternator. The field current profile may include a series of current values. In one example, the field current profile may be scaled values (e.g., absolute values scaled from 0 to 1, or a ratio of absolute values to the average field current or a root mean squared value for the field current).

The rotor controller 43 may subsequently detect the field current when a load is placed on the alternator. The rotor controller 43 may access the field current profile and adjust the measured values for the field current according to the field current. In one example, the measured value is adjusted by the field current profile. The value in the field current profile may be added to or subtracted from the measured value. For example, at time $T_1$, the field current profile is at 1 amp. At that same T1 in a later cycle, a value of 2 amps is measured. The rotor controller 43 may subtract 1 amp from the field current profile from the measured 2 amp value to calculate a corrected field current.

The rotor controller 43 may calculate a load on the stator from the corrected field current. The rotor controller 43 may query a lookup table that associates field current with generator load. Multiple lookup tables may be used or values scaled based on model number, manufacturer, or physical characteristics. The lookup table may include a threshold value for the electrical characteristic of the alternator for multiple alternator models, manufacturers, or types. The regulator (or stator controller) may access the lookup table using the model, manufacturer or type and receive a threshold value for the change in electrical characteristic. The rotor controller 43 may calculate other electrical parameters such as output voltage, output current, output power, or other values.

The rotor controller 43 may calculate an adjustment for the field current based on the field current profile. The field current may be adjusted to counter the field current profile. For example, the field current is increased when values of the field current profile are lower than an average value and the field current is decreased when values of the field current profile are higher than the average value.

In another example, the field current profile may be used in a three phase application when only one phase is connected to a load. For example, when a three phase application has outputs A, B, and C, there may be no load coupled to phases B and C. Thus, phase A performs similar to a single phase application.

The generator may include a rotating exciter. Rotating exciters may include permanent magnets on the stator side of the generator and rotating coils on the rotor side of the generator. The stator core includes iron (e.g., steel), which has a high magnetic permeability. The high magnetic permeability causes an inductive component (e.g., reactance) in the current generated on the rotating exciter. The inductive component causes a voltage drop across the exciter windings. A reduction in the iron of the core leads to less of a voltage drop and accordingly, increases the efficiency of the generator.

Figure 11:
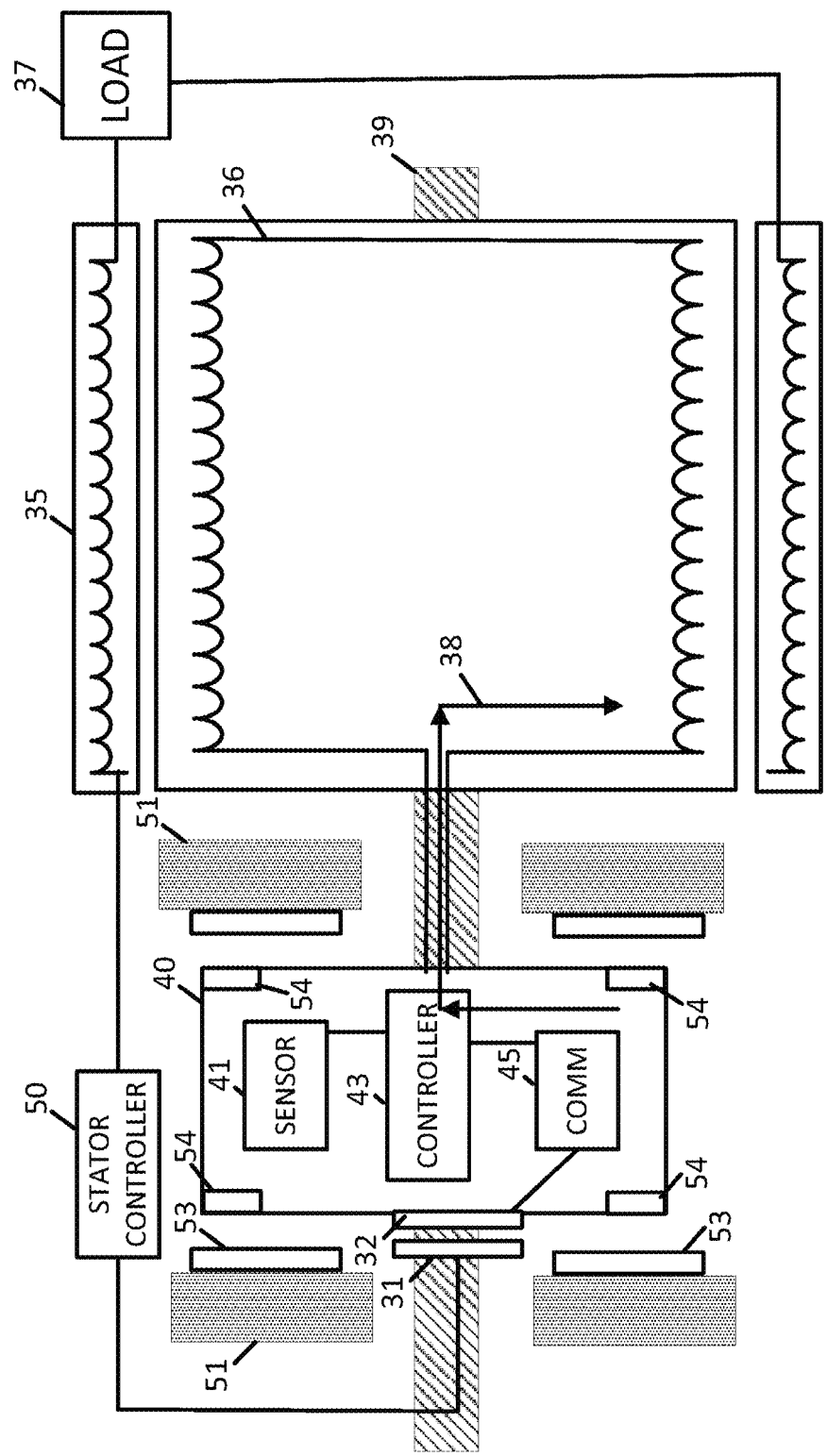
FIG. 11 illustrates another example rotor controller.

In one example, the exciter windings are provided by a printed circuit board (PCB) or PCB assembly. FIG. 11 illustrates an example rotor controller in a synchronous generator including stator communication portion 31, a rotor communication portion 32, stator main windings 35, field windings 36, load 37, shaft 39, a PCB assembly 40, a stator core 51, stator magnets 53, and a stator controller 50. Additional, different, or fewer components may be included.

The PCB assembly 40 may include circuitry and other electrical components for a rotor controller 43, a sensor 41, and a communication device 45. The PCB assembly 40 may include exciter windings 54 arranged radially out from the shaft 39. The exciter windings 54 may be coils of wire coupled to the PCB assembly 40. The exciter windings 54 may be windings or traces between two layers of PCB.

Integration of the exciter windings 54 and the PCB assembly 40 achieves several advantages. Because the exciter windings are integrated with the PCB assembly 40, the stator core 51 that supports the stator magnets 53 is moved to the plane in parallel with the plane of rotation of the PCB assembly 40. For example, the circuit board may contain traces arranged in concentric circles constituting coils to provide power to control the field current. The traces may also exist on multiple layers within the board and may be connected in series, parallel, or a combination of series and parallel. The board may include terminals to connect one or more wires to the printed circuit board. The wires may attach to sensors, transducers, switches the rotor field winding or other devices controlling an electrical characteristic of the rotor.

Because the armature traces reside on the printed circuit board, the armature reactance (caused by the permeability of the iron used to direct the magnetic flux through the windings) is much lower, decreasing the voltage drop under load and improving the efficiency of the generator. Less steel is used in the magnetic flux path for this arrangement. A reduction in steel means less reactance to cause a voltage drop across the exciter windings, which improves the efficiency of the generator. In addition, lower reactance of the exciter armature may decrease the switching time and switching losses in SCR switches or diodes used to control the rotor field current and serves to decrease inductive voltage spikes applied to an insulated-gate bipolar transistor (IGBT) or field effect transistor (FET) switches used to control the rotor field current.

In addition, the size of the generator may be reduced. The magnets, which are normally spaced radially around the exciter armature, are moved to be parallel to the plane of rotation of the exciter armature, as illustrated by FIG. 11. Thus, the exciter portion of the generator is greatly reduced in size, such as a decrease in the overall length of the alternator. Accordingly, the generator may be installed in a smaller size (e.g., smaller footprint), and storage and shipping costs are reduced.

Figure 12:
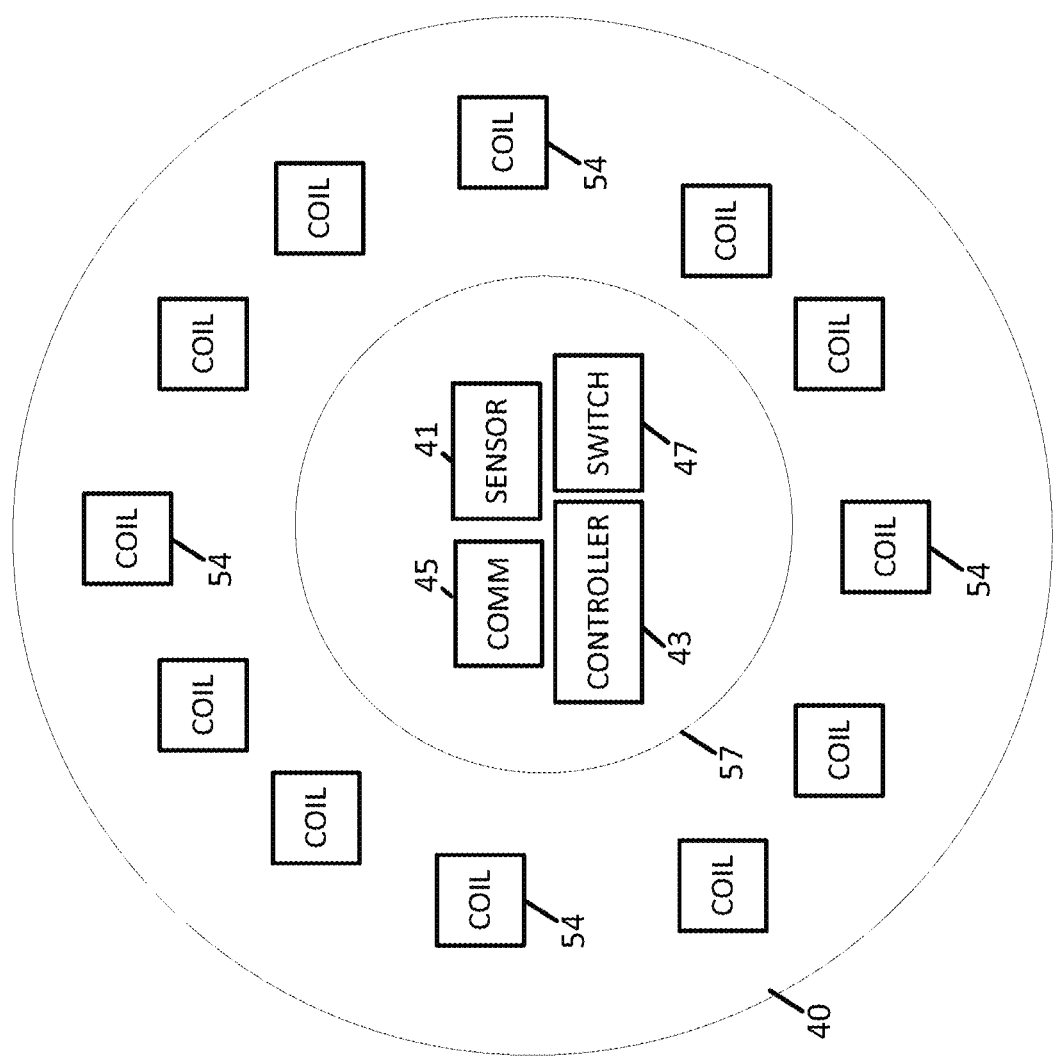
FIG. 12 illustrates an example circuit board of FIG. 11.

FIGS. 11 and 12 illustrates that the exciter windings are provided by the PCB in an axial air gap generator including a rotating set of windings and a stationary field. FIG. 11 includes an arrow 38 that illustrates power flow from the exciter windings 54 through the PCB and/or generator controller 43 along an electrical path parallel with the shaft 39 to the field windings 36 that induce a voltage in the main stator windings 35 for supplying power to the load 37.

Figure 13:
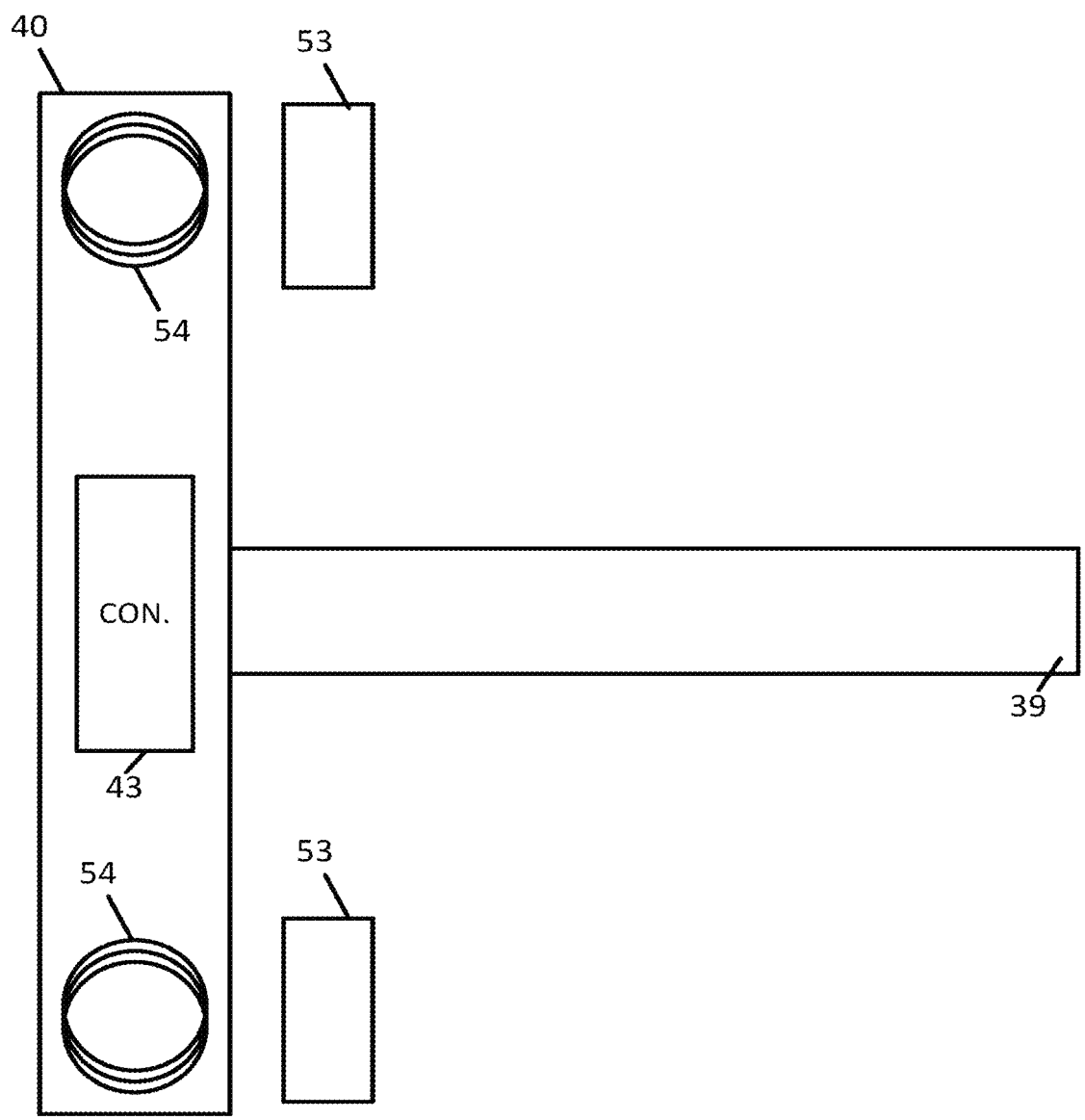
FIG. 13 illustrates an exciter with windings integrated with a printed circuit board.

FIG. 13 illustrates a more detailed view of an exciter portion of a generator including the stator magnets 53, the exciter windings 54 integrated with PCB assembly 40, the generator controller 43 and a shaft 39. The generator controller 43 may operate as described any of the other embodiments herein. Additional, different, or fewer components may be included.

The PCB assembly 40 is a rotating assembly that is mechanically connected to the shaft 39. The PCB assembly 40 rotates with the shaft 39 under a force from the engine. The generator controller 43 and the exciter windings 54 rotate with the PCB assembly 40. The generator controller 43 and the exciter windings 54 may be physically and electrically connected to a PCB also configured to rotate with the PCB assembly. The generator controller 43 may include at least one microprocessor. That is, the generator controller 43 may include more than a control circuit, for example, including transistors and/or diodes, and/or for conditioning an input signal. Instead, the microprocessor of the generator controller 43 is configured to analyze data and generate field current setting based on the change in the electrical characteristic of the field winding and/or adjust field current setting according to a field current profile. Alternatively, the generator controller 43 may be replaced with a control circuit including one or more diodes or other rectifying elements.

The PCB assembly 40 includes traces. Some of the traces may connect other components such as sensors and communication hardware to the PCB. Some of the traces may form the exciter windings 54 directly on the PCB. The shape of the exciter windings 54 may include concentric circles, rectangles, trapezoids to match magnet shape, or another shape. The exciter windings 54 may be formed from copper or another conductive material. The traces may exist on multiple layers of the PCB. The traces forming the exciter windings 54 are configured to induce a field current in response to magnetic fields of the stator magnets 53. The stator magnets 53 may be replaced with coils wound around a ferrous material or winding traces on another PCB, such as a stator PCB that is stationary. The stator PCB may include the same structure as PCB assembly 40.

The exciter windings 54 replace wound coils on an exciter armature, which may be made of iron or nickel and may have a significant mass. The rotor coils may be several to tens of times greater mass than the exciter windings 54 and the portions of the PCB that support the traces for the exciter windings. Therefore, the weight of the generator is reduced as well as corresponding costs. In addition, the exciter windings 54 may have a significantly lower size than exciter armature coils, potentially resulting in a smaller size of the generator.

The stator magnets 53 may include at least one magnet positioned, with respect to the PCB assembly 40, in a direction parallel to the shaft 39. The direction parallel to the shaft 39 may be substantially parallel to the shaft within a predetermined angle (e.g., 10 degrees). The direction parallel to the shaft 39 may be substantially parallel to the surface of the earth or perpendicular to the direction of gravity. In other embodiments, the direction parallel with the shaft may be substantially parallel to the direction of gravity.

More than one magnet may be included arranged radially. For example, the embodiment of FIG. 13 may include a radially arranged set of magnets that are positioned in a circle. In another example, more than one magnet may be included axially. That is, magnets may be positioned on opposite sides of the PCB assembly 40. The magnets may include a first magnet in the direction parallel with the shaft 39 and a second magnet, with respect to the PCB assembly 40, in a second direction opposite to the first direction.

The arrangement of magnets 53 and the exciter windings 54 may result in a smaller footprint or geometric space for the generator. In comparison to the radial air gap example in which the depth of the generator depends on the length of the magnets, the axial air gap machine with exciter windings 54 reduces the depth of the generator. The length of the at least one magnet 53 in a perpendicular direction perpendicular to the shaft 39 is greater than a width in the direction parallel to the shaft 39 of the rotating assembly.

The PCB with exciter windings may also reduce the inductance of the exciter armature. When using silicon controlled rectifiers (SCRs) or thyristors for control, the inductance of exciter armature may cause higher commutation losses. This problem may be exacerbated when FET control is used due to inductive spikes potentially causing a damaging avalanche condition. However, in these embodiments with the exciter windings 54 on the PCB, the decrease in the magnetic permeability of the PCB material relative to that of laminations made of silicon steel or other magnetic material increases the effective magnetic path length, which may reduce the inductance of the machine, potentially increasing the options for controlling the field. High frequency signals may also be used with reduced inductance. The lower inductance may result in lower heat rejection losses associated with the switching elements, which may enable a greater power output from the generator.

The generator controller 43 may be connected to a sensor such as a hall-effect sensor for detecting the magnetic field. The sensor may be sensor 41 as described in embodiments herein as configured to detect a change in an electrical characteristic of a field winding of the alternator.

Figure 14:
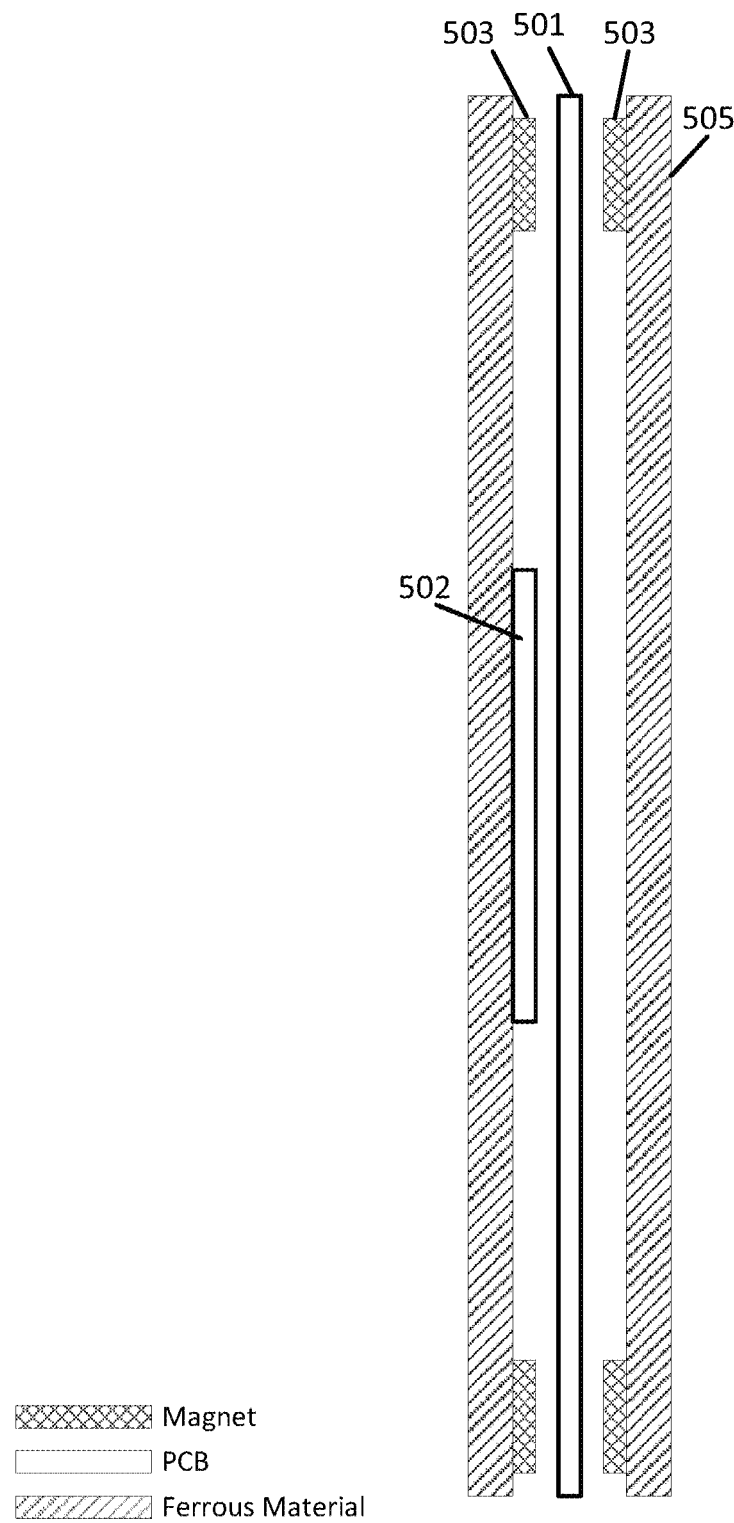
FIG. 14 illustrates a side view of axial embodiment with dual magnets.

FIG. 14 illustrates a side view of axial embodiment with dual magnets 503 around circuit board 501 and attached to ferrous material 505 of the stator. The dual magnets 503 include a first magnet in a first direction and a second magnet, with respect to the circuit board 501, in a second direction opposite to the first direction.

An additional communications device 502, such as a printed circuit board, optical transceiver, radio transceiver or transformer, provides communication between the rotor and the stator, such as between the generator controller 43 and circuitry at the stator (e.g., stator controller 50) or a system controller. The communications device 502 may be similar to communication device 45 described in embodiments herein. The communications device 502 may be a circuit board including one or more elements for optical communication, radio communication, and magnetic communication. The communications device 502 may include a light source (e.g., light emitting diode) and a photoreceptor, a transceiver for radio communication, or magnetic coils for magnetic communication.

Figure 15:
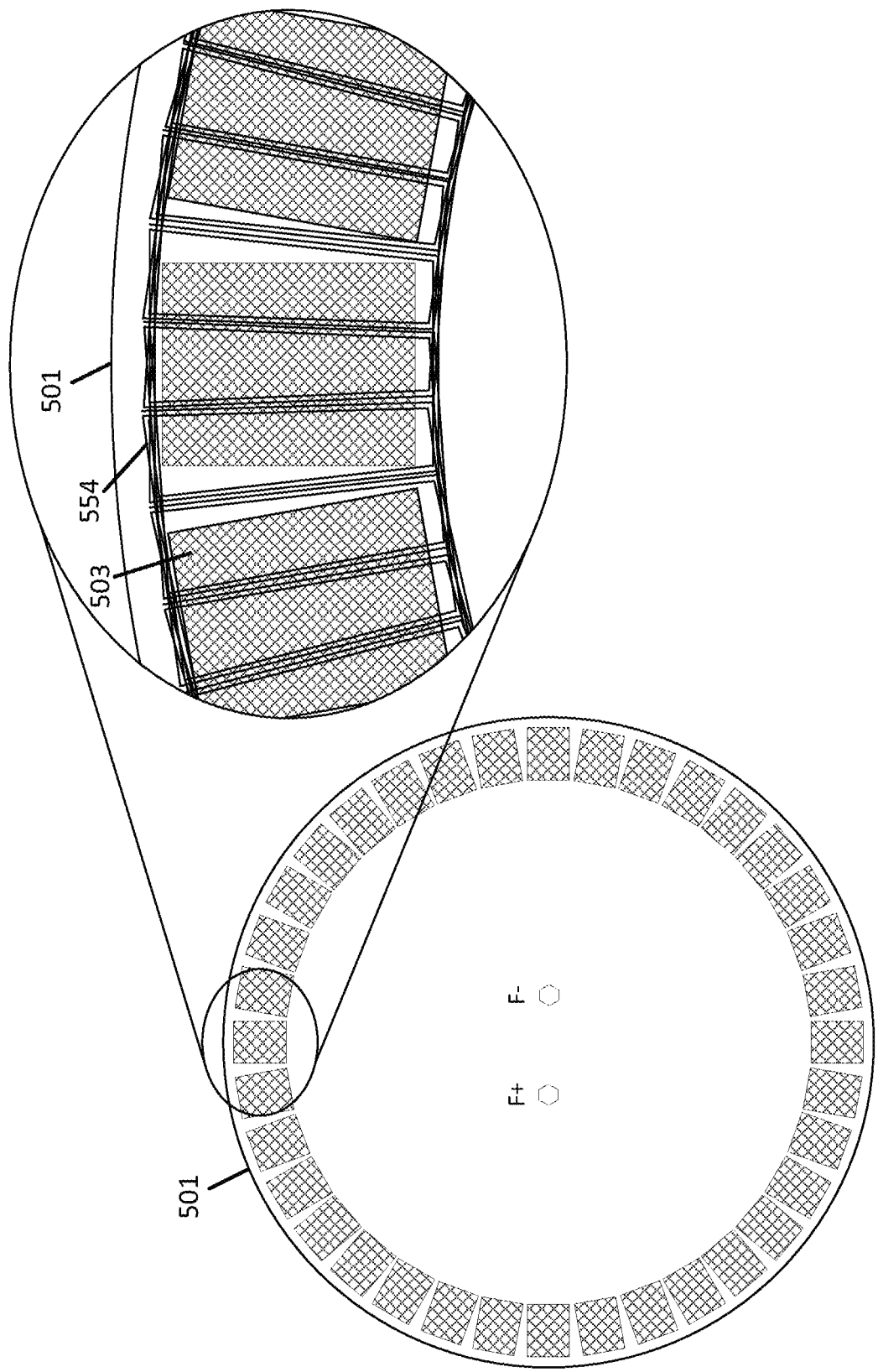
FIG. 15 illustrates an end view of the embodiment of FIG. 14.

FIG. 15 illustrates an end view of the embodiment of FIG. 14. The end view illustrates the overlap between the magnets 503 and the exciter windings 554. The overlap is in the radial direction and viewed in the axial direction in FIG. 15. Any individual magnet 503 may overlap exciter windings 554 for each of the three phases, but in different proportions or at different times as the rotor shaft turns. Turning of the rotor shaft moves the 3-phase windings 554 relative to each of the magnets 503, providing time-varying voltage between the coils in a repeating sequence.

F+ and F− illustrate the connection locations to the main rotor field winding. F+ represents the positive output to the field windings. F− represents the negative output to the field windings. They are located toward the center of the PCB assembly 501 in order to allow connection of wiring to the main rotor field at a minimum distance from the support shaft of the rotor. Embodiments are contemplated where the F+ and F− connections may be present anywhere on the PCB assembly 501.

Figure 16:
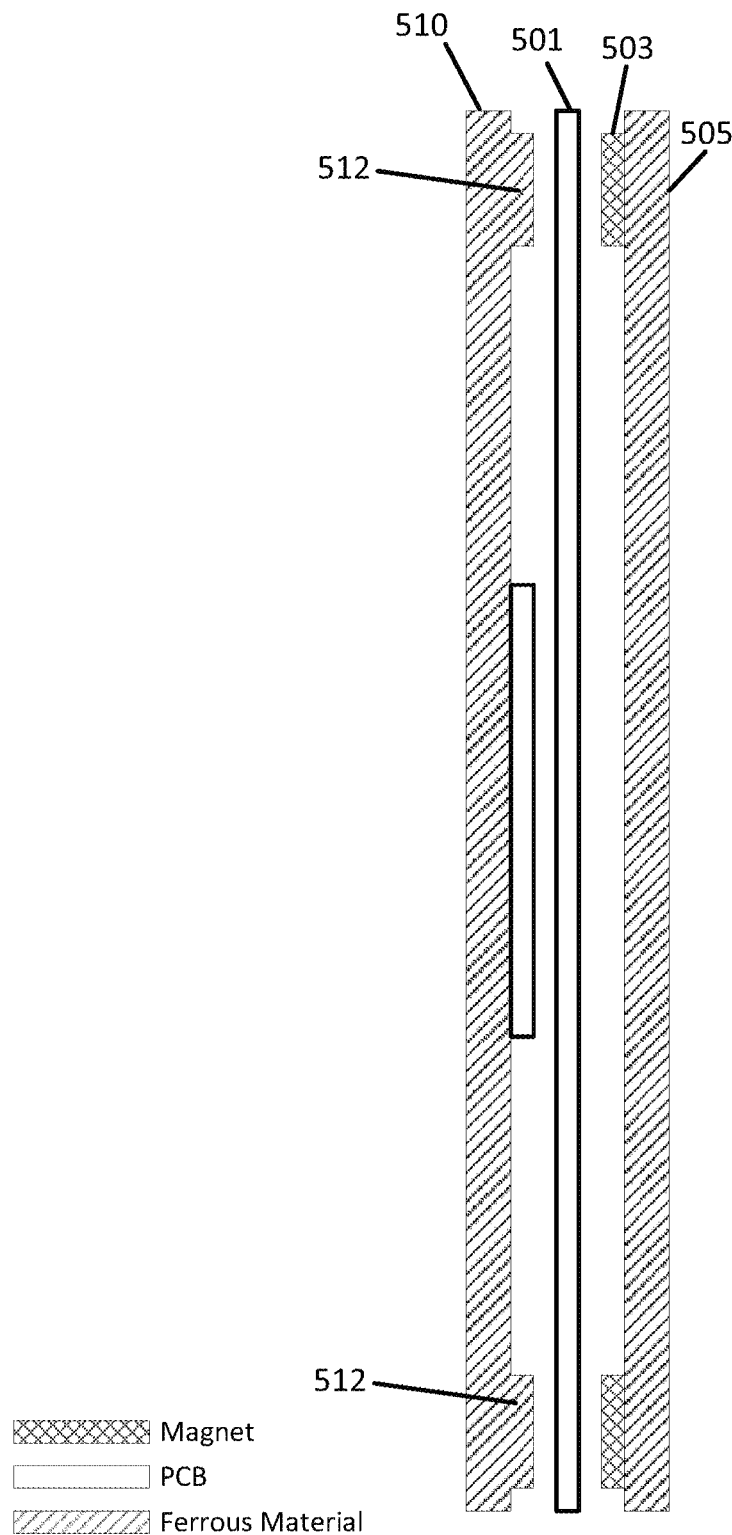
FIG. 16 illustrates a side view of a flux shaping embodiment.

FIG. 16 illustrates a side view of a flux shaping embodiment. In this example, one side of the side stator with respect to circuit board 501 includes a first stator component of ferrous material 505 and magnet 503 attached, and the other side of the stator with respect to the circuit board 501 includes a second stator component including a flux shaping component 512. The flux shaping component 512 provides a low-reluctance path for the magnetic flux generated by the permanent magnet 503, shaping the flux to follow a similar path to the flux path if it were a magnet. This embodiment may provide similar performance to the application where the flux shaping component 512 is replaced with a permanent magnet at a lower cost, lower time to assemble, increased temperature resistance, or other benefits.

Figure 17:
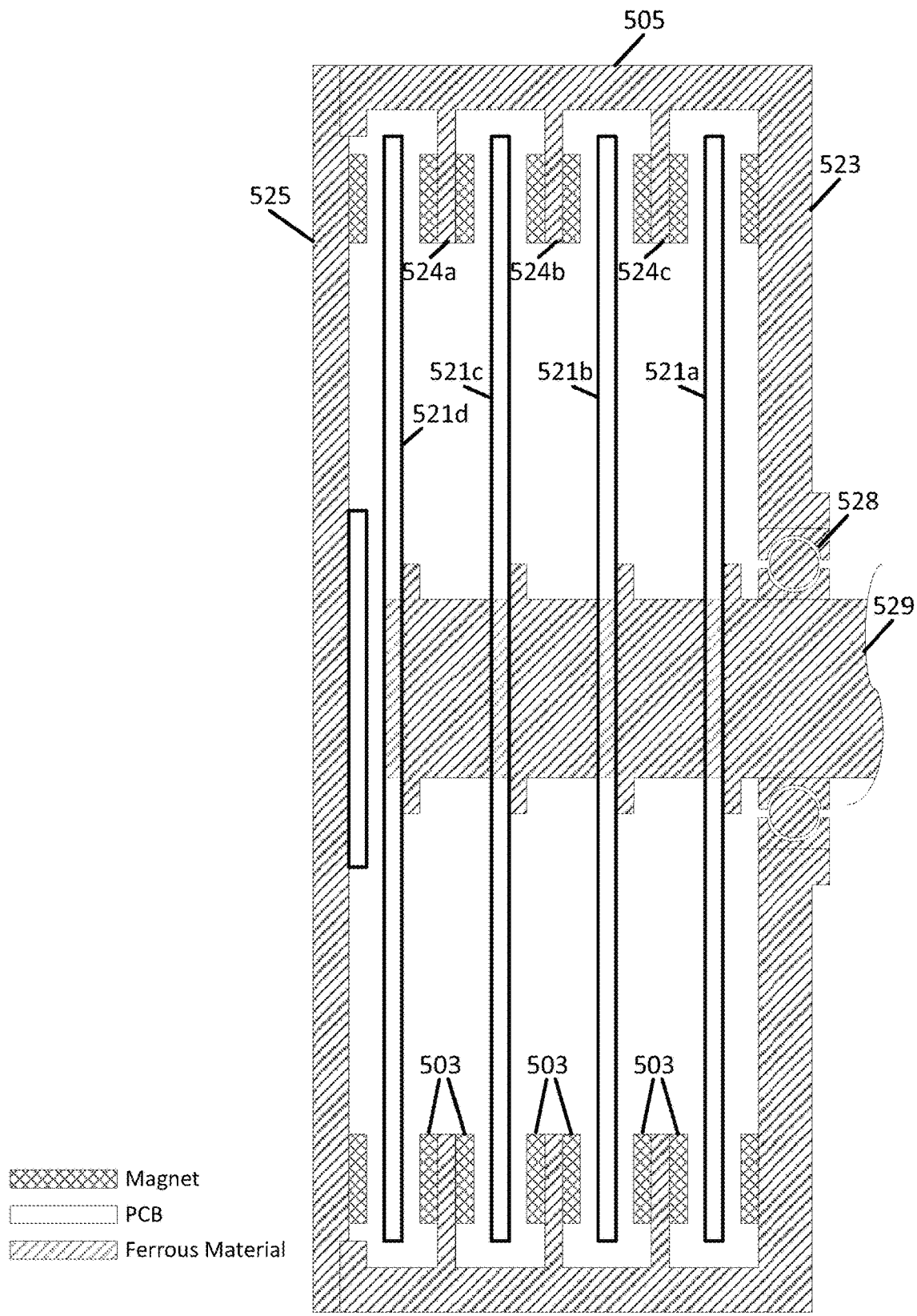
FIG. 17 illustrates a side view of an embodiment with multiple printed circuit boards.

FIG. 17 illustrates a side view of an embodiment with multiple printed circuit boards. In one embodiment, three printed circuit boards are included and spaced apart in an axial direction. Each of the three printed circuit boards may correspond to a different phase. As illustrated in FIG. 17, four printed circuit boards 51*a-d* may correspond to a single phase printed circuit board and three printed circuit boards for the three phase applications.

As another example referencing FIG. 17, the four printed circuit boards 521*a-d* may be identical boards. The four printed circuit boards 521*a-d* may be controlled by a single controller on one of the printed circuit boards 521*a-d*, each of the printed circuit boards 521*a-d* may be controlled by its own controller or processor, all of the printed circuit boards 521*a-d* may be controlled by an external controller. Other configurations of controllers and printed circuit boards 521*a-d* are also contemplated.

The printed circuit boards 521*a-d* rotate with respect to the ferrous material 505, which may make up an outer plate 525 and an inner stator housing 523. Extending from the inner stator housing 523 are one or more magnet mounts 524*a-c*. The example of FIG. 17 includes three magnet mounts 524*a-c*, each having a pair of magnets 503 attached thereon. The outer plate 525 and the inner stator housing 523 also are attached to a magnet 503. Thus, each of the printed circuit boards 521*a-d* is between a pair of magnets 503. The printed circuit boards 521*a-d* rotate under a mechanical connection to shaft 539. The shaft 539 may be supported by the inner stator housing 523 through a bearing 528, which allows the printed circuit boards 521*a-d* and the shaft 539 to rotate with respect to the stator.

In the example, in which the printed circuit boards 521*a-d* correspond respectively to each phase of a three-phase generator, the exciter windings may be arranged a predetermined angle out of phase with each other. Example predetermined angles include 120 degrees or 90 degrees. The arrangement of the exciter windings may be distributed across the printed circuit boards 521*a-d* such that temperature is distributed between the windings. That is, the printed circuit boards 521*a-d* space apart the exciter windings such that heat dissipated by the exciter is kept below a threshold level. The threshold level may be selected to prevent damage to the printed circuit boards 521*a-d* or other parts of the alternator and to prevent disruption of the output of the alternator. The printed circuit boards 521*a-d* may be spaced apart according to a minimum distance (e.g., 1 millimeter, 10 millimeter, or another value). The windings on the printed circuit boards 521*a-d* may be placed on both sides of the printed circuit boards 521*a-d*. The windings on the printed circuit boards 521*a-d* may be placed on internal layers of the printed circuit boards 521*a-d*.

In order to provide 3-phase output power, the printed circuit boards 521*a-d* may be designed to provide electrical phase separation between the windings when connected to the rotor shaft. The printed circuit boards 521*a-d* may be identical with the electrical phase separation provided by an angular offset in connection holes on the rotor shaft. The printed circuit boards 521*a-d* may be identical with the electrical phase separation provided by an angular offset in placement of the permanent magnets 503 on the inner stator housing 523.

In the example of FIG. 17 the printed circuit boards 521*a-d* are spaced apart in the axial direction by a predetermined distance. The predetermined distance may be ½ centimeter to 3 cm. The printed circuit boards 521*a-d* may be spaced apart by a smaller distance, for example, by an insulating substance or film, a plastic sheet, or one or more spacers. In one example, the printed circuit boards are not spaced apart. The printed circuit boards 521*a-d* may be touching one another and/or attached to one another by adhesive.

Figure 18:
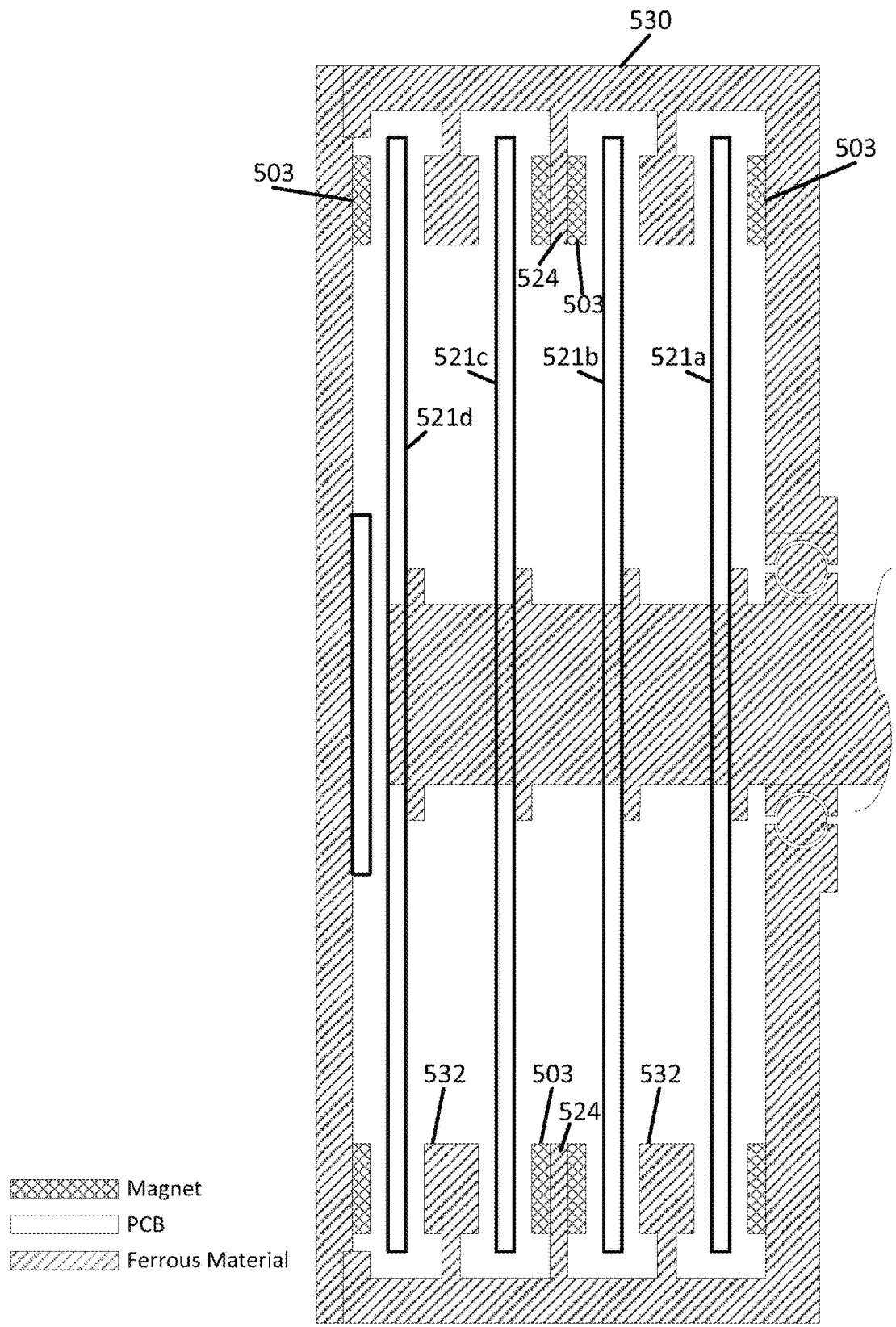
FIG. 18 illustrates a side view of an embodiment with multiple printed circuit boards and flux shaping.

FIG. 18 illustrates a side view of an embodiment with multiple printed circuit boards and flux shaping. In one example illustrated by FIG. 18, the flux shaping stator housing 530 contains a magnet-placing ring 524 to attach permanent magnets 503 circumferentially around an inner perimeter of the flux shaping rotor housing. The flux generated by the permanent magnets 503 is shaped to follow a defined path by reduced magnetic reluctance based on the geometry of flux shaping elements 532.

The flux shaping elements 532 may provide a lower reluctance path to shape the flux to form flux lines that continue through the entire assembly parallel to the shaft. The flux shaping elements may provide a lower reluctance path to shape the flux to form local flux loops that circulate through each printed circuit board 521a-d. The flux shaping elements 532 may shape the flux to provide a phase offset of the flux through each printed circuit board 521a-d, providing an effective electric machine skew or phase offset between printed circuit boards 521a-d representing discrete phases.

In reference to FIGS. 17 and 18, the stator housing 505 and the flux shaping stator housing 530 may be assembled of separate parts or a single piece. The stator housing 505 and the flux shaping stator housing 530 may be solid or provide air space. The stator housing 505 and the flux shaping stator housing 530 may be symmetrical or asymmetrical.

In addition, the embodiments illustrated in FIGS. 17 and 18 are not restricted to rigid connections of the printed circuit boards 521a-d to the rotor shaft. Spring force may be applied to the printed circuit boards 521a-d to press against a thrust bearing providing axial positioning for the boards when the rotor position varies.

Figure 19:
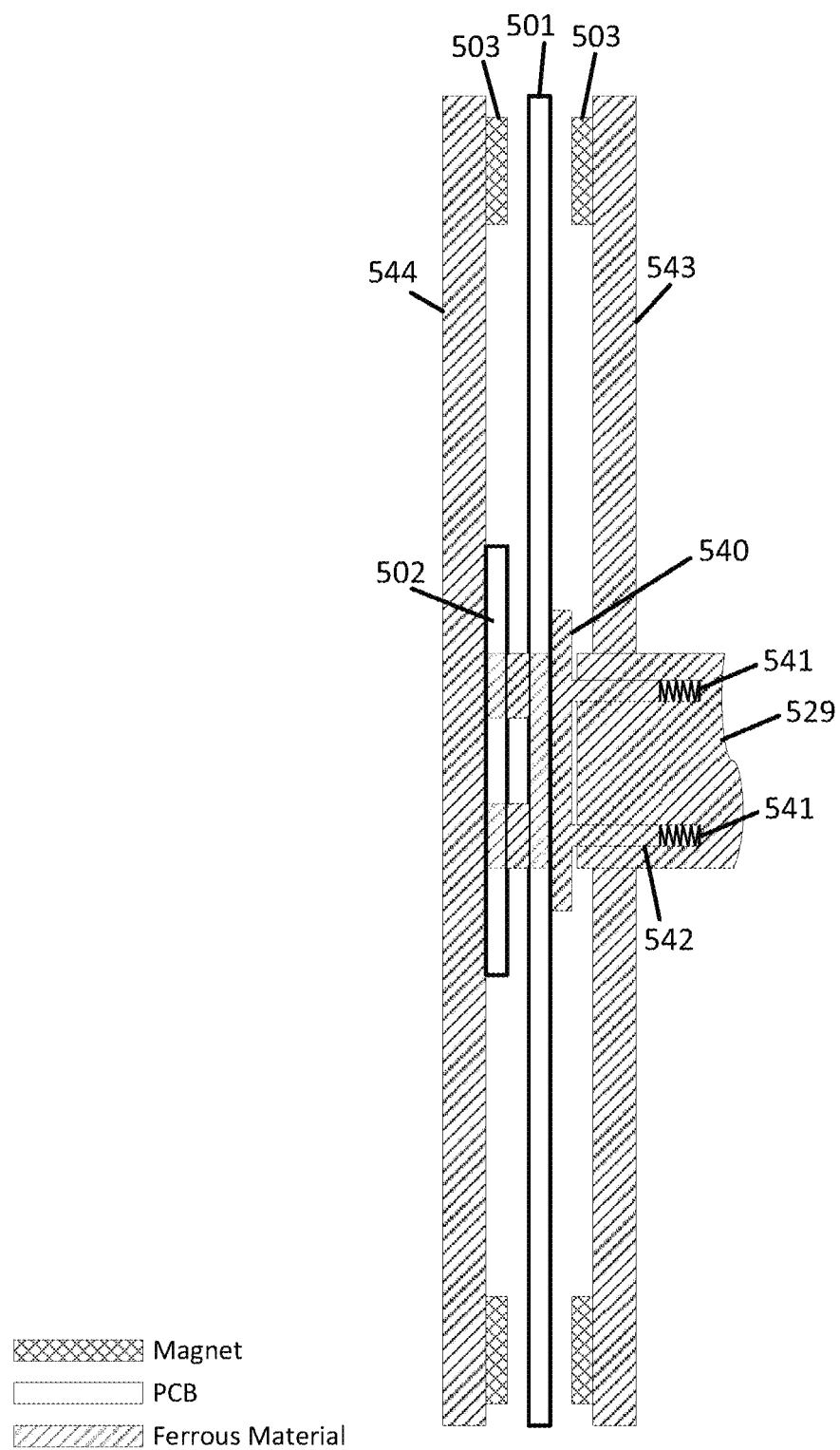
FIG. 19 illustrates an example exciter portion of a generator including a printed circuit board movable with respect to the rotor shaft.

FIG. 19 illustrates an example exciter portion of a generator including a printed circuit board 501 movable with respect to the rotor shaft 529 to position the printed circuit board 501 between a rear portion (first portion) 543 of the stator housing and a forward portion (second portion) 544 of the stator housing. The position of the printed circuit board 501 may be maintained by an axial support 540 movable relative to the rotor shaft 529. Additional, different, or fewer components may be included.

The printed circuit board 501 may maintain a clearance from the stator surfaces (e.g., the first portion 543 of the stator housing and a second portion 544 of the stator housing) to prevent damage to the printed circuit board 501 or other components. In addition, the distance between the printed circuit board 501 to the stator surfaces is constant to improve performance. The printed circuit board 501 may be positioned in substantially the center between the first portion 543 and the second portion 544. The improved performance may be achieved by allowing the printed circuit board 501 to move axially relative to the rotor shaft 529. Thus, undesired axial displacement of the axial machine is avoided.

The axial displacement of the rotor shaft 529 may be caused by various factors including axial tolerance stackup related to assembly of alternator, axial displacement of the rotor shaft due to cogging forces and skew of the rotor, variations in shaft length due to temperature, variations in stator house length due to temperature, and/or magnetic displacement forces due to skew in the exciter machine or imperfect PCB placement in the air gap among other factors.

In one example, the printed circuit board 501 is physically connected to a movable axial support 540. The movable axial support 540 may include a torque transfer device 542 that moves axially with respect to the rotor shaft 529 to provide an axial freedom of movement with respect to the rotor shaft 529. The movable axial support 540 is an example of a means for the printed circuit board to move in a direction parallel to the rotating shaft 529. Alternatively, the torque transfer device 542 is an example of a means for the printed circuit board to move in a direction parallel to the rotating shaft. In another alternative, the combination of the movable axial support 540 and the torque transfer device 542 is a means for the printed circuit board to move in a direction parallel to the rotating shaft. The axial direction may be defined as parallel to the rotor shaft 529 and/or perpendicular to the direction of gravity or perpendicular to the plane of rotation of the generator. The torque transfer device 542 may include floating pins that are mated with the rotor shaft 529 and move relative to the rotor shaft. The space between the floating pins and the rotor shaft 529 may include a grease or other lubricant.

The exciter windings 54 are placed on the printed circuit board 501 and are positioned between two magnetic flux supplies. One of the flux supplies may be associated with the rear portion 543, and the other of the flux supplies may be associated with the forward portion 544. The flux supplies may be magnets 503 on each of the rear portion 543 and the forward portion 544, flux shaping elements 532 on each of the rear portion 543 and the forward portion 544, one magnet 503 for the rear portion 543 and flux shaping element 532 for the forward portion 544, or one magnet 503 for the forward portion 544 and flux shaping element 532 for the rear portion 543. In addition, the rear portion 543 and/or the forward portion 544 applies a force against the printed circuit board 501 via the axial support 540. The rear portion 543 and/or the forward portion 544 are referenced to the same mechanical point as the magnetic flux sources including the magnet 503 and/or the flux shaping element 532.

FIG. 19 illustrates springs 541 for applying the force between the rotor shaft 529 and the printed circuit board 501. The force provides alignment against the fixed member (e.g., bearing associated with the shaft 529). The size and/or placement of the springs 541 may define the spacing for the printed circuit board 501. The spacing for the printed circuit board 501 may be adjusted by a mechanical switch by the user. In the alternative to connection with the bearing, one or more springs 541 may be applied to an end bracket, a housing, or a cover through a bearing associated with the rotor shaft 529. In another embodiment, a pneumatic force may be applied to the printed circuit board 501 by an external air pump or integral cooling fan for the field current control switches.

The pneumatic force may be controlled by a controller such as controller 43 that generates a pump command or fan command that adjusts the position of the printed circuit board 501. The position of the printed circuit board 501 may be determined by an additional sensor, such as a Hall Effect sensor, or inferred from other system characteristics, such as the voltage amplitude or wave shape generated on the windings on the PCB 501.

The pneumatic force may be provided by design of tolerances and air flow rate such as to generate a pressure. The pressure may increase if the PCB is closer to the surface and decrease as the PCB moves away from the surface, providing positional stability by design. The pneumatic force may be provided by pressurizing a chamber at the end of the rotor shaft 529. The pneumatic force may be caused by boundary layer surface viscosity between the PCB and the other surface. The pneumatic force may be caused by a pressure or an absence of pressure (vacuum).

In another embodiment, a magnetic force may be applied to the printed circuit board 501. The printed circuit board 501 may include a magnetic force receiving portion including a ferrous material secured to the printed circuit board 501 or a set of coils secured to the printed circuit board 501.

The set of coils may be used to control the location of the printed circuit board 501. A magnetic sensor in communication with the controller 43 may detect the coils. In one example, the individual coils provide a signature that identifies the coils and relative position of the coil which indicates the position of the printed circuit board 501. The controller 43 receives data indicative of a coil or a coil signature and determines the position of the printed circuit board 501. For example, a lookup table may associate coil signatures with different angles that describe the rotation of the printed circuit board 501. The controller 43 may generate a command for the generator in response to the position of the printed circuit board 501.

Alternatively, the data indicative of the coil may represent the axial position of the printed circuit board 501. The controller 43 may adjust the current through the coils in order to adjust the force on the printed circuit board 501 and adjust the axial position of the printed circuit board 501. The axial position of the printed circuit board 501 may be adjusted according to the speed of the generator, the environment of the generator, or a user instruction. In either of these radial positioning or axial positioning examples, the coils used for positioning may be the exciter windings 54.

Figure 20:
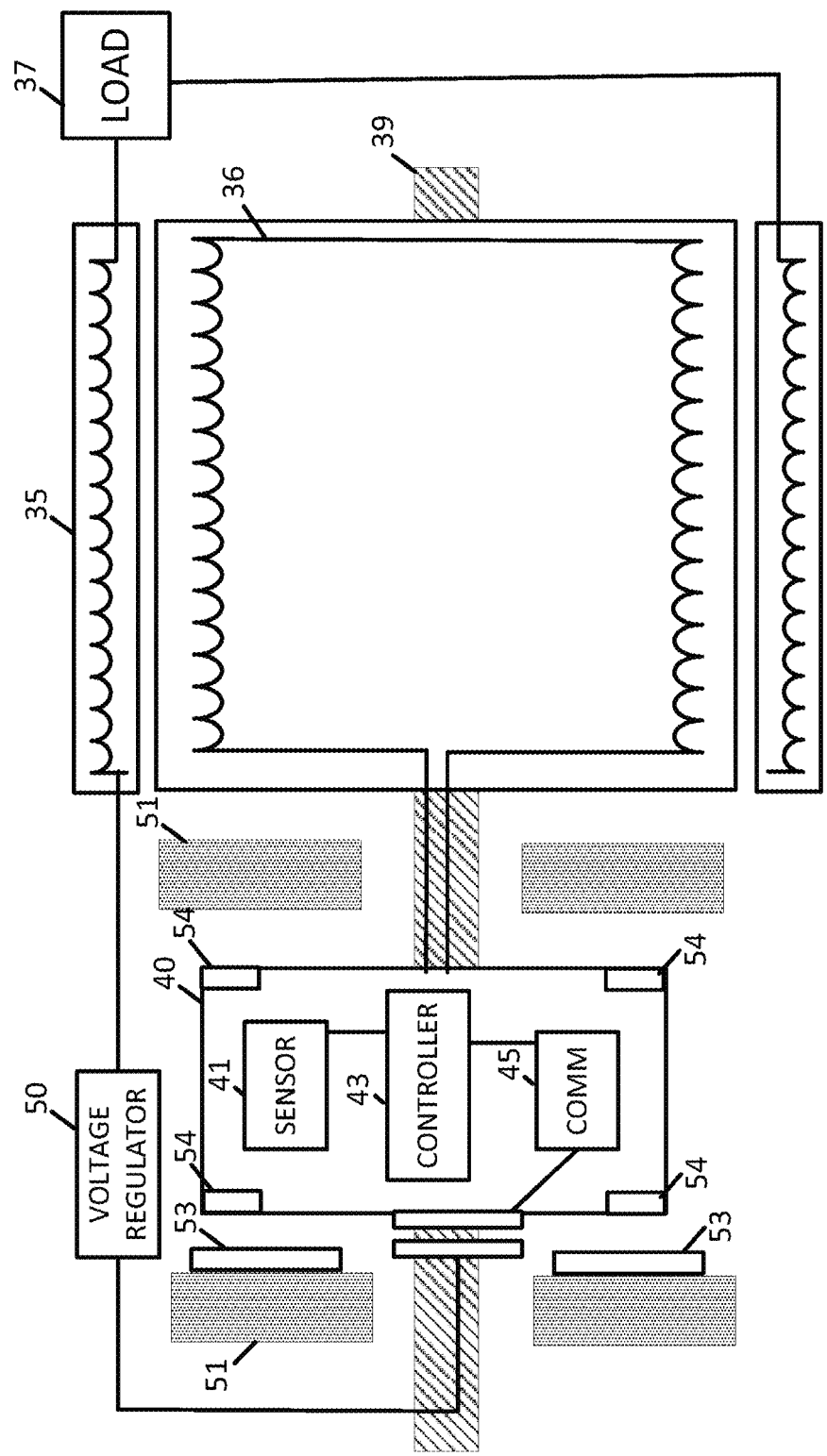
FIG. 20 illustrates another example rotor controller.

FIG. 20 illustrates an example construction of the PCB assembly 40. The PCB assembly may include a circuit board 57 separated from the exciter windings 54. The circuit board 57 may include the rotor controller 43, the sensor 41, one or more switches 47 to control the field current, and the communication device 45. The circuit board 57 may be physically spaced from the exciter windings. For example, a non-conductive spacer (e.g., rubber or plastic) may be mounted between the circuit board 57 and the exciter windings 54. The non-conductive spacer may include one or more through holes for passing wires or conductive leads from the circuit board 57 to the exciter windings 54.

FIG. 20 illustrates another example rotor controller. In the example of FIG. 20, potential design alternatives are shown. For example, the magnets 53 may be omitted from the stator on one side of the PCB assembly 40. The iron in the other side of the PCB assembly may provide a path to complete the magnetic flux path for the flux produced by the permanent magnets. The magnetic flux may continue to flow though the board in a similar fashion with magnets 53 on a single side of the PCB. In addition, the magnets 53 may be placed such that only the magnets 53 oriented in a given direction (i.e., north, south) are included and the flux is directed through the PCB using the iron around the magnets 53.

In addition, the corresponding one or more stator magnets 53 may also be omitted. Thus, magnetic flux may flow in FIG. 19 from the from the stator magnets 53 on the left side of the PCB assembly 40 through the exciter windings 54 and to the stator core 51 on the right side of the PCB assembly.

Figure 21:
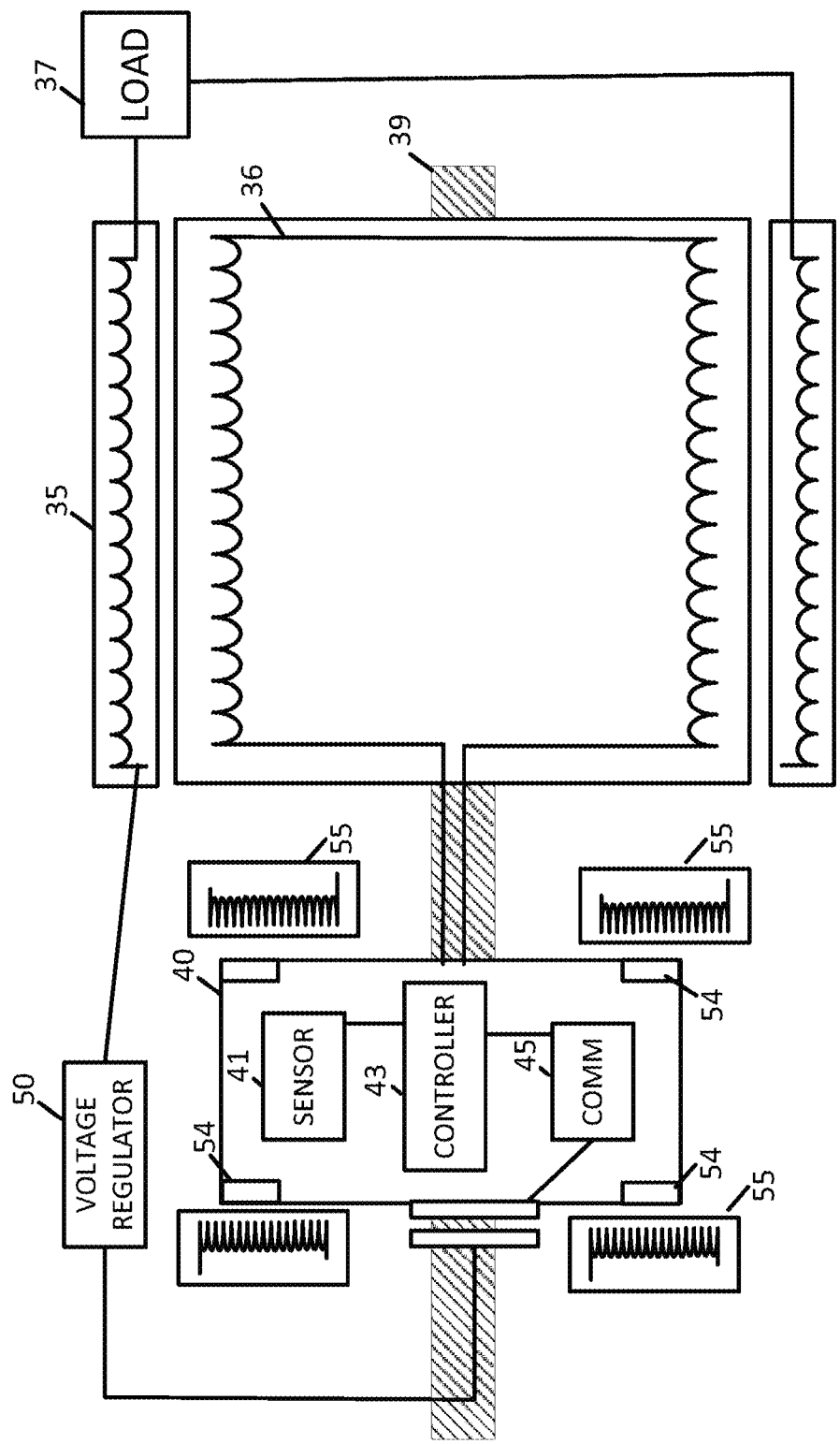
FIG. 21 illustrates another example rotor controller.

FIG. 21 illustrates another example rotor controller. In the example of FIG. 21, the stator magnets 53 may be replaced with coils 55. As shown, coils 55 are used on both sides of the PCB assembly 40. In one implementation, coils 55 are used on one side of the PCB assembly 40 and stator magnets 53 are used on the other side of the PCB assembly 40. Less stator coil material may be used with these implementations.

Another advantage realized with the stator magnets 53 or stator coils 55 are located in the plane parallel to the plane of rotation of the exciter or PCB assembly 40 is that a risk of complications with the power electronics due to switch shorting in the diodes is reduced. Switch shorting occurs when an inductive source is commutated into a load using a single-directional device (such as a diode or an SCR). The current flowing into the inductive load will continue to flow from a given source output until the current through the inductance of the source decays to 0, but the current will start flowing through a different path as it decays, resulting in a short-circuit on the output of the source until the switching occurs.

Figure 22:
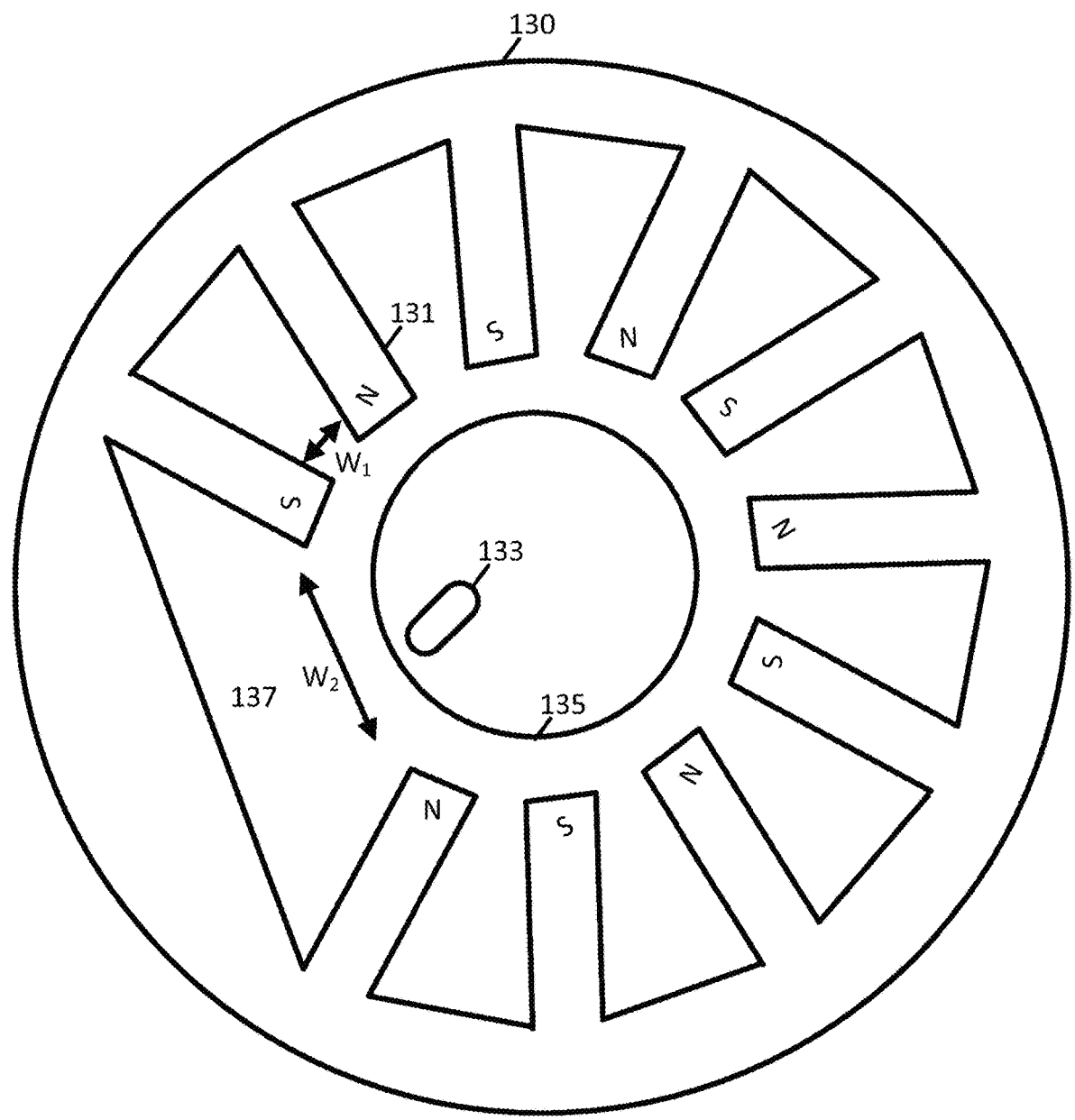
FIG. 22 illustrates an example arrangement of magnets for rotor position.

FIG. 22 illustrates a stator 130 and an exciter armature 135. The stator 130 includes an arrangement of irregularly spaced stator magnets 131. The illustrated example includes ten magnets of alternating polarity, but any number or any even number of magnets may be used. The exciter armature 135 includes a pickup coil 133, in addition to the other components discussed herein, including the coils for generating the current that supplied a DC bias to the field windings of the rotor. A majority of the magnets are spaced at a first interval $W_1$. At least one pair of the magnets are spaced at a second interval $W_2$. The second interval may be substantially greater (e.g., 2 times, 3 times, or more) or substantially less than (e.g., ½, ⅓ or another fractional amount) the first interval. In the example of FIG. 21, the second interval is at least three times the first interval. A pickup coil 133 on the exciter armature rotates within the ring of stator magnets 131. The pickup coil 133 detects the magnetic flux of the passing magnets and identifies a rotation position of the second interval in the stator magnets.

The pickup coil 133 may be a wire or trace on a circuit board (e.g., PCB assembly 40). As the stator magnets 131 pass the pickup coil 133, the magnetic field in the vicinity of the pickup coil 133 is disrupted, which causes a current to be induced in the pickup coil 133. The pickup coil 133 is connected to a controller (e.g., controller 43), which monitors the current in the pickup coil 133.

Figure 23:
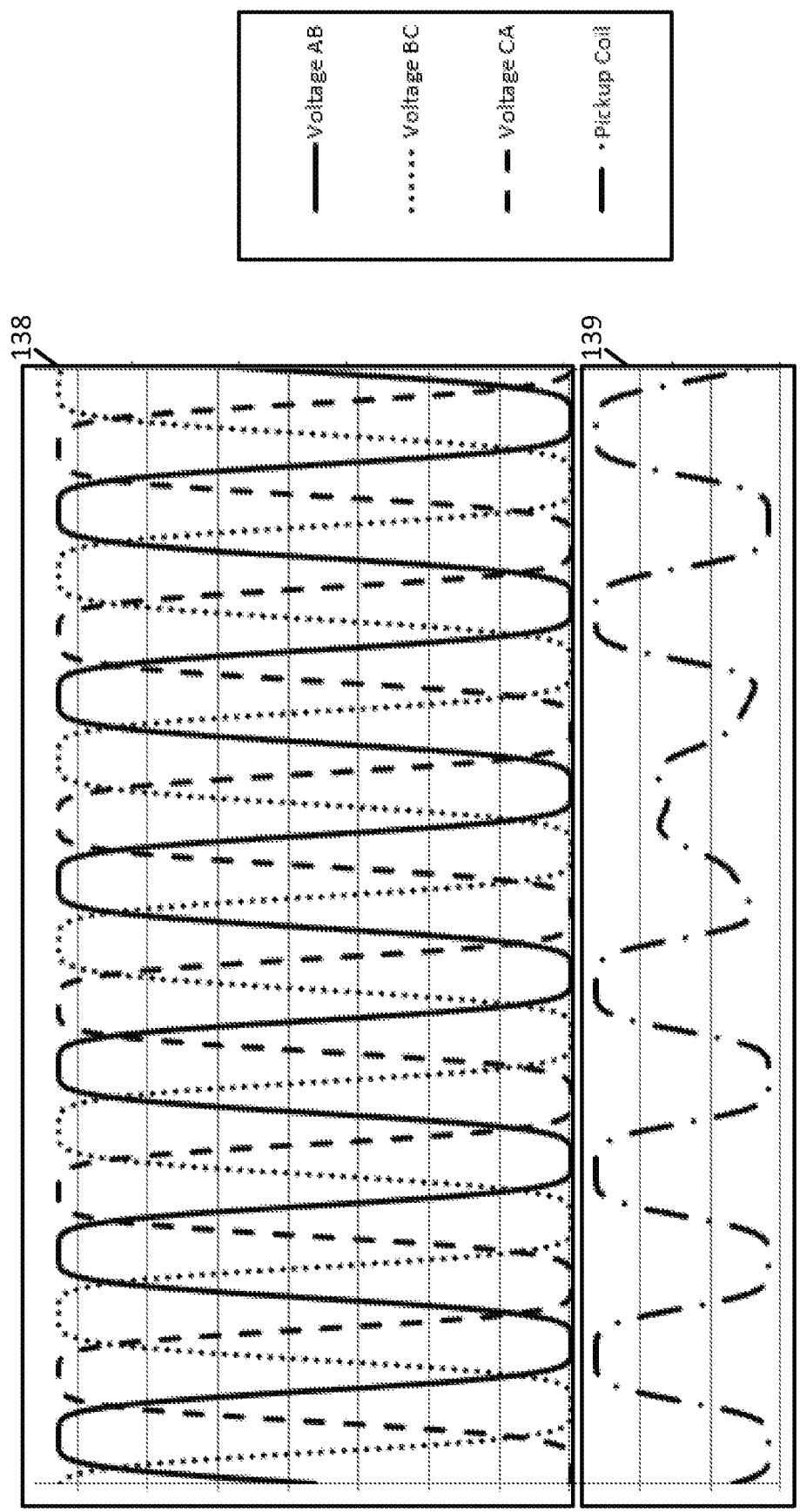
FIG. 23 illustrates an example plot of a trigger for the example of FIG. 22.

FIG. 23 illustrates an example plot current in the pickup coil 133. An output portion 138 of the plot illustrates three phases of the output of the generator. The output portion 138 may be an AC waveform of the output of the alternator, which may have multiple components or phases, which may voltage AB, voltage BC, and voltage CA. A pickup coil portion 139 of the plot illustrates the output of the pickup coil 133. The pickup coil output is sinusoidal and a substantially constant period as the pickup coil 133 passes the regularly spaced magnets spaced apart by the first interval $W_1$. When the pickup coil 133 passes the irregularly spaced magnets and the second interval $W_2$, the sinusoidal pattern is disrupted.

The disruption of the sinusoidal pattern may be detected by the rotor controller 43. The output of the pickup coil 133 may be a trigger signal that is triggered when the irregular space or home position passes the pickup coil 133. A communication interface may receive the trigger signal from the pickup coil 133. The rotor controller 43 may detect the trigger signal from the pickup coil 133 of based on output voltages, output currents, output power, or output timing. The rotor controller 43 may monitor the output of the pickup coil 133.

In one example, the rotor controller 43 compares a period of the output of the pickup coil 133 to a threshold period. The threshold period may be passed on the first interval $W_1$. When the period of the output of the pickup coil 133 exceeds the threshold period, the rotor controller 133 determines that the irregularly spaced magnets have been passed or that the rotor is at a home position. The home position may be any particular angle, and the rotor controller 43 makes calculations based on the home position. In one example, the rotor controller 43 compares the output voltage from the pickup coil 133 to a threshold. When a peak of the output voltage from the pickup coil falls below the threshold for a preset amount of time, the rotor controller 43 identifies that the irregularly spaced magnets have been passed or that the rotor is at the home position.

The communication interface or the rotor controller 43 may receive data indicative of an output of the generator. The rotor controller 43 performs a phase analysis of the trigger signal and the output of the generator. The rotor controller 43 may determine when the output of a particular phase crosses a predetermined output level (e.g., 0 volts). The rotor controller 43 compares the time when the particular phase crosses the predetermined output level to the time when the output of the pickup coil 133 is at the home position.

The rotor controller 43 may calculate a power angle for the generator based on the phase analysis. The power angle may be the phase difference between the output of the pickup coil 133 and the output of the generator. The power angle is the angle between the rotating magnetic flux in stator and rotating magnetic flux in the output.

In one example, the rotor controller 43 queries a lookup table with the power angle for the generator and receive a power value from the lookup table. The lookup table may be stored in a memory coupled to or integrated with the rotor controller 43. The lookup table may be tailored to a particular model of generator or alternator, a particular manufacturer of generator or alternator, or a particular type of generator or alternator. The lookup table may be created based on testing. That is, the lookup table may be created from measured power angles for known output levels.

When there is no load on the generator the delta is zero because the rotating magnetic flux in stator and rotating magnetic flux are in line. As more power is provided to the load, there is a torque on the engine, and the angular distance between the rotor and stator increases. The lookup table may associate the power angle to one or more electrical parameters such as output power. The lookup table may extend from 0 to a maximum number of degrees. The maximum may depend on the particular generator. Example maximums may be 20 to 30 degrees.

The power value may be indicative of an output of the generator or the exciter based on the power angle. The rotor controller 43 may compare the power value to one or more threshold values. One threshold value may be indicative of an error condition of the generator. For example, the generator is experiencing a malfunction which causes the power angle to deviate from an expected value. In response, the rotor controller 43 may generate a safety signal in response to the power value exceeding the threshold level. The rotor controller 43, or stator controller 50, may perform a function in response to the safety signal. The function may cut the power supply to the field windings. The function may turn off the engine that drives the rotor.

The rotor controller 43 may modify the output of the exciter or the output of the generator. For example, the rotor controller 43 may control the output of the exciter based on a target value. When the power value exceeds the threshold level, the rotor controller 43 may modify a target value for the generator in response to the power value exceeding the threshold level.

The rotor controller 43 may perform load balancing in response to the power value exceeding the threshold value. The rotor controller 43 may generate a load balance signal in response to the power value exceeding the threshold level. The load balance signal may be sent to the stator controller 50 or a system controller for a set of parallel generators. The stator controller 50 or the system controller may adjust the output of the generators in order to equalize or configure the load among the generators. In one example, the loads are balanced across generators by increasing or decreasing the rate that fuel is supplied to the engines. The fuel adjustment may change the real power supplied by the generators. In one example, the loads are balanced among generators by modifying the current levels supplied to the alternator field windings.

The rotor controller 43 may perform a paralleling function in response to the power value exceeding the threshold value. For example, when the load is above a threshold the rotor controller 43 or stator controller 50 may generate a paralleling signal in response to the power value exceeding the threshold level. The paralleling signal may include an instruction to bring an additional generator online. The instruction may cause a generator to close to the bus or begin running. The paralleling signal may include a time value in order to synchronize the generators.

The rotor controller 43 may perform a load shedding function in response to the power value exceeding the threshold value. The rotor controller 43 may generate a command for a switch that adds or removes a load from the generator. When the power angle is too high, loads may be removed. When the power angle is low, loads may be added.

The rotor controller 43 may generate any of these commands in response to the power value exceeding the threshold value. The rotor controller 43 may send the command to the stator controller 50. The size of the power angle may impact whether the resulting function is performed at the rotor controller 43 or sent to the stator controller 50.

The rotor controller 43 may cooperate with the stator controller 50 in a master and slave relationship. For example, in a first mode the stator controller 50 performs a majority of the control functions of the generator and in a second mode the rotor controller 43 performs a majority of the control functions of the generator. The rotor controller 43 may initially be in the slave role, providing data to the stator controller 50. When the rotor controller 43 sends a command or other data to the stator controller 50, the rotor controller 43 may start a timer. If the timer reaches a predetermined level (e.g., 1 second, 10 seconds, or another value) without a response or acknowledgement being received from the stator controller, the rotor controller 43 may take the role of the master. That is, the rotor controller 43 may start applying generator commands without any involvement from the stator controller 43.

The rotor controller 43 may calculate electrical parameters of the output of the generator based on the power angle. The electrical parameters may include current, voltage, or power for one or more phases of the output. The electrical parameters are calculated without the use of a current transformer. This is advantageous because current transformers may be eliminated from the generator, which reduces cost. In addition, this technique is less time consuming that current transformers because no calibration is needed. However, it is noted that a calibration based on manufacturing variances between alternators may be applied, but no calibration based on temperature or load is necessary.

Figure 24:
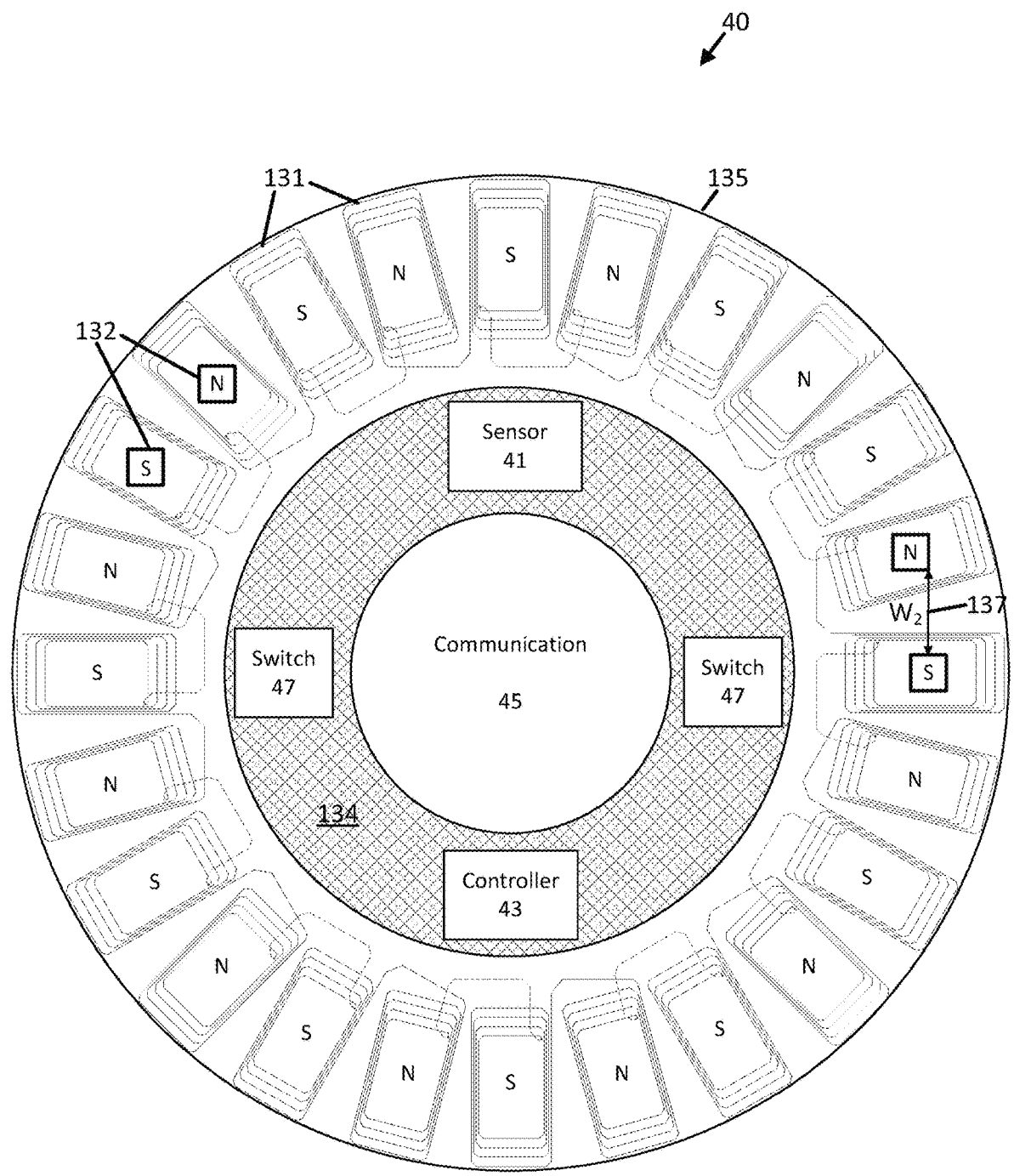
FIG. 24 illustrates another example rotor assembly.

FIG. 24 illustrates another implementation for the PCB assembly 40 including the exciter armature 135 and a control portion 134 with sensor 41, controller 43, one or more switches 47, and communication interface 45. The example illustrated in FIG. 24 rotates in a plane near twenty-four magnets mounted on the stator 130. The magnets are designated near coils 131 with indicators 132, using N for north and S for south. The magnets are mounted to stator 130, which may be in front of the PCB assembly 40 shown in FIG. 23. In other words, the PCB assembly 40 and coils 131 move relative to the magnets illustrated by indicators 132. The magnets 131 may be spaced at a first distance. However, between at least one pair of magnets 131, a second distance ($W_2$) separates the magnets. The one or more switches 47 turn on and off the field current in the windings of the exciter armature 135. The switches 47 may be driven by a control signal from the controller 43 (e.g., a pulse width signal).

Figure 25:
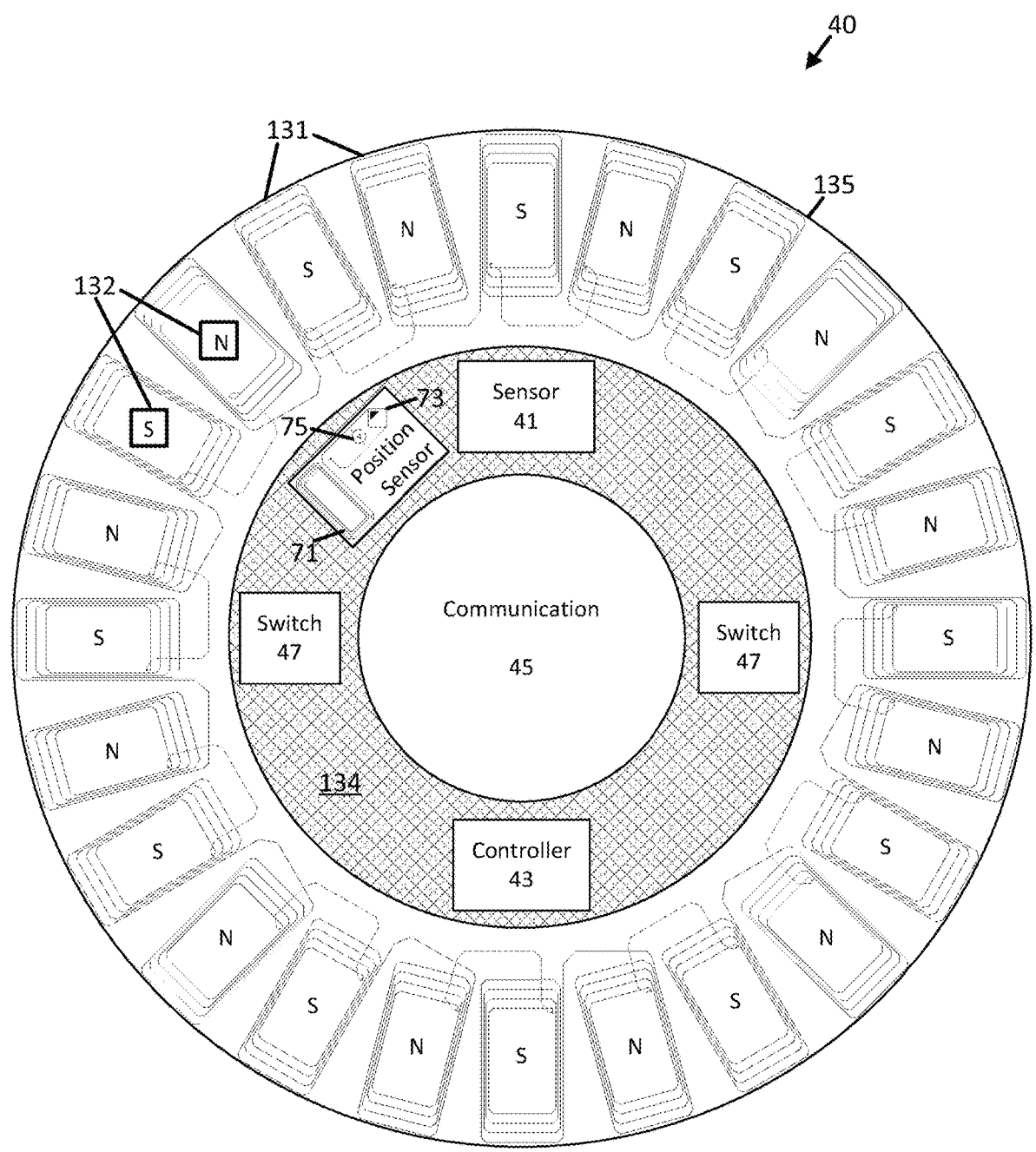
FIG. 25 illustrates another example rotor assembly.

FIG. 25 illustrates another implementation for the stator 130, which is shown only by magnet indicators 132, which are either behind or in front of the PCB assembly 40 including the exciter armature 135 and a control portion 134 with sensor 41, controller 43, one or more switches, and communication interface 45. FIG. 25 illustrates the case where the position of the rotor is detected by measuring an irregularity in the iron in the stator surrounding the PCB assembly 40. The change in the magnetic path length for the field generated in the pickup coil 71 by the current source 73 results in a voltage that can be detected by a voltage sensor 75. The position sensor detects when the rotor is at a certain position and the relative position of the rotor can be obtained by counting cycles on the voltage generated on the outer turns, or by comparing the incoming voltage to a threshold or series of thresholds.

Any arrangement may be used in which the home position can be marked using the magnets. In addition to irregular spacing, changes in sequence, an odd number of magnets, different sized magnets may be used. For example a magnet may be replaced with two smaller magnets, resulting two shorter cycles in the output of the pickup coil 133. The magnets illustrated are arranged in a pattern of alternating north (N) and south (S) poles (e.g., NSNSNSNSNSNSNS). However, the home position may be marked by a repeating pole of the same polarity (e.g., NSNSNSNNSSNSNS or NSNSNSSSNSNS).

Figure 26:
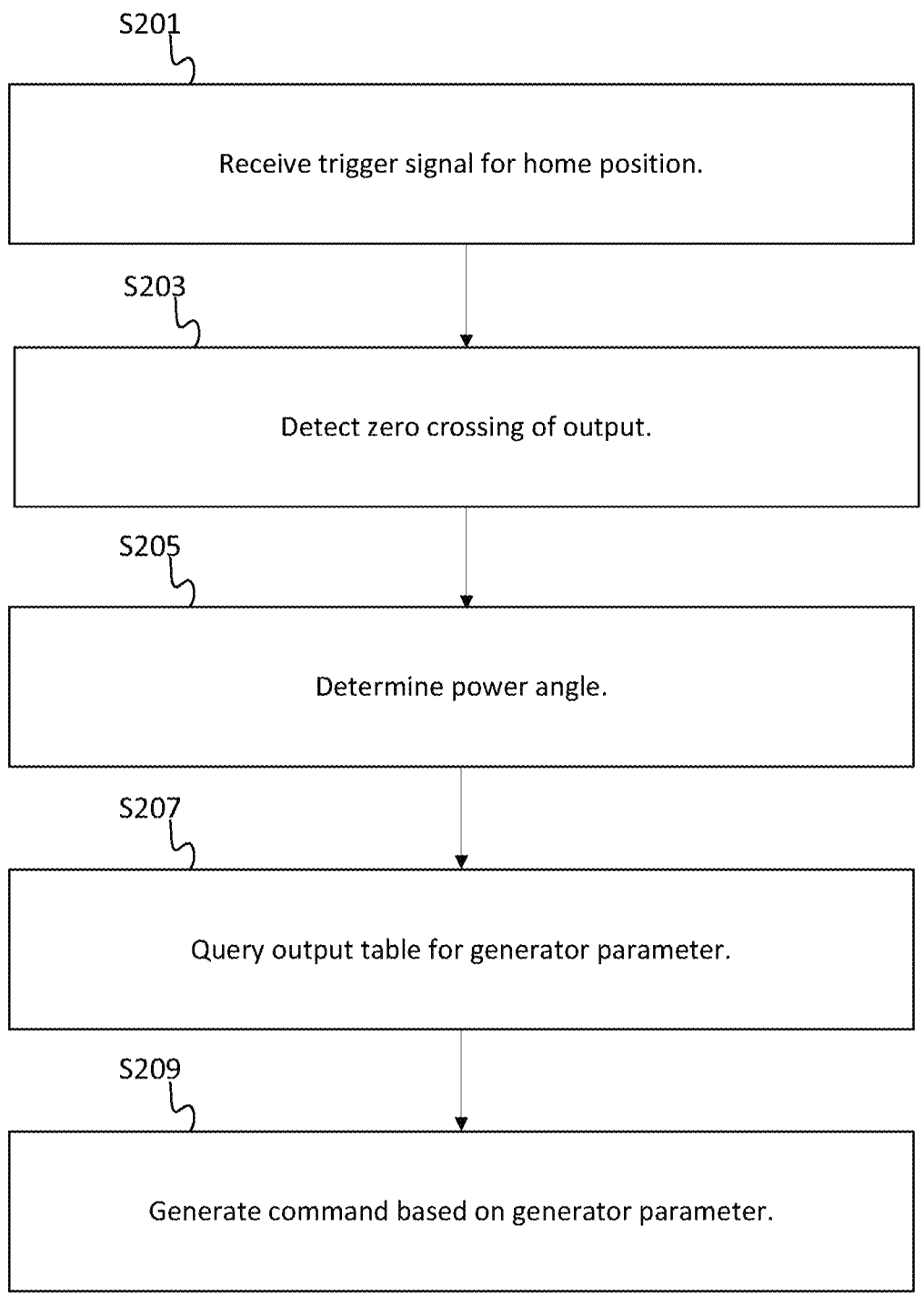
FIG. 26 illustrates an example flow chart determining a generator parameter based on the trigger.

FIG. 26 includes a flowchart for calculating electrical parameters from the detected power angle, which may be implemented by any of the arrangements (e.g., FIG. 24 or FIG. 25). Additional, different, of fewer acts may be included.

At act S201, the alternator controller 43 receives a trigger signal for a position of the rotor. The alternator controller 43 may consult a lookup table to determine an expected position of the rotor based on the trigger signal. Alternatively, the trigger signal may be associated with a home position. The home position may be the initial tooth (tooth 1) of a gear that drives the rotor.

At act S203, the alternator controller 43 detects a zero crossing of the output of the alternator. The output of the alternator may be calculated at the rotor controller 43 according to any of the examples described herein for calculating load, output current, output voltage, or output power.

At act S205, the alternator controller 43 determines the power angle. The power angle may be calculated based on a difference between a measured zero crossing time and an expected zero crossing time. The expected zero crossing time may be based on the number of phases of the output and a number of stator magnets for the generator. The generator with M phases and N stator magnets. Each stator magnet is reflected in each of M phases in the output of the exciter. Thus, there are N×M (product of N and M) zero crossings in the output of the exciter for every rotation of the rotor. For example, with three phases and ten stator magnets spaced N-S alternately, there are 30 zero crossings for each revolution or each period in the output.

At act S207, the alternator controller 43 queries an output table for a generator parameter. The output table may associate power angles with a value indicative of the output of the generator, the load on the generator, or another generator parameter. The difference between the rotating fields of the rotor and stator is changed depending on the generator parameter. As the load on the generator increases, the power angle increases.

At act S209, the alternator controller 43 generates command based on the generator parameter. The command may be any of the functions described herein including a safety shutdown when output power goes past a threshold level, an adjustment to a target frequency or voltage to protect something, generator paralleling functions, load balancing functions, or load shedding functions. The command may be sent to another controller such as the stator controller 50.

Figure 27:
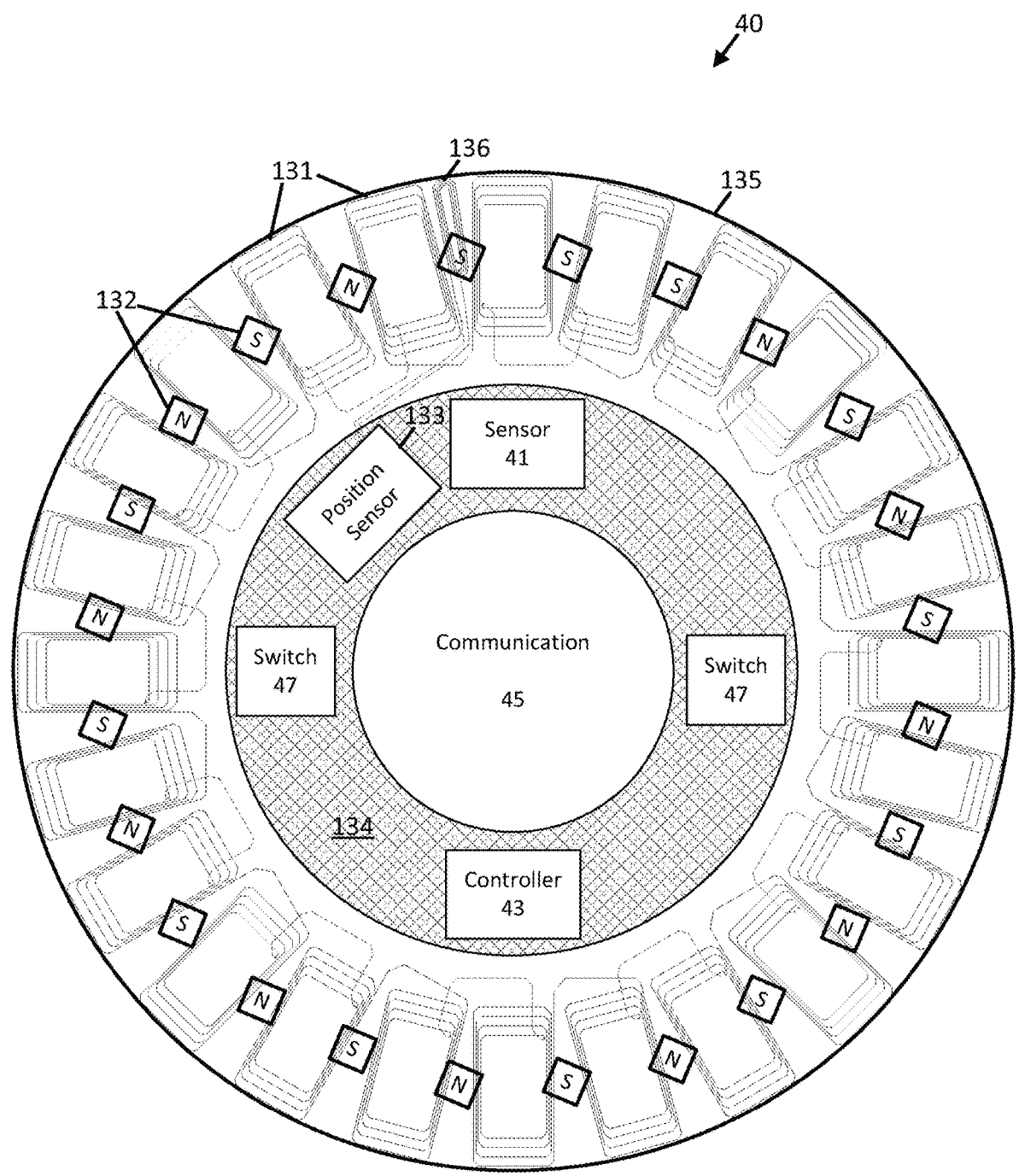
FIG. 27 illustrates another example arrangement of magnets.

FIG. 27 illustrates an example in which the position of the rotor is detected using a pickup coil 136, mounted on the rotor and a permanent magnet 132 on the stator 130. The permanent magnet 132 on the stator may be mounted at a different radius than the magnets that supply the field excitation voltage. The permanent magnet may be the same permanent magnets used for generating the excitation voltage for the rotor, or it may be a separate magnet. The pickup coil 136 may also be mounted at a different radius than the coils that supply power to the rotor. The pickup coil may also have a built-in permanent magnet or a current impressed on the coil so that an irregularity (such as a bump or dip or gear tooth) can be detected by the pickup coil. The output of the pickup coil 133 may be analyzed according to any of the examples herein. FIG. 27 illustrates the magnets of the stator out of phase with the coil 101 as the PCB assembly rotates with respect to the stator.

When a non-linear load or device is activated on the load side or customer side of a device or circuit connected the output of a generator, the field current may be affected. An example of a non-linear load that causes such a disruption is a silicon controlled rectifier (SCR). The non-linear load may operate as a high speed switch. Other non-linear loads may include power factor correction devices, insulated-gate bipolar transistors (IGBTs), or capacitive buses. When a state of the non-linear load or device is changed or switched, a magnetic flux may be induced on the load side of the stator, which causes a mutual inductance to be applied to the rotor windings, changing the field current.

The rotor controller 43 may detect the change in the output of the stator. Consider the example in which the controller is monitoring frequency by identifying when the output crosses zero. The frequency of the output may be calculated as proportional to the number of zero crossings in a time period. For example, one crossing in the time period may indicate 60 Hz, two crossings in the time period may indicate 120 Hz, and three crossings in the time period may indicate 180 Hz.

Figure 28A:
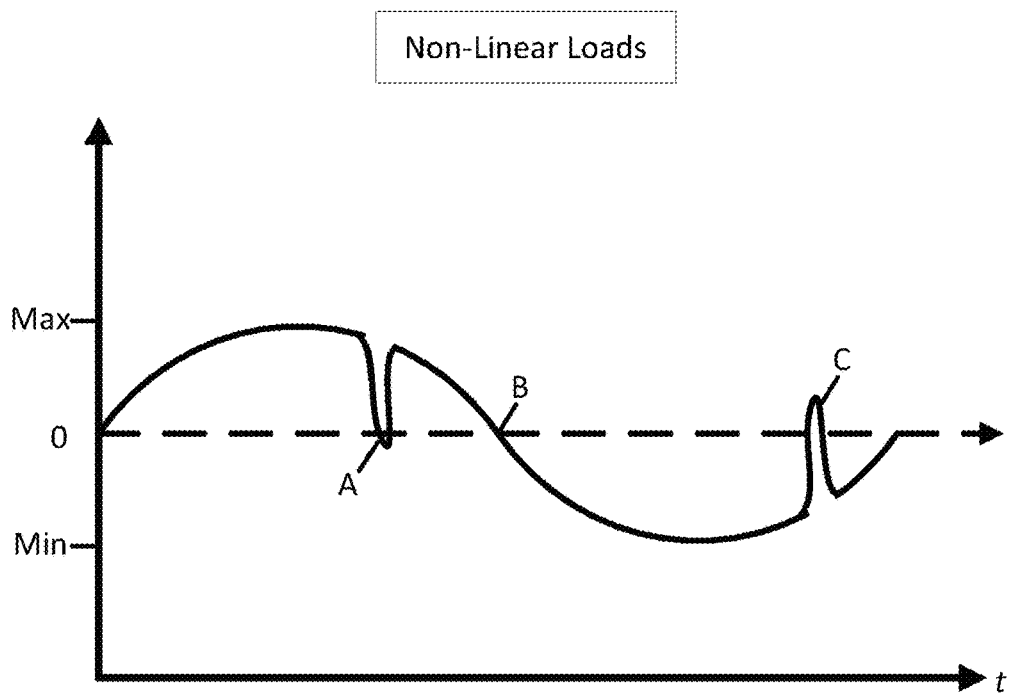
FIG. 28A illustrates an example non-linear load.

FIG. 28A illustrates a sinusoid disrupted by two spikes caused by the non-linear loads. The spikes may occur at the same point in time within the cycle or every half cycle. If the output was sinusoidal without the spikes, the controller detects one zero crossing (e.g., corresponding to 60 Hz). If the non-linear load causes the spikes shown, the controller detects two more zero crossings (e.g., 3 total crossings, corresponding to 180 Hz).

The rotor controller 43 may detect the occurrence of these spikes from the mutual inductance induced on the rotor. For example, the rotor controller 43 may monitor the field current and determined when there is a spike (e.g., threshold change in voltage or current over a short time period). In one example, the rotor controller 43 may count the number of spikes and generate a signal or message indicative of the number of spikes.

In one example, the rotor controller 43 detects the zero crossing and the spikes. In another example, the rotor controller 43 detects the spikes and communicates the information to the stator controller 50, which detects the zero crossings.

Figure 28B:
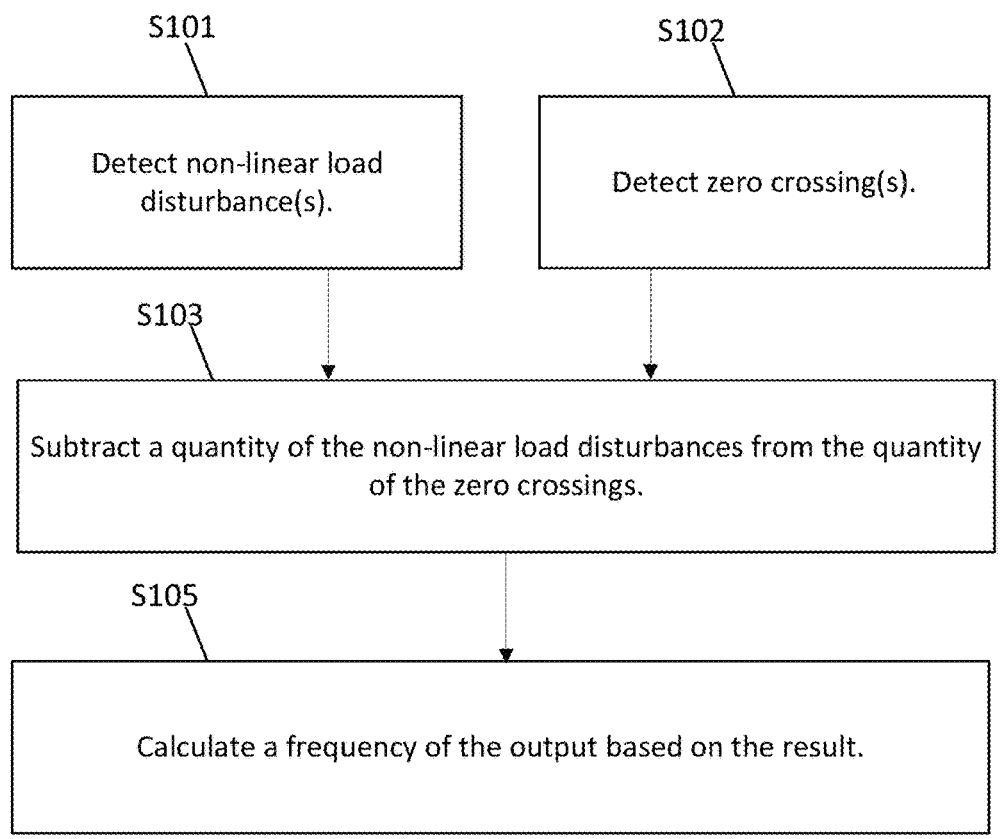
FIG. 28B illustrates an example flowchart for calculating a frequency based on the non-linear load.

The controller (e.g., either rotor controller 43 or stator controller 50) that monitors the output of the stator may adjust the detected frequency based on the number of spikes detected based on mutual inductance. The number of spikes corresponds to the number of "extra" or "false" zero crossings shown in FIG. 28A. For example, the controller may calculate the number of zero crossings, subtract the number of detected spikes, and calculate a frequency of the output of the stator based on the result. FIG. 28B illustrates a flowchart for calculating a frequency of the output of the stator corrected by the number of disturbances.

As a result of the clean frequency detection, the over frequency is "ignored" and the generator is not shut down when the high frequency is caused by the spikes from the non-linear load. In one example, the controller may generate a message for a display or interface of the generator that states that a non-linear load is present. Alternatively, the message may indicate the updated frequency measurement.

The rotor controller 43 may calculate an impedance of the alternator. The stator controller identifies spikes in the stator output caused by non-linear loads. The magnitude of the spike is related to the source impendence of the alternator. The rotor controller 43 may identify a maximum magnitude of the change in output caused by the spike. Examples for the maximum magnitude of the change include 10%, 20% or another value.

When the non-linear load causes a change in output that exceeds the maximum magnitude, the rotor controller 43 may generate a warning or a command. The warning may inform the user that excessive non-linear loads are on the generator. The warning may be displayed on a display or user panel for the generator. The warning may be sent to a mobile device (e.g., laptop or cellular phone). The warning may be sent to a manufacturer or manufacturer's representative in order to log the instance for maintenance purposes.

The rotor controller 43 may be configured to identify patterns in the non-linear load. For example, the rotor controller 43 may record a timestamp each time an unexpected spike or zero crossing occurs in the stator input. The rotor controller 43 may identify that a specific time period has elapsed between spikes or between a statistically significant number of pairs of spikes or sequential pairs of spikes.

For example, the rotor controller 43 may record timestamps for a minimum set number (e.g., 10, 20, 100 or another value) of samples. The rotor controller 43 may calculate differences of sequential pairs (e.g., the $2^{nd}$ timestamp minus the $1^{st}$ timestamp or the $11^{th}$ time stamp minus the $10^{th}$ timestamp). Alternatively, the rotor controller 43 may calculate differences between every other sample (e.g., the 4th timestamp minus the 2nd timestamp or the $11^{th}$ time stamp minus the $9^{th}$ timestamp). The rotor controller 43 may perform a statistical analysis on the timestamp differences to determine whether a regular pattern has been occurring. In one example, the rotor controller 43 may calculate a standard deviation of the differences. When the standard deviation is within a threshold value, the rotor controller 43 determines that a pattern has been identified.

Once the pattern has been identified, the rotor controller 43 is configured to adjust the field current to account for the spike. The rotor controller 43 may determine expected times for the non-linear load. For example, the rotor controller 43 may anticipate the firing time for an SCR. At the predicted time of the non-linear load, or the time just before the predicted time of the non-linear load, the rotor controller 43 may increase the field current.

The increase in field current may be brief in time and high in magnitude. To achieve these levels, an energy storage device capable of quick charging and discharging (such as a capacitor or an inductor) may be used. The rotor controller 43, in response to the predicted time in the pattern, may activate a switch that connects a charged capacitor to one or more of the field windings. Examples sizes for the capacitor include 0.1 uF to 10 uF at 3000 VDC or 1 to 100 uF at 1000 VDC. Example sizes for the inductor include 1 mH to 100 mH at 15 A.

The rotor controller 43 may analyze the total harmonic distortion (THD) spike caused by the non-linear load. The rotor controller 43 may identify a first period of time when the non-linear load is present and a second period of time when the non-linear load is not present. The rotor controller 43 may measure THD during the first period of time as a baseline. The rotor controller 43 may measure THD during the second period of time. The THD may be the ratio of a ratio of the power density of a range of harmonics to the power density of the fundamental frequency to the fundamental frequency. Based on a comparison of the measurements, the rotor controller 43 calculated how much THD is caused by the non-linear load.

Based on the THD levels, the field current may be controlled according to a field control profile, which is discussed in more detail in the example below and in association with FIGS. 32A-B and 33. In one example, the rotor controller 43 may generate a user message in response to the THD. The user message may inform the user that a non-linear load is causing THD and/or engine speed changes are introducing flicker into the field current profile.

In one technique, the current in the stator is detected using current transformers (CTs). The current transformers are inductive sensors that attach to the outside of the generator leads. The stator controller 50 receives the output of the CTs as a current measurement. The controller multiplies the current measurement by a voltage measurement to calculate power. However, CTs have a few downsides. CTs are expensive, add a degree on non-linearity to the current measurement, and are hard to connect because the wiring depends on the alternator connection configuration. In addition, CTs are easily installed incorrectly because the generator often has many leads, and three phase connections may be confusing. CTs must be mounted by brackets and individual wiring calculations are made. This takes time and has high labor costs.

The rotor controller 43 is configured to calculate the power without the current measurement and without the CTs. Individual power components (e.g., real power, reactive power, instantaneous per phase power and apparent current) may be calculated without directly measuring the stator current level.

Figure 30:
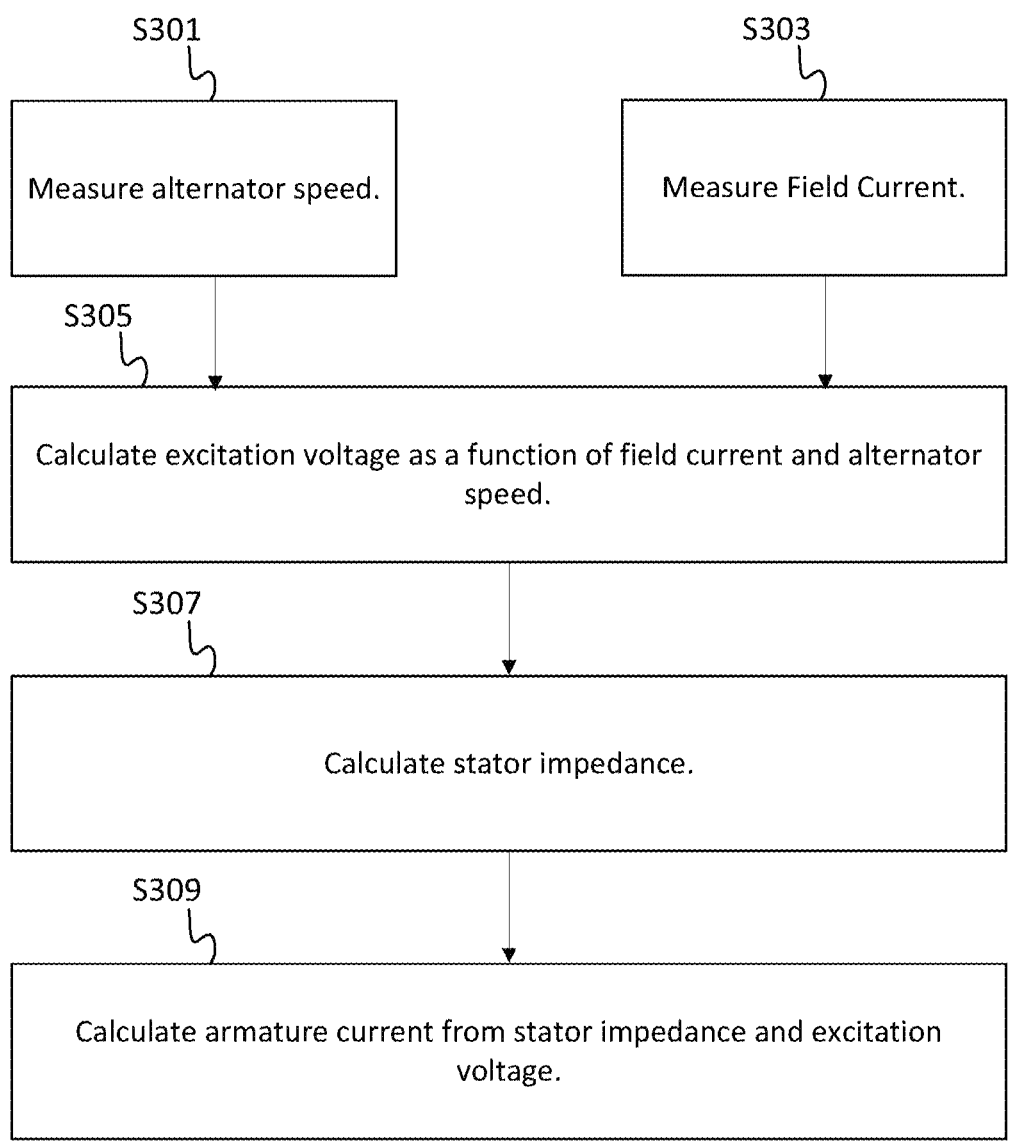
FIG. 30 illustrates an example flowchart for calculating armature current by a rotor controller.

FIG. 30 illustrates an example flowchart for calculating stator current. From the stator current the output power and power currents may be calculated. Additional, different, or fewer acts may be included. Some or all of the acts may be performed by the rotor controller 43.

At act S301, the alternator speed or synchronous speed ($n_s$) is measured. The speed may be measured based on the irregularly spaced magnets and techniques described herein in association with FIGS. 21-23. The speed may be based on time between markers for the home position. For example, the time between markers divided into one minute gives the synchronous speeds in revolutions per minute. Other speed calculations are possible.

At act S303, the field current is measured. The field current may be measured directly by the rotor controller 43.

One example technique for measuring field current is shown in FIG. 4A and described herein. The rotor controller 43 may set the field current. One example technique for adjusting a field current setting is shown in FIG. 4B and described herein.

At act S305, the rotor controller 43 calculates an excitation voltage as a function of field current and alternator speed. Equation 2 illustrates an example calculation, and variations are possible. The excitation voltage $E_f$ in volts may be calculated according to:

$$E_f = n_s \frac{N_f I_f}{R} k_f \qquad \text{Eq. 2}$$

The synchronous speed ($n_s$) (e.g., revolutions/minute) may be measured by the pickup coil 133 or other techniques in at S301. The DC field current ($I_f$) may be measured by the rotor controller in act S303.

The number of conductor turns $N_f$ is a property of the field coil. This may be a known value based on the alternator that is stored in memory by the alternator controller 43. Alternatively, the rotor controller 43 may consult a lookup table that associates alternator models with the number of conductor turns. In another example, the number of conductor turns may be calculated from a resistance measurement In another example, resistance is detected and the number of turns is calculated based on the gauge of wire and the relationship of resistance and inductance as the relationship changes over temperature ranges.

The term $k_f$ is a constant representing magnetic coupling efficiency or leakage flux. This value may be stored in memory and accessed by the rotor controller 43. Alternatively, this value may be measured using known armature currents and a variable known load. The term R is the reluctance of the magnetic circuit (e.g., ampere—turns/weber, turns/henry), which is effectively a constant.

In one alternative, the constants may be collapsed to a single value as an alternator constant—A, the excitation voltage is proportional to the DC field current and the speed, as shown by Equation 3.

$$E_f = A I_f n_s \qquad \text{Eq. 3}$$

Figure 31A:
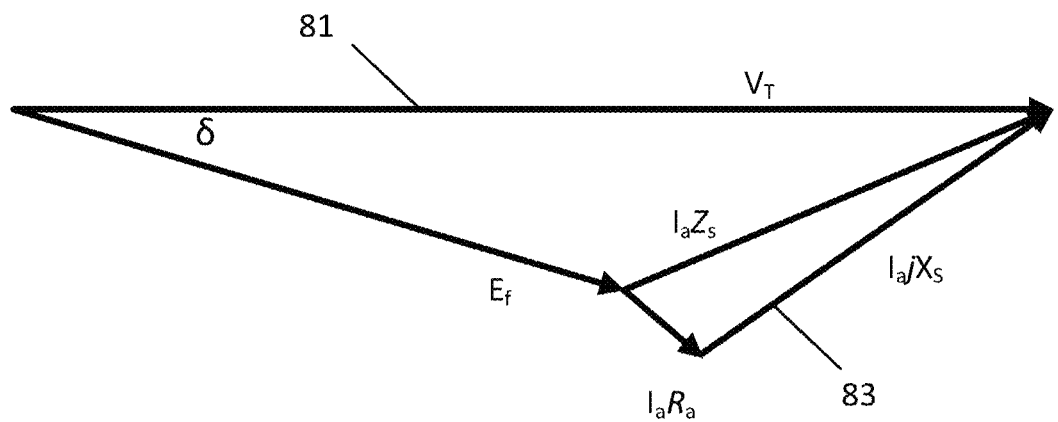
FIGS. 31A-B illustrate vector geometry for stator current calculation.

At act S307, the rotor controller 43 calculates the stator impedance. Various techniques may be used for this calculation. One of which is shown geometrically by FIGS. 31A-B. FIG. 31A illustrates a vector plot of operation of the synchronous machine. The synchronous machine may be a generator. A first triangle 81 constructed from three vector quantities, $V_T$, $E_f$, and $I_a Z_s$. $V_T$ is the output voltage of the stator (terminal voltage). $E_f$ is calculated from Equation 2 at act S305.

A second triangle 83 is constructed from three vector quantities $I_a/X_s$, $I_a R_a$, and $I_a Z_s$. While the direction of the vectors is important in both triangles, an assumption may be made that a closed triangle is formed is formed from the three vector quantities, allowing the direction of the vectors to be omitted from calculations.

The armature phase current $I_a$ is an instantaneous quantity. There are three time based currents (one for each phase) of the generator. The rotor controller may select a phase based on the position of the rotor as determined by the output of the pickup coil 133.

Figure 31B:
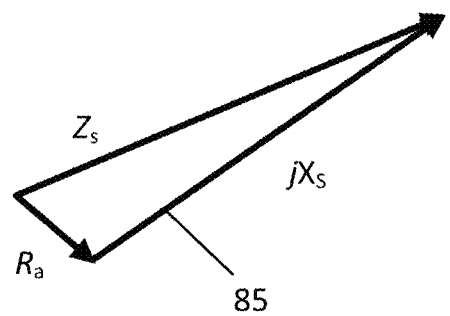

FIG. 31B illustrates triangle 85 which is congruent and smaller than triangle 83. Each vector component of triangle 83 has been divided by phase current $I_a$ to construct triangle 85. $X_s$ is a constant that describes the alternator material properties and design (e.g., number of turns, magnetic properties of steel, winding ratios, winding distribution or other factors). This value may be stored in memory and accessed by the rotor controller 43. Alternatively, this value may be measured using known armature currents and a variable known load. Xs may also be calculated based on geometric and material information relating to the alternator design to account for changes in the characteristics due to air gap size and permeability (due to saturation of the machine).

$R_a$ is another constant that describes the series resistance of the alternator; this is temperature dependent. $R_a$ may be calculated or approximated. $R_a$ may calculated based on temperature detected by an ambient sensor (e.g., temperature sensor). $R_a$ may be calculated based on a measurement from a search coil that reflects temperature based on electrical properties. $R_a$ may be estimated based on an expected temperature. The temperature may be estimated based on load on the generator. $R_a$ may be a function of the temperature and the load on the generator. Thus, $Z_s$ is based on two known constants for the alternator. Because Ra is the smallest leg of the triangle 805, errors in $R_a$ may be less significant.

Returning to the first triangle 81, with $I_a Z_s$, $V_T$, and the angle between them, load angle δ. The load angle is calculated based on rotation of the rotor according to positions of asymmetrical exciter magnets. The load angle or power angle may be calculated according to the techniques described herein.

The law of cosines may be used to calculate $I_a Z_s$, for example, as shown in Equation 4. Equation 5 is solved for the phase current. Thus, the phase current $I_a$ may be calculated rather than measured using a current transformer. The current transformer may be omitted.

$$I_a Z_s = \sqrt{V_T^2 + E_f^2 - 2(V_T)(E_f)\cos(\delta)} \qquad \text{Eq. 4}$$

$$I_a = \frac{\sqrt{V_T^2 + E_f^2 - 2(V_T)(E_f)\cos(\delta)}}{Z_s} \qquad \text{Eq. 5}$$

After the armature current is obtained in act S309, several additional determinations may be made by the rotor controller 43 related to alternator temperature, winding irregularities, droop control, interturn shorts, and stationary tests.

The stator temperature may be calculated from the armature (stator) current obtained in act S309. The armature windings and/or the field windings may be formed from a single material (e.g., copper). Thus, the change in resistance calculated from voltage and current measurements is indicative of temperature. There is a direct relationship between resistance and temperature. The rotor controller 43 may access a lookup table that associates armature temperature from armature resistance and a lookup table that associates rotor temperature with field winding resistance. The lookup tables may be stored in memory. Alternatively, temperature and resistance may be associated via algebraic formula according to a winding material (e.g., copper) constant. In one example, as shown by Equation 6, the new resistance ($R_{new}$) is related to the previous resistance ($R_{old}$), the new temperature ($T_{new}$), the previous temperature ($T_{old}$), and the material constant ($T_k$). The material $T_k$ is 234.5 for copper and 225 for aluminum. The temperature values are measured in degrees C.

$$R_{new} = R_{old} * (T_{new} + T_k)/(T_{old} + T_k) \qquad \text{Eq. 6}$$

The rotor controller 43 may identify winding irregularities based on the armature current from act S309 and field winding current. For example, the rotor controller 43 may calculate a ratio between armature current and field winding current. When the ratio deviates from a predetermined range, the rotor controller 43 determines that an irregularity has occurred. The irregularity may be a turn to turn short. The turn to turn short may be a short that has occurred between two windings that should be insulated from one another. The rotor controller 43 may identify that the short has occurred on the rotor side when the ratio is less than expected and the rotor controller 43 may identify that the short has occurred on the stator side when the ratio is higher than expected. In other words, if the rotor current is higher than expected for a given stator current, the number of turns on the rotor is noticeably low, and if the rotor current is lower than expected, the stator may have a short circuit (although the output voltage may decay to the point where the rotor current would probably have to go up, not down).

In one example, the winding irregularity may be a short from windings to laminations. The short may be detected by the rotor controller and handled with a fault action, such as removing excitation from the alternator or logging an event. A short to the laminations can be detected by detecting a current path using a technique such as periodic high-potential detection or a constant voltage applied between the rotor laminations and the windings.

The rotor controller 43 may perform a self-diagnosis of some problems when the errors occur. The rotor controller 43 may monitor the inductance of the field windings. When the inductance changes unexpectedly in comparison to the change in resistance, the rotor controller determines that an interturn short has occurred.

In one example, the rotor controller 43 make a series of resistance measurements at time intervals and a series of inductance measurements at the same time intervals. The rotor controller 43 may calculate a baselines ratio of resistance to inductance or inductance to resistance. The resistance and inductance should vary proportionally, if the temperature of the winding has stabilized. Therefore, for any subsequent measurement of resistance, the rotor controller 43 may calculate an expected inductance, and for any subsequent measurement of inductance, the rotor controller 43 may calculate an expected resistance. When the expected value for inductance or resistance deviates from the measured value by a predetermined amount, the rotor controller 43 determines that an interturn short has occurred.

The rotor controller 43 may detect demagnetization of the magnets at the exciter on the stator assembly 610. The rotor controller 43 may measure speed of the rotor using the pickup coil 133. The speed of the rotor is related to the excitation voltage determined at act S305. The rotor controller 43 may monitor the excitation voltage and speed. The excitation voltage and speed should vary proportionally. Therefore, for any subsequent measurement of excitation voltage, the rotor controller 43 may calculate an expected rotor speed, and for any subsequent measurement of rotor speed, the rotor controller 43 may calculate an expected excitation voltage. When the expected value for excitation voltage or rotor speed deviates from the measured value by a predetermined amount, the rotor controller 43 determines that one or more magnets have become demagnetized. The rotor controller 43 may compare the deviation against multiple thresholds to determine whether one, two, three, or another number of magnets have become demagnetized or if the total magnetic flux of the permanent magnets is weakening.

The rotor controller 43 may detect shorts to ground as an alternative to stationary testing. In stationary testing, a high potential (hipot) circuit is used to test the stator or rotor windings for inadvertent shorts to ground. For example, the electrical insulation that insulates the windings may become cracked, broken, or worn through, which provides a current path to ground.

The hipot circuit may include a lead that can be connected to ground and a power source that is both high voltage and low current. Under normal conditions, when the power source is connected between the windings and the rotor shaft no current should flow through the hipot circuit. However, when a current is detected through the hipot circuit above a threshold (e.g., 10 milliamps) is exceed, a failure is detected. AC and DC voltage can be used for hipot testing, but the capacitive coupling between the rotor winding and the laminations is often sufficient to permit enough displacement current to pass through the capacitive coupling, resulting in an inaccurate test result. DC hipot testing eliminates the capacitive path by eliminating maintained displacement current (only charging current is observed).

In rotor hipot testing, the hipot circuit is stationary. Because the hipot circuit must be physically connected to router windings, the rotor must be stationary. To test multiple portions of the rotor, the rotor may be incrementally rotated and the hipot test performed at each increment. Often, an error may only be detectable at a certain rotational position (or range of rotational positions) of the rotor. These are referred to as stationary tests.

As an alternative to stationary testing, the rotor controller 43 rotates along with the rotor assembly, and may include a hipot circuit that detects continuity to ground. The hipot circuit includes ground lead and power source. The ground lead may connect to the shaft 39. The high voltage and low circuit power source is connected to the positive or negative supply lead for the rotor winding.

The rotor controller 43 may detect a leakage current through the high pot circuit and compare the current to a minimum leakage current. Examples for the minimum hipot current includes 1 milliamp, 5 milliamps, and 10 milliamps. The rotor controller 43 may initiate the testing according to a user input or a schedule. The user input may be generated by a test button or another input on a user interface. The schedule may be periodically (e.g., every week or month), at specified times, or in response to an event. The event may be another error, a startup, or a change in load on the generator.

In response to the detected failure, the rotor controller 43 may log the error, report the error, or take a corrective measure. The rotor controller 43 may log hipot currents and timestamps when the hipot exceeds a threshold. The rotor controller 43 may report the error to the user via a display on the user interface, a message to a mobile device, or an audible message (e.g., alarm). The rotor controller 43 may report the error to the stator controller 50 or generator system controller. The rotor controller 43 may take a corrective measure by shutting down the generator or reducing the field current. In one example, the hipot failure may be aggregate with other errors from other testing in the generator in an error score. When the aggregate error score exceeds a maximum level, the rotor controller 43 generates a command to turn off the generator. In one example, the corrective measure or the report of the error may indicate that either the rotor windings or stator windings should be replaced, repaired or rewound.

Because the rotor controller 43 is integral to the alternator, that is, the rotor controller 43 can take readings, analyze data, and take corrective measures independent of other logic located outside of the alternator, the alternator may employ protective measures. Because the controller is onboard the rotor, the alternator may be able to protect itself without the need for an external device. No external device is needed to detect problems with the alternator.

The protective measures may include current based protection. The rotor controller 43 may detect the field current. One example technique for measuring field current is shown in FIG. 4A and described herein. The rotor controller 43 may calculate the power dissipated in the field windings over time. Such dissipated power (DP) may be calculated according to Equation 6.

$$DP = I^2 * t \qquad \text{Eq. 6}$$

The DP may be power dissipated in the coil (heat) multiplied by the amount of time that the power is dissipating. The rotor controller 43 may compare the DP to a heat threshold to determine when there is an overheating or a risk of overheating. The rotor controller 43 may also account for the amount of heat dissipated to the ambient environment as a function of ambient temperature as measured by a temperate sensor or determined according to the resistance of the windings.

The rotor controller 43 may also determine a thermal model for the alternator. In every application, an alternator may have different thermal properties. The thermal properties may depend on the surroundings of the alternator. One primary consideration may be the proximity of a turbocharger to the alternator because a turbocharger heat at a high rate due to high temperature of housings. The rotor controller 43 may receive a temperature of the alternator from a temperature sensor mounted on the PCB assembly 40. The rotor controller 43 may control field current according to this thermal model. The rotor controller 43 may compare the temperature to a threshold. When temperatures get too high or exceeds the threshold, the rotor controller 43 reduces the field current. The field current may be reduced by a predetermined amount, a percentage of the field current, or by an amount proportional to the deviation in temperature. When the field current is lowered, insufficient power may be supplied to the load. However, in most applications sacrificing output is preferable to permanently damaging the alternator.

In many generator applications, an error may be detected, for example, in the output voltage or current that could be caused by a problem in the normal functioning of the generator (e.g., the generator is not making power as expected), but could also be caused by a loss of sensing (e.g., the circuit that detects the output is failing). Using stator side controllers or voltage regulators, it is not possible to distinguish between these two scenarios.

Figure 29:
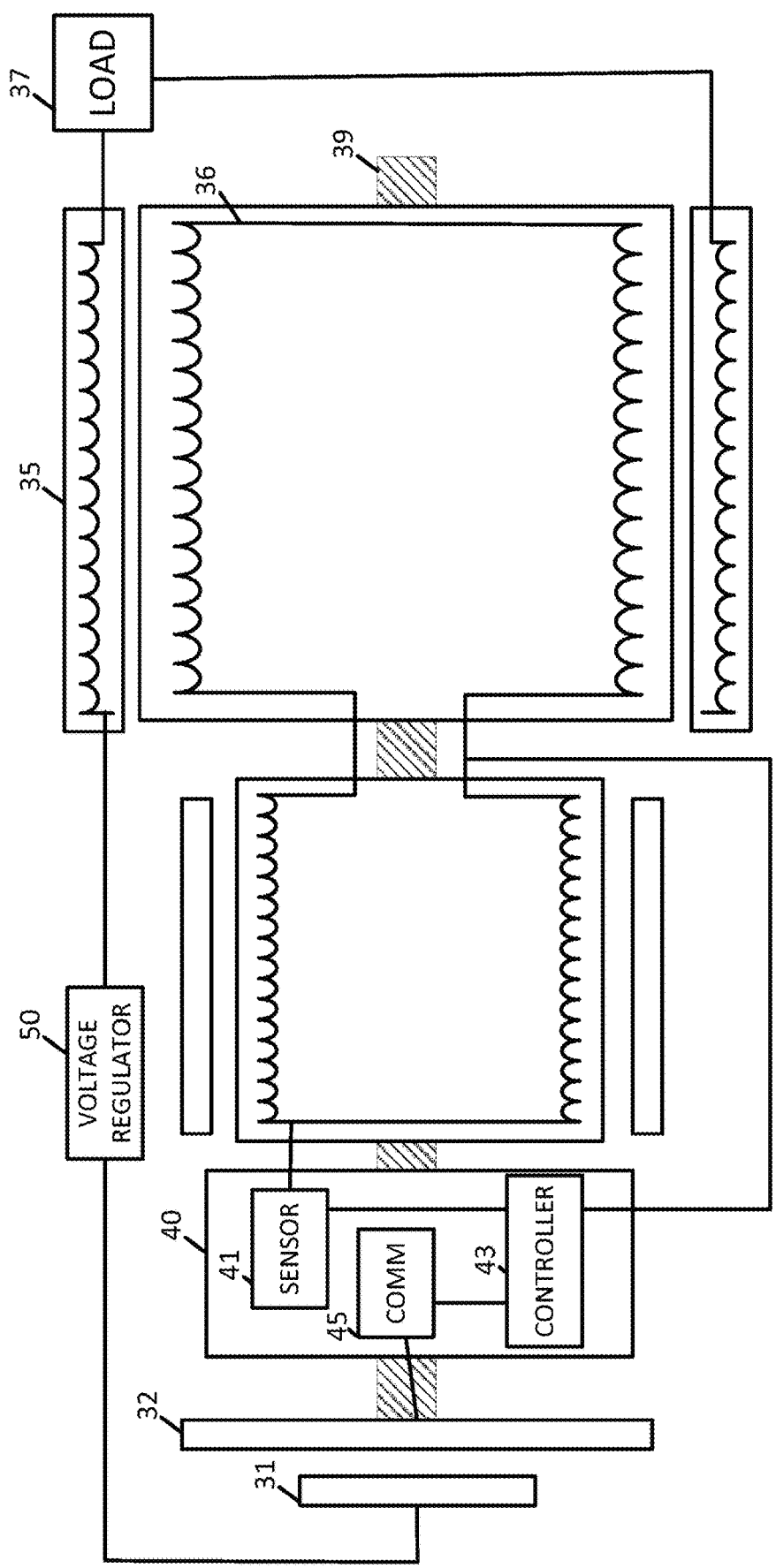
FIG. 29 illustrates another example rotor controller.

However, with the rotor controller 43, which is mounted to the rotor and rotates along with the field windings, more conclusive tests may be performed to provide a fail safe operation. The rotor controller 43 identifies the output level (voltage or current) either by load characterization, as described above, or by calculating stator current, as described in association with FIG. 29 and other examples above. The rotor controller 43 may receive a measurement of the output level from the stator controller 50 through the rotor communication device 608 receiving data from the stator communication device 618. The rotor controller 43 also identifies the field current. One example technique for measuring field current is shown in FIG. 4A and described herein. Other examples are possible.

The rotor controller 43 monitors the field current and the output level. If the output level remains relative constant (e.g., within a predetermined range), or changes within the predetermined based on changes in the field current, there are no errors. If the ability to detect output level is lost, output voltage will remain approximately constant. The output controller 43 may monitor changes in the field current as an estimation of output level.

A significant advantage is realized when a loss of sensing occurs. Without an onboard rotor controller, when there is an apparent short on the load, the generator controller turns the field current to a maximum level (e.g., full on) in an effort to maintain the output voltage. The increase output may clear the fault when the apparent short is really a short on the load. When the short is real, the output voltage is detected as dropping or nearing zero. But in other cases the problem may be a loss of sensing. In a loss of sensing condition, a wire has become disconnected in the measurement circuit. The real output voltage remains unchanged. However, the sensing has experienced an error.

The rotor controller 43, on the other hand, monitors both the output level and the field current. The rotor controller 43 may identify a loss of sensing situation when the output level deviates significantly (e.g., more than a predetermined range), or changes more than the predetermined range based on detected changes in the field current. In other words, when the field current behaves as expected, but the measured output level changed significantly, the rotor controller 43 determines that a loss of sensing has occurred.

In response to the identified loss of sensing, the rotor controller 43 may log the error, report the error, or take a corrective measure. The rotor controller 43 may log output levels and timestamps when the field current remains unchanged or at expected levels. The rotor controller 43 may report the error to the user via a display on the user interface, a message to a mobile device, or an audible message. The message may indicate that a sensing circuit is malfunctioning. The rotor controller 43 may report the error to the stator controller 50 or generator system controller 43. The rotor controller 43 may take a corrective measure by dispatching a field technician or running a diagnostic test on the sensing circuit. In one example, the sensing failure may be aggregate with other errors from other testing in the generator in an error score. When the aggregate error score exceeds a maximum level, the rotor controller 42 generates a command to turn off the generator. In one example, the corrective measure or the report of the error may indicate that either the sensing circuit or sensors should be replaced or repaired.

In addition or in the alternative, the rotor controller 43 may detect harmonics in the field current. When the loss of output voltage is caused by a short circuit, there is often a high circulating harmonic. The circulating harmonic may be a third order harmonic. The rotor controller 43 may detect the existence of a third order harmonic based on frequency. The rotor 43 controller may compare the voltage/current of the harmonic to a threshold. The rotor controller 43 may detect the phase that the harmonic is on.

The total harmonic distortion (THD) of the output of the generator is a measurement of the harmonic distortion present. THD may be defined as the ratio of the sum of the powers of all harmonic components to the power of the fundamental frequency. Alternatively, the THD may include a predetermined number of harmonics (e.g., 3, 5, 7, or 11).

The deviation between the alternator output and the sine wave may be contributed to harmonics in the alternator output. The harmonics may be caused by the geometric shape of the alternator and the finite nature of the stator windings. The perfect alternator may be a perfectly round device with perfectly sinusoidally distributed windings around the stator interior diameter that provides a perfect sinusoid. Such an alternator is not possible to construct. In practice, windings of the alternator are distributed in a finite number of slots. The rotor cannot be perfectly round. The resulting waveform is imperfect. The shape of the resulting waveform may be expressed as a sum of sinusoids of varying order.

The periodic wave form can be expressed as a sum of odd ordered sinusoids of varying frequency. In one example, the first order sinusoid has a frequency of 50 or 60 Hz, the third order has a frequency of 150 or 180 Hz, and so on. Detectable harmonics in a three phase alternator may include the $5^{th}$ order, the $7^{th}$ order, the $9^{th}$ order, the $11^{th}$ order, and/or other harmonics. Because of the saturation or hysteresis in the core of the alternator, the attenuation of each harmonic increase as the frequency increases. Thus, the $3^{rd}$ and $5^{th}$ harmonics are the most detectable.

The rotor controller 43 may develop a profile for the generator. The profile describes a periodic fluctuation in an operating characteristic for the generator. The profile may be accessed from a database or another memory in communication with the rotor controller 43. The operating characteristic may be the speed of the alternator or shaft 39, or the field current of the rotor windings in the exciter armature 601 or the field coil assembly 602. The profile may be adaptively learned from the system over time.

The values for the profile may be measured by the pickup coil 133, when the profile is a speed profile, according to embodiments described above for determining the speed of the generator. Alternatively, another sensor mounted on the rotor may directly detect the movement of a component such as a crankshaft, the gear box, transmission, armature, or another component. The direct type of sensor may be a torque sensor, a deflection sensor, a dynamometer, a positional sensor, or a revolution sensor.

The deflection sensor may measure a deflection of the crankshaft or another device. The deflection sensor may include two position sensors. The position sensors may be associated with different ends of the rotor shaft. As an example, the sensor may be a positional sensor (e.g., position sensor or accelerometer) that may measure the change in rotation of a crankshaft or other component of generator. The revolution sensor may be a magnetic sensor that detects a change in a magnetic field, an optical sensor that detects indicia on the component, a contact sensor that detects a tab or protrusion on the crankshaft, or another component.

The values for the profile may be measured by a detection circuit coupled to the exciter armature 601 or the field coil assembly 602, when the profile is a field current profile, according to embodiments described above for calculating the field current.

The rotor controller 43 is configured to generate, control, or modify a field current for the alternator based on the profile, which may be the speed profile, the field current profile, or both, that describes the periodic fluctuation in the operating characteristic for the generator.

The field current profile may be adjusted to reduce the distortion caused by the harmonics, which may be referred to as total harmonic distortion (THD), to a threshold level. Example THD thresholds include 1%, 2%, 5% and 10%. Without field current control, design of a generator to meet the 1%, 2%, or even 5% THD threshold may come at a cost to efficiency or significant material expense. However, controlling or fine tuning the field current profile can eliminate or reduce the effects of the harmonics in the output and meet very low THD thresholds, while maintaining near-optimal efficiency and material costs.

Figure 32A:
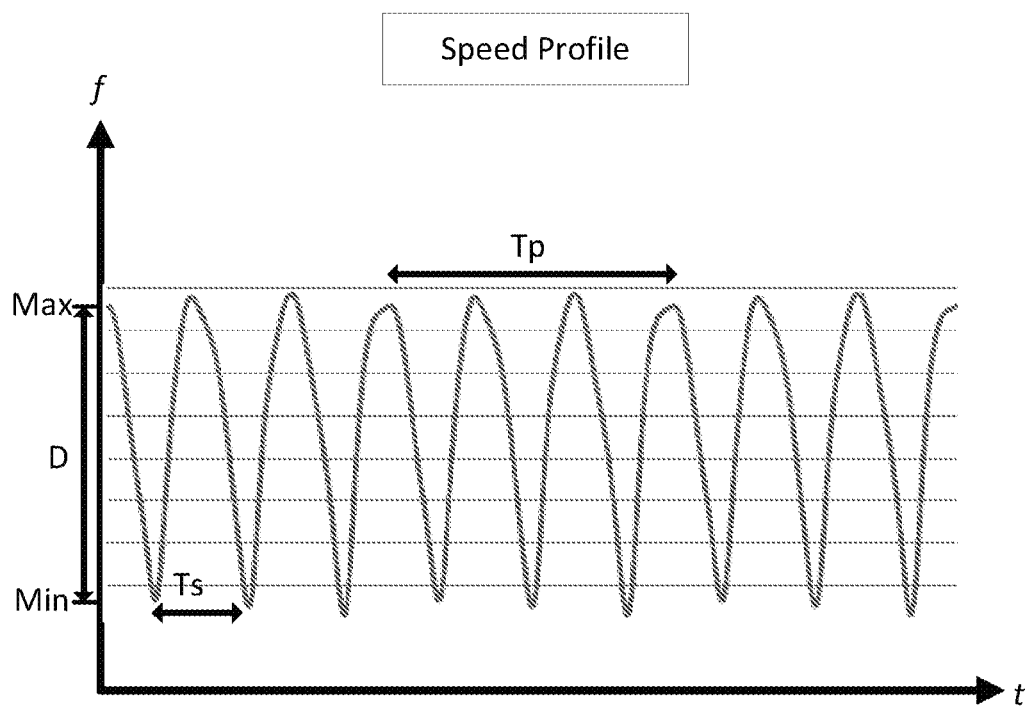
FIG. 32A illustrates an example chart for a field speed profile based on the trigger.

FIG. 32A illustrates an example speed profile for a generator. The speed profile may be continuous or discrete. The speed profile may fluctuate between a maximum frequency and a minimum frequency. The frequency may be measured in rotations per unit time. The speed profile may be a function of the combustion cycle of the engine and/or the physical construction of the generator. The speed profile may be periodic. The period of the speed profile (Tp) may depend on the diameter of the rotor or the average speed of the alternator. The circumference of the rotor divided by the average frequency (rotations per unit time) provides the amount of time for one rotation, which may be the period of the speed profile (Tp). The period of the speed profile (Tp) may span the length of time for the all of the cylinders to fire. The illustrated example in FIG. 32A may be a 3 cylinder engine, thus three peaks are included in the speed profile (Tp). The interval Ts corresponds to the time period that corresponds to one of the cylinders.

The output is considered congruent to the speed profile based on the relative change in ratios between the speed profile and the output. In one example, the two shapes are considered congruent based on the ratios to the minimum values and maximum values of the shapes. For any period, the ratio of the maximum value of the speed profile value to the maximum value of the output is calculated and the ratio of the minimum value of the speed profile value to the minimum value of the output is calculated. When the difference between the ratios is within a predetermined range, the two shapes are considered congruent. Examples for the predetermined range include 0.8 to 1.05 and 0.9 to 1.1. In addition or in the alternative, the two shapes may be considered congruent when one or more maximum values of the speed profile occur within a predetermined time period of one or more maximum values of the output and/or one or more minimum values of the speed profile occur within a predetermined time period of one or more minimum values of the output. Example predetermined time periods include 5 milliseconds and 10 milliseconds.

Figure 32B:
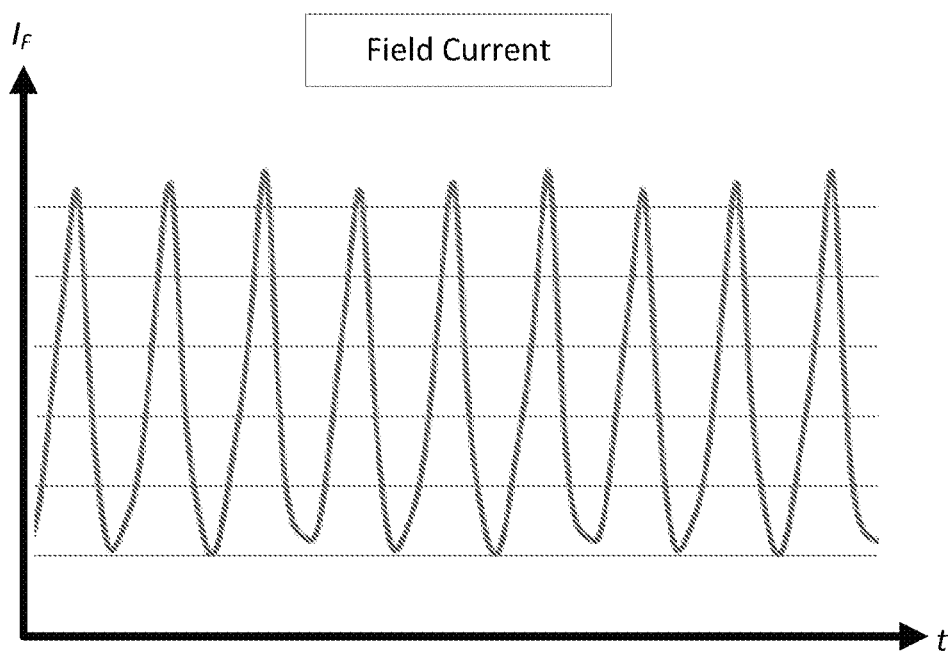
FIG. 32B illustrates an example field current correction.

FIG. 32B illustrates an example modified field current according to the speed profile of FIG. 32A. The speed profile of FIG. 32A is illustrated to show the changes in the modified field current track changes in the speed profile. The modified field current may be inversely proportional to the speed profile. The inversely proportional relationship may be constant throughout period Tp or may fluctuate with a predetermined range. The predetermined range may be plus or minus any percentage value from 1% to 15%.

In another example, the modified field current may be inversely congruent to the speed profile. In one example, the two shapes are considered inversely congruent based on the ratios to the minimum values and maximum values of the shapes. For any period, the ratio of the maximum value of the speed profile value to the corresponding minimum value of the output is calculated and the ratio of the minimum value of the speed profile value to the corresponding maximum value of the output is calculated. When the difference between the ratios is within a predetermined range, the two shapes are considered inversely congruent. Examples for the predetermined range include 0.8 to 1.05 and 0.9 to 1.1. In addition or in the alternative, the two shapes may be considered inversely congruent when one or more maximum values of the speed profile occur within a predetermined time period of one or more minimum values of the output and/or one or more minimum values of the speed profile occur within a predetermined time period of one or more maximum values of the output. Example predetermined time periods include 5 milliseconds and 10 milliseconds. Alternatively, FIG. 32A illustrates an example detected field current at the field coil assembly 602. Because of variances in materials and machine properties. The detected field current may differ from the rotation of the exciter armature 601. In this case FIG. 32B illustrates a modification to the field current in order to account for the irregular shape. Specifically, FIG. 32A illustrates an example speed profile from a 3-cylinder engine, illustrating variations in the output speed for every firing event (3 events per 2 revolutions). The target field current is determined in such a way that the product of field current and synchronous speed remains constant or providing a nearly constant voltage.

The field current control may be activated and deactivated according to a control signal. The control signal may be generated based on instructions received from a user, a predefined schedule, or a feedback control system. The field current control activation signal may be transferred to the rotor controller using digital communication. The user may activate or deactivate the field current control through a switch, button, or other setting on the generator, which triggers the control signal. The user may remotely send a command to the generator controller through a mobile application or a website. The predefined schedule may activate the field current control during peak hours and deactivate the field current control outside of peak hours. The feedback control system may monitor the output of the generator (e.g., voltage sensor or current sensor) and activate the field current control when the output exceeds a threshold value. The threshold value may be a percentage of the average output (e.g., 5% or 10%), a number of standard deviations from the mean output (e.g., 1 standard deviation), or a set value (e.g., 100 volts, 130 volts).

The values that make up the speed profile may fluctuate according to combustion cycles of the engine. Thus, the shape or variance of the speed profile may be a function of the number of cylinders of the engine. An engine with four or more cylinders may have a speed profile with low variance because one cylinder out of the four or more cylinders is usually firing or approaching firing. That is, the crankshaft has less time to decelerate after a power stroke of one cylinder before a power stroke of another cylinder begins. The combustion cycles of any one cylinder is balanced by the combustion cycles of the other cylinders.

On a single cylinder engine, the speed profile has a high variance because there are no other cylinders to balance the combustion cycles of the single cylinder. The compression stroke significantly slows down the engine (e.g., extracts power from the crank shaft) and the power stroke significantly speeds up the engine (e.g., adds power to the crank shaft). The intake stroke and top stroke may slow down the engine to a lesser extent.

In a two cylinder engine, the speed profile may have a medium variance for reasons similar to the four cylinder engine discussed above. However, for a two cylinder odd fire engine, the speed profile may have a high variance (e.g., even higher than in the one cylinder example). In a two cylinder odd fire engine, the cylinders fire close together in time. In one example, during the 360 degrees rotation of the crankshaft, the first cylinder fires at 270 degrees and the second cylinder fires at 450 degrees (90 degrees of the subsequent cycle). The speed of the crankshaft may reach a first maximum after the first cylinder fires and a second, higher maximum after the second cylinder fires.

The speed profile of an engine with an odd number of cylinders may have a variance because the cycles of the engine and the alternator may be out of synch. A three cylinder engine may fire every 240 degrees. The alternator may be a two pole alternator that takes power every 180 degrees or a four pole alternator that takes power every 90 degrees. In either case, there may be aliasing between the alternator and the engine because the engine fires and the alternator draws power at varying times relative to each other.

Figure 33:
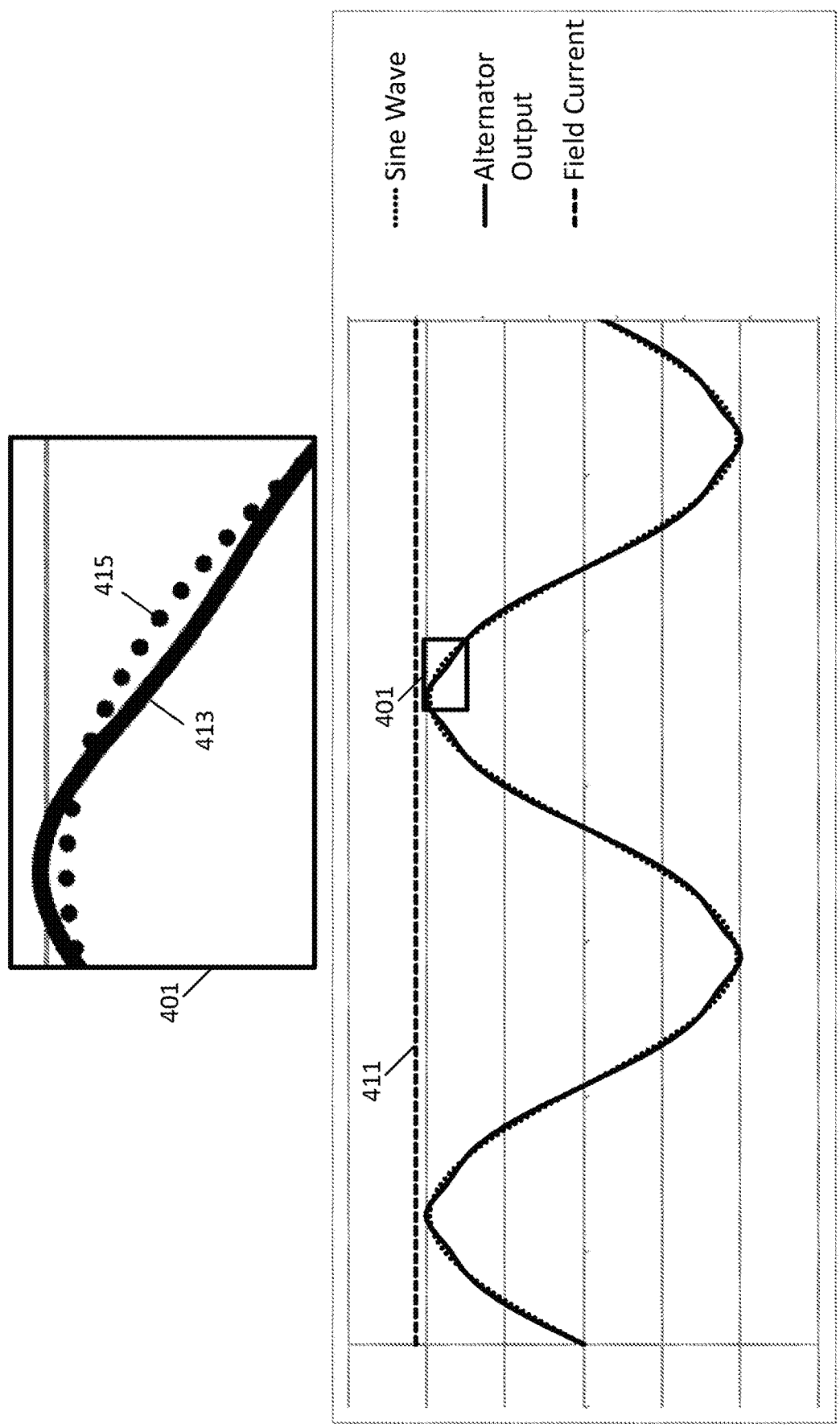
FIG. 33 illustrates an example total harmonic distortion correction.

FIG. 33 illustrates an example output for a generator with field current control deactivated. Because the field current control is deactivated, the field current, as shown by dash line 411 is substantially constant. Window 401 illustrates the deviation between the alternator output, as shown by solid line 413, and an ideal sine wave, as shown by the dotted line 415. The rotor controller 43 is configured to adjust the field current to vary over time, which brings the solid line of the ideal sine wave 415 and the alternator output 413 together. The alternator output 413 may be equal to a sinusoid or within a tolerance range (e.g., 1% or 5%) of a perfect sinusoid. The deviation from a perfect sinusoid is more commonly referred to as THD, as described above.

The rotor controller 43 may provide a variable speed support for doubly-fed induction functionality on an alternator. A doubly-fed induction machine provides a time-varying current to the rotor to allow the generator to output a frequency that differs from the operating frequency of the rotor. The time-varying current frequency matches the difference between the output frequency and the rotor synchronous frequency. Some doubly-fed induction machines apply time-varying to the rotor using slip rings and brushes. In some doubly-fed induction machines, an AC sinusoidal bias may be generated by the voltage regulator or stator controller 50. The AC bias may be applied to the rotor field current using slip rings or brushes.

The alternator runs at a synchronous speed, depending on a number of poles, to output the rated frequency (e.g., 60 Hz). In some instances the synchronous speed for the mechanical rotation may not produce the desired power. For example, consider a speed is 1800 rpm for a 4 pole generator, and one example in which the generator is producing 9 kW but 10 kW is desired. The engine can be run at 2000 rpm rather than 1800 rpm to get to 10 kW. However, the output would be at 66.6 Hz. A reverse AC bias of 6.6 Hz is impressed on the field current to cause a reverse field and correct the output frequency to approximately 60 Hz. Similarly, the engine or prime mover can be run slower than synchronous speed and a forward bias is impressed on the field current to speed up the output. This technique can allow the engine to be run slower, which reduces noise and fuel consumption.

The rotor controller 43 may provide similar control without slip rings or brushes because the rotor controller 43 is supported by and rotating along with the rotor assembly. The rotor controller 43 may identify an overspeed situation by monitoring the speed of the rotor based on the output of the pickup coil 133 or any of the sensor techniques described herein. When the speed exceeds the rated speed of the generator or another threshold value, the rotor controller 43 may identify that the generator is in an overspeed condition.

The rotor controller 43 may calculate an AC bias based on the overspeed condition. For example, a frequency of the AC bias may be the proportional amount by which the rated speed is exceeded. As described by Equation 7, the frequency (F) of the AC bias is equal to the product of the rated frequency ($F_R$) of the generator times the ratio of the measured speed (S) to the rated speed ($S_R$).

$$F = F_R \frac{S}{S_R}.$$ Eq. 7

Communication between the stator and rotor is provided by the rotor communication device 608 and the stator communication device 618. The communication may take various forms including but not limited to optical communication, radio communication, and magnetic communication.

Figure 34:
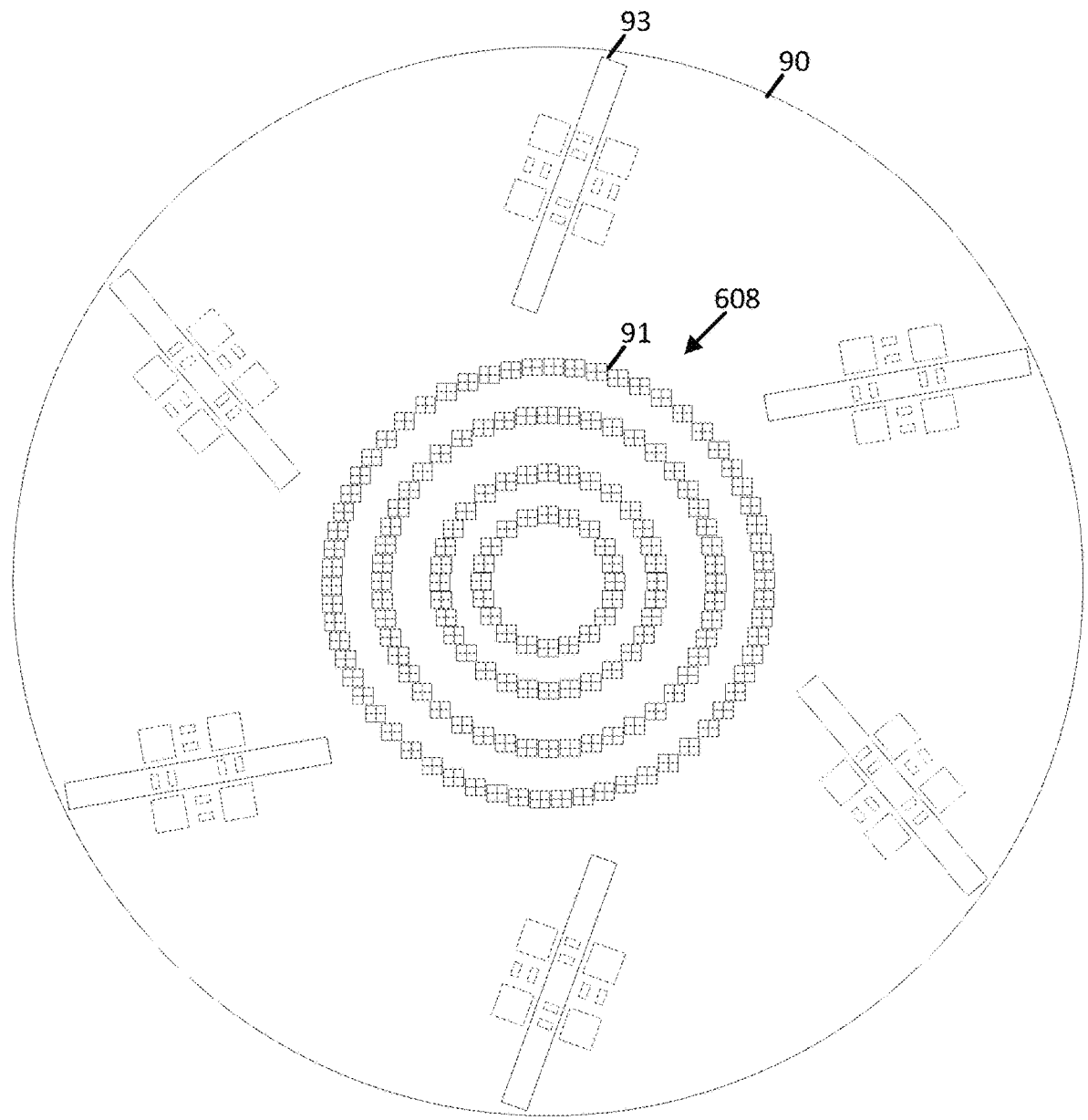
FIG. 34 illustrates an example rotor side component of a communication system.
Figure 35:
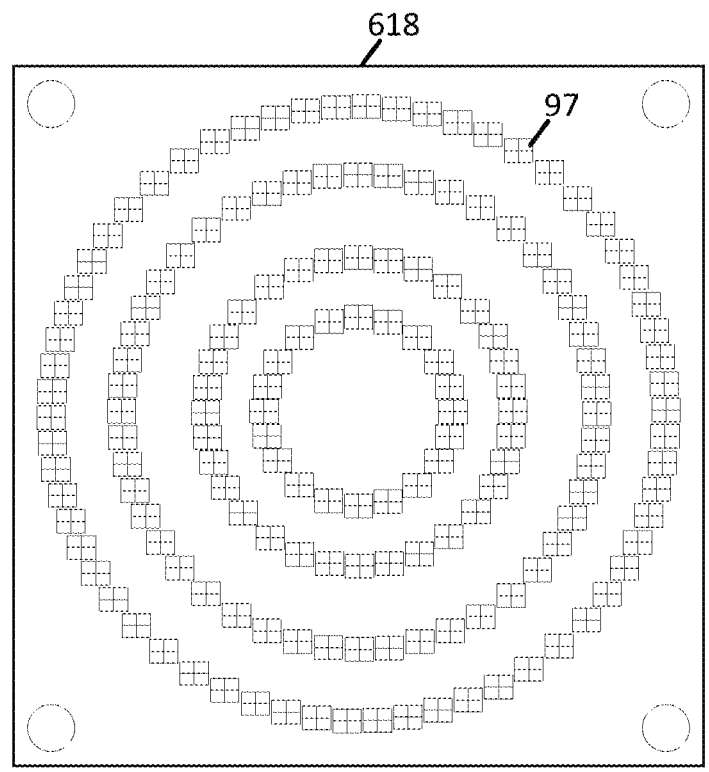
FIG. 35 illustrates an example stator side component of a communication system.

FIG. 34 illustrates an example rotor 90 including the rotor communication device 608 using an arrangement of magnetic coils 91. FIG. 35 illustrates an example stator communication device 618, also including an arrangement of magnetic coils 97. Current flowing through the magnetic coils in the rotor communication device is controlled to transfer data to the stator communication device 618 by inducing a magnetic flux in coils in the stator communication device 618. Communication may similarly be performed in the direction from the stator communication device 618 to the rotor communication device 608.

The magnetic coils 91 and 97 may be arranged in concentric circles for signal immunity. Each coil in the circle may apply the same signal and data. Thus, no matter the position of the rotor the coils are aligned. In addition, redundancy may protect the communication signals from interference from cellular phones, microwaves, or other devices.

Alternatively, different data may be transmitted in the coils arranged in a circle. Because each coil is always aligned with another coil, the data can be successfully transmitted between the rotor and the stator. The magnetic coils 91 and 97 may be half-duplex or full-duplex. In half duplex, one set of coils transmits data from the rotor to the stator, and another set of coils transmits data from the stator to the rotor. In full duplex, one set of coils may transfer data in both directions. Full duplex operation may be achieved using one frequency for a sending channel and another frequency for a receiving channel. In some cases, communication can by frequency-coded, in other cases, communication can be amplitude-coded or phase-coded.

Examples of content communicated from the stator communication device 618 to the rotor side communication device 608 may include the electrical properties or output characteristics of the generator collected by or calculated by the stator controller 50. In addition, the stator communication device 618 may send data to the rotor controller 43 such as potential firmware updates, power over serial, fault codes, historical events, and waveform capture. The rotor may communicate data to the stator. This data may consist of: field current, field voltage, rotor temperature, magnetic field intensity, stator current, alternator real power, alternator apparent power, alternator reactive power, alternator type, parameters settings, waveform snapshots, fault conditions, stored data, instantaneous data, measured data, or calculated data.

In addition or in the alternative, the stator communication device 618 may provide power to the rotor controller 43 and/or PCB assembly 40 using the communication interfaces. For example, the stator communication device 618 and the rotor communication device 608 may act as a transformer for sending power from the stator to the rotor to power electrical components on the rotor.

In one example, the stator communication device 618 and the rotor communication device 608 are used in limited circumstances. The rotor controller 43 may store a data log in a black box device. The black box device is a memory configured to record data collected or calculated by the rotor controller. The black box device may be formed of or encased in a heat and/or fire resistant material. The rotor controller 43 may store output levels (e.g., voltage, current, or power), field current level, user settings, error messaged, or any of the data readings described herein.

In one embodiment, the black box device is read when the generator is taken in for servicing, the black box is read to retrieve the previously recorded data. The service technician may troubleshoot the generator based on the recorded data. The black box device may include a universal serial bus (USB) or another connection to retrieve the recorded data. In another embodiment, after the generator experiences a catastrophic failure, the black box device is read to determine what caused the catastrophic failure.

Figure 36:
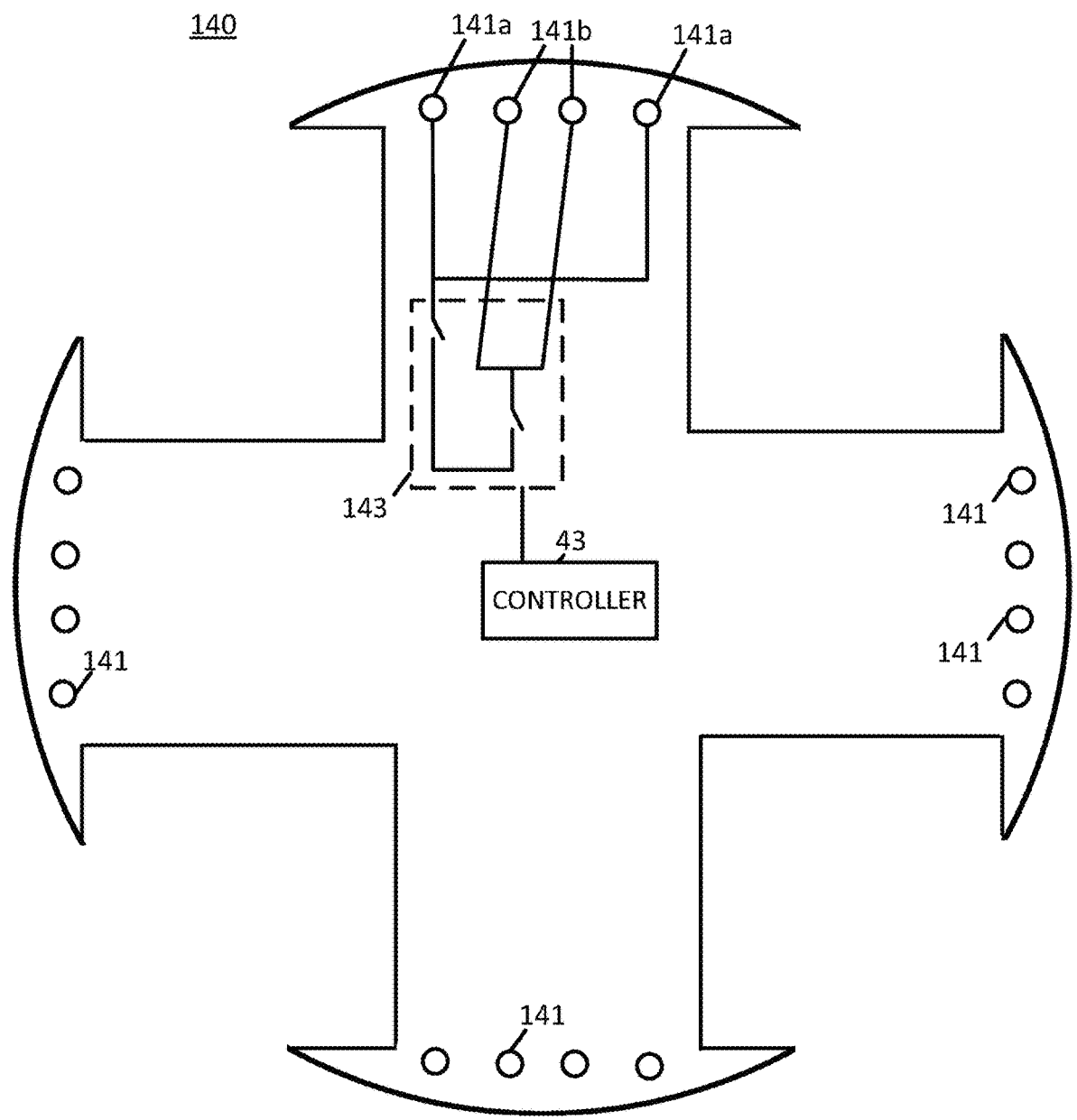
FIG. 36 illustrates an example set of selectively activate damper bars.

The rotor controller 43 may also perform damper bar control. FIG. 36 illustrates an example rotor 140 including damper bars 141 and a switch array 143. A predetermined number of damper bars per pole may be included. The damper bars 141 may be grouped in inside damper bars 141*b* and outside damper bars 141*a*. While two are shown, there may be one or any number of damper bars in the in inside damper bars 141*b* and outside damper bars 141*a*.

The damper bars 141 may aid in the stabilization of the power angle when the generator is undergoing load transient, supplying large motors, or operating in parallel. The stabilization occurs due to a torque generated by a slip in speed of the rotor and the rotating magnetic flux in the stator (similar behavior to an induction machine. The damper bars 141 may reduce the counter rotating armature reaction component, or magnetomotive force (MMF), in the field windings when the alternator is providing stator current. The damper bars 141 may reduce THD, when the alternator is providing stator current, by equalizing the magnetic flux distribution in the rotor especially in single-phase conditions.

Fewer damper bars may be needed for certain loads, and fewer damper bars may be needed when all three phases are loaded. Unnecessary damper bars cause extra heat to be dissipated and also wasted energy to be consumed. Thus, the rotor controller 43 may selectively control the damper bars 141.

In one example, the rotor controller 43 may detect whether a predetermined load is on each phases of the generator. When the predetermined load is exceeded, a set of damper bars (e.g., in inside damper bars 141*b* or outside damper bars 141*a*) is deactivated by sending a switch command to the switch array 143. In one example, the rotor controller 43 may monitor THD. When THD is lower that a threshold THD level, only one set of damper bars is activated, and when the THD is higher that the threshold THD level, both sets of damper bars are activated by the rotor controller 43 sending the switch command to the switch array 143.

Besides, the inside damper bars 141*b* and outside damper bars 141*a*, the damper bars may be classified as shallow bars and deep bars. The shallow bars are closer to the outer circumference of the rotor than the deep bars. The rotor control 43 may activate the shallow bars for a startup phase or a high torque condition of the alternator and activate the deep bars for the running phase or a low torque condition of the alternator. The rotor control 43 may activate the deep bars for a startup phase or a high torque condition of the alternator and activate the shallow bars for the running phase or a low torque condition of the alternator.

The rotor controller 43 may detect parameters of the rotor and classify the rotor, alternator, or generator based on the detected parameters. A memory for the rotor controller 43 may store a lookup table that associates rotor parameters with a model number for the alternator or the generator, a manufacturer for the alternator or the generator, or a machine type for the manufacturer or the alternator. The rotor parameters may include rotor resistance, rotor inductance, a number of windings, a property of the field current, number of poles, rotor winding capacitance to ground, rotor field winding capacitance, number of damper bars, ratio of inductance to resistance, natural resonance frequency, damper winding inductance, damper winding resistance, other factors can also be used. Alternatively, exciter parameters may be used such as exciter Information, exciter pole count, exciter Inductance, exciter resistance, exciter voltage at a given speed, or exciter performance measurements (e.g., acceleration rate, cranking speed, or deceleration rate). In another example, machine information may be used such as a machine constant (e.g., a ratio of field current to output voltage), stator inductance, or stator resistance.

The rotor parameter may include a single measured value or a combination of measured values. For example, a combination of a rotor resistance in a range of resistances and a number of windings in another range may indicate that the alternator is a particular model or from a particular manufacturer. In this way, the rotor controller 43 may be operable with many types of alternators or generators without user intervention. Any of the examples described herein may be based on the detected alternator or generator.

The rotor controller 43 may be operable in multiple modes. In a first mode, the rotor controller 43 detects the rotor parameters and consults the lookup table at first start up. That is, the rotor controller 43 performs the classification of the rotor, alternator, or generator only once, when the rotor controller 43 initializes. In a second mode, the rotor controller 43 detects the rotor parameters and consults the lookup table at every power cycle. In either mode, the detection may be restarted based on a user input or master reset. The rotor controller 43 may log each detection and master reset in combination with a timestamp in memory.

Figure 37:
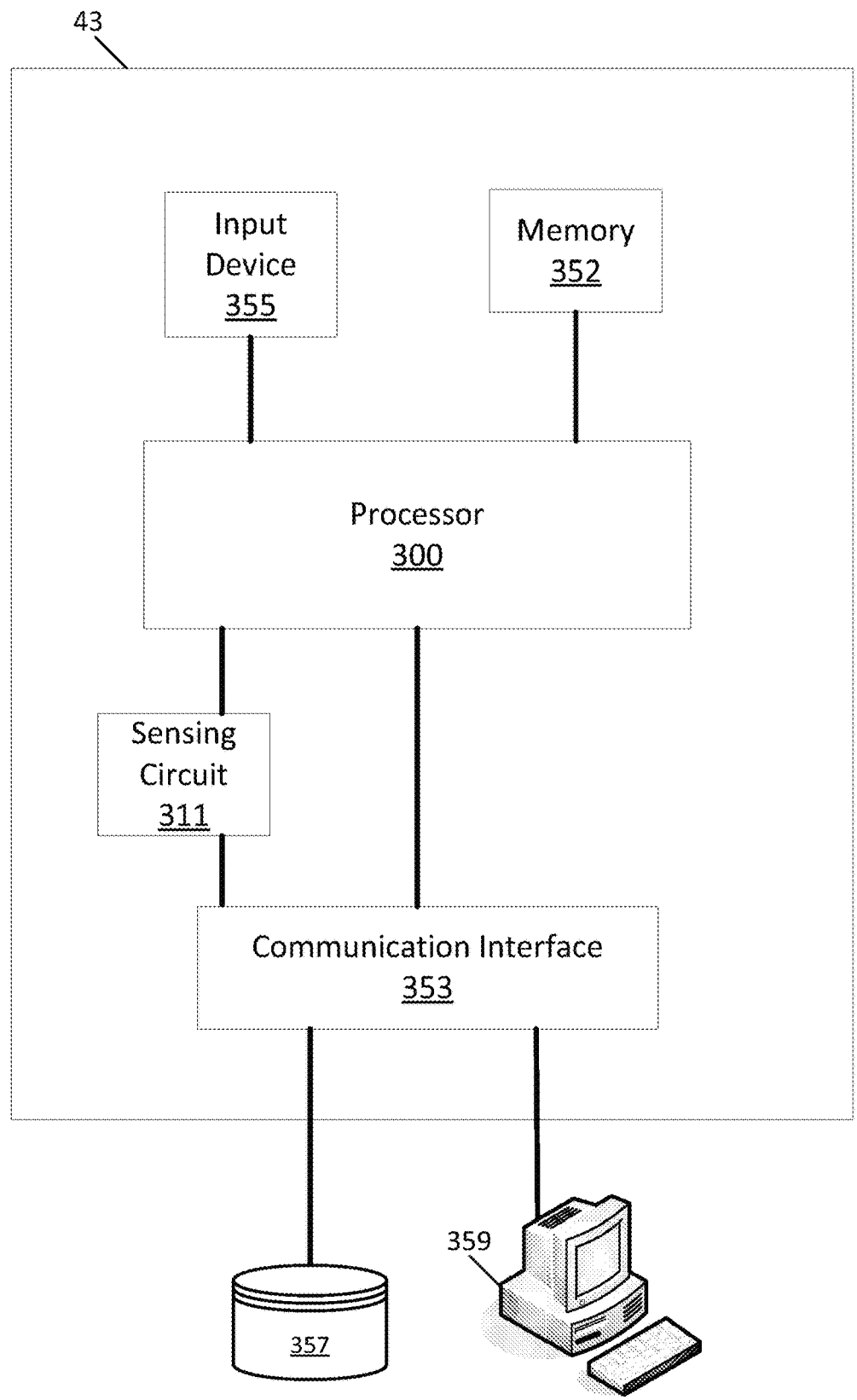
FIG. 37 illustrates an example onboard rotor controller.

FIG. 37 illustrates an example rotor controller 43. The rotor controller 43 may include a processor 300, a memory 352, and a communication interface 353. The rotor controller 43 may be connected to a workstation 359 or another external device (e.g., control panel) and/or a database 357 for receiving user inputs, system characteristics, and any of the values described herein. Optionally, the rotor controller 43 may include an input device 355 and/or a sensing circuit 311. The sensing circuit 311 receives sensor measurements from as described above. Additional, different, or fewer components may be included. The processor 300 is configured to perform instructions stored in memory 352 for executing the algorithms described herein. The processor 300 may identify an engine type, make, or model, and may look up system characteristics, settings, or profiles based on the identified engine type, make, or model.

Figure 38:
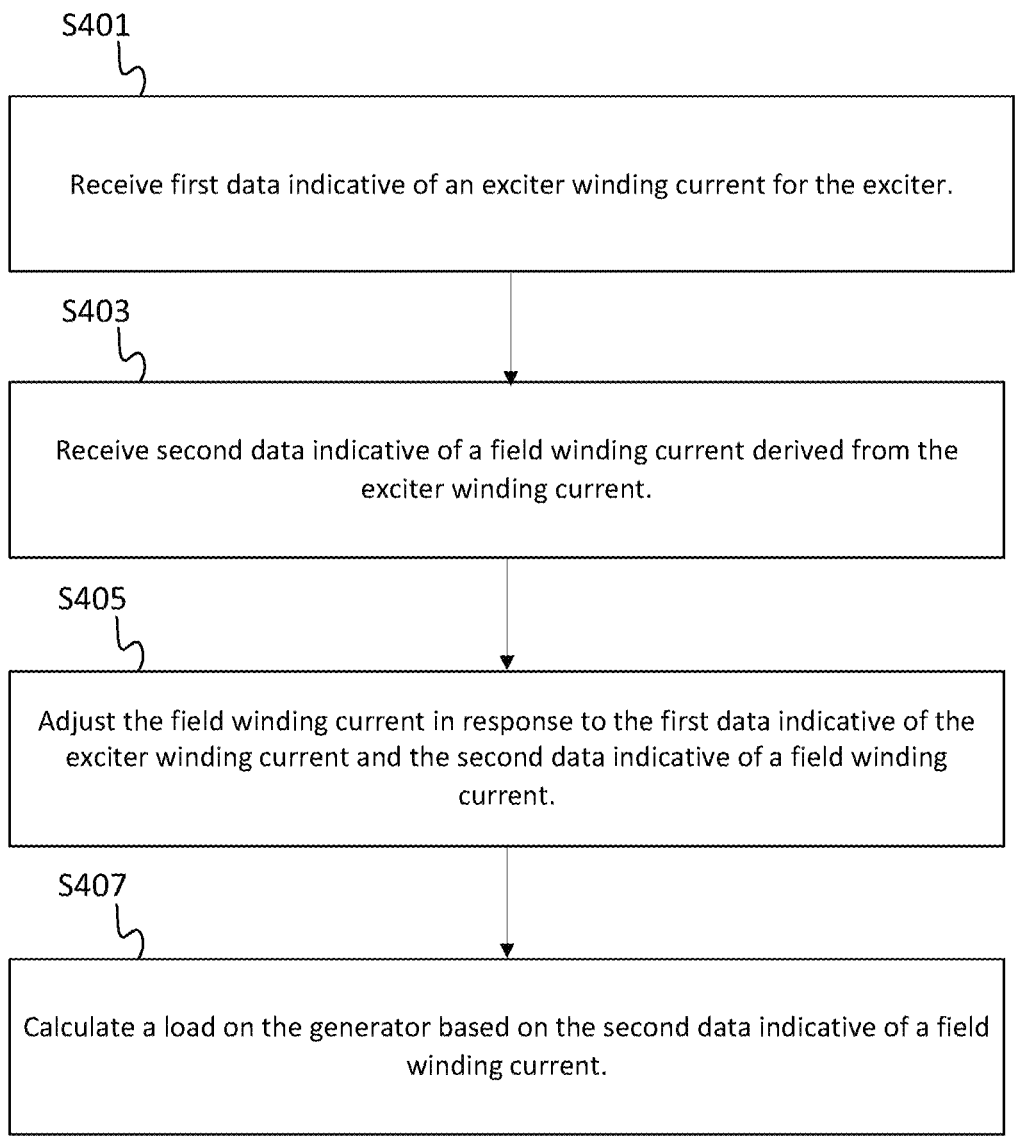
FIG. 38 illustrates an example flowchart for operation of the onboard rotor controller.

FIG. 38 illustrates an example flowchart for operation of the onboard rotor controller in cooperation with exciter windings integrated with the rotating printed circuit board associated with the onboard rotor controller. Additional, different, or fewer acts may be included.

In act S401, the processor 300 or the communication interface 353 receives first data indicative of an exciter winding current for the exciter. The exciter winding may be carried by a trace of the rotating printed circuit board as described in examples herein. The sensor circuit 311 may be connected to the exciter windings 54 and include a voltage sensor, a current sensor, or an inductance sensor. The first data indicative of the exciter winding current may be an average value, a sample value, or a maximum value over a time interval. The communication interface 353 may be a means for receiving first data indicative of an exciter winding current for the exciter. The sensing circuit 311 may include one or more sensors as a means for sensing the exciter winding current for the exciter.

In act S403, the processor 300 or the communication interface 353 receives second data indicative of a field winding current derived from the exciter winding current. The sensor circuit 311 may be connected to the field windings 36 and include a voltage sensor, a current sensor, or an inductance sensor. The second data indicative of the field winding current may be an average value, a sample value, or a maximum value over a time interval. The communication interface 353 may be a means for receiving second data indicative of a field winding current for the exciter. The sensing circuit 311 may include one or more sensors as a means for sensing the field winding current of the alternator.

In act S405, the processor 300 adjusts the field winding current in response to the first data indicative of the exciter winding current and the second data indicative of a field winding current. The processor 300 may set the field winding current in response to the feedback (current levels) of the field winding current and feedback (current levels of the exciter current. The processor 300 may adjust the field winding current in response to the load on the alternator. In some instances, the exciter current may be too high to be directly supplied as the field winding current given the current output needed for the load, and the processor 300 may adjust the field current lower. The processor 300 includes circuitry or a module or an application specific controller as a means for adjusting the field winding current in response to the first data indicative of the exciter winding current and the second data indicative of a field winding current.

In act S407, the processor 300 calculates a load on the generator based on the second data indicative of a field winding current. The processor 300 may receive data indicative of a flux induced on the field windings 36 by a current in the armature windings, which is indicative of an output of the generator. The processor 300 includes circuitry or a module or an application specific controller as a means for calculating a load on the generator based on the second data indicative of a field winding current.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database 357) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:
1. An apparatus comprising:
   a forward portion of a stator housing;
   a rear portion of the stator housing;
   a circuit board movable with response to a rotor shaft; and
   an alignment device configured to position the circuit board between the forward portion of the stator housing and the rear portion of the stator housing.

2. The apparatus of claim 1, wherein the alignment device includes one or more springs for applying a force between the circuit board and the rotor shaft or a bearing associated with the rotor shaft.

3. The apparatus of claim 2, further comprising:
   a mechanical switch configured to adjust a position of the circuit board.

4. The apparatus of claim 1, wherein the alignment device includes a pneumatic device for applying a force to the circuit board.

5. The apparatus of claim 1, wherein the alignment device includes a magnetic device for applying a force to the circuit board.

6. The apparatus of claim 1, wherein the circuit board includes a generator controller configured to generate a field current setting.

7. The apparatus of claim 6, wherein the circuit board includes a plurality of traces for exciter windings to induce a field current according to the field current setting.

8. The apparatus of claim 6, wherein the generator controller is configured to analyze sensor data for a magnetic field to calculate the field current setting.

9. The apparatus of claim 1, wherein the circuit board is a first circuit board, the apparatus further comprising:
   a second circuit board, wherein the first circuit board corresponds to a first phase of a multiphase output and the second circuit board corresponds to a second phase of the multiphase output.

10. The apparatus of claim 1, further comprising:
    a flux shaping component configured to provide a path for magnetic flux received at the circuit board.

11. The apparatus of claim 1, wherein the alignment device includes a movable axial support device.

12. The apparatus of claim 11, further comprising:
    a torque transfer device coupled to the movable axial support device that moves axially with respect to the rotor shaft so that the circuit board moves parallel to the rotor shaft.

13. The apparatus of claim 12, wherein the torque transfer device includes floating pins that are mated with the rotor shaft and move relative to the rotor shaft.

14. The apparatus of claim 1, further comprising:
    a first flux supply coupled to the forward portion of the stator housing; and
    a second flux supply coupled to the rear portion of the stator housing.

15. A method comprising:
    supporting a printed circuit board between a forward portion of a stator housing and a rear portion of the stator housing; and
    adjusting a position of the circuit board with respect to a rotor shaft using an alignment device while maintaining a rotational connection to the rotor shaft.

16. The method of claim 15, wherein the alignment device includes one or more springs for applying a force between the circuit board and a rotor shaft or a bearing associated with the rotor shaft.

17. The method of claim 15, wherein the alignment device includes a pneumatic device or a magnetic device for applying a force to the circuit board.

18. The method of claim 15, further comprising:
    analyzing, at a generator controller, sensor data for a magnetic field; and
    calculating, at the generator controller, a field current setting in response to the analysis.

19. A generator comprising:
    a forward portion of a stator housing;

a rear portion of the stator housing;
a circuit board including movable with response to a rotor shaft;
a generator controller coupled to the circuit board; and
an alignment device configured to position the circuit board between the forward portion of the stator housing and the rear portion of the stator housing.

20. The generator of claim 19, wherein the generator controller is configured to analyze sensor data for a magnetic field to calculate a field current setting.

* * * * *